(12) United States Patent
McDonnell

(10) Patent No.: US 12,331,867 B1
(45) Date of Patent: Jun. 17, 2025

(54) ADAPTOR DEVICES, INSTALLATION GUIDE DEVICES, AND METHODS

(71) Applicant: Joseph McDonnell, Miramar, FL (US)

(72) Inventor: Joseph McDonnell, Miramar, FL (US)

(73) Assignee: JOEY MAC INVENTIONS LLC, Miramar, FL (US)

( * ) Notice: Subject to any disclaimer, the term of this patent is extended or adjusted under 35 U.S.C. 154(b) by 0 days.

(21) Appl. No.: 18/617,022

(22) Filed: Mar. 26, 2024

(51) Int. Cl.
*F16L 47/34* (2006.01)

(52) U.S. Cl.
CPC .................. *F16L 47/34* (2013.01)

(58) Field of Classification Search
None
See application file for complete search history.

(56) References Cited

U.S. PATENT DOCUMENTS

| | | | | |
|---|---|---|---|---|
| 3,516,426 | A * | 6/1970 | Toll ................... | B29C 66/81422 137/15.08 |
| 3,649,055 | A * | 3/1972 | Nilsen ................ | F16L 47/30 285/21.3 |
| 3,953,059 | A * | 4/1976 | Carroll ............... | F16L 47/34 264/249 |
| 7,302,965 | B2 * | 12/2007 | Ishikawa ............ | F16L 47/345 408/137 |
| 8,277,745 | B2 | 10/2012 | Mehus et al. | |
| 9,668,431 | B2 * | 6/2017 | Turk .................. | F16L 37/54 |
| 9,943,778 | B1 | 4/2018 | Gutierrez et al. | |
| 12,083,238 | B1 | 9/2024 | Thompson | |
| 2006/0237806 | A1 | 10/2006 | Martin et al. | |
| 2007/0224050 | A1 | 9/2007 | Ward | |
| 2009/0064698 | A1 | 3/2009 | Spanger | |

(Continued)

FOREIGN PATENT DOCUMENTS

| | | |
|---|---|---|
| WO | 2011/075324 A1 | 6/2011 |
| WO | 2012/164289 A1 | 12/2012 |

OTHER PUBLICATIONS

"IFLO—Apple App Store," webpage <https://apps.apple.com/us/app/iflo/id6446085127>, 3 pages, available on Internet as of Sep. 15, 2023, retrieved from Internet on Feb. 29, 2024.

(Continued)

*Primary Examiner* — Angelisa L. Hicks
(74) *Attorney, Agent, or Firm* — Harness, Dickey & Pierce, P.L.C.

(57) ABSTRACT

Adaptor devices, installation guide devices, and methods provide a fluid connection into a conduit section interior of a conduit section of a conduit through a sidewall thickness of a conduit section sidewall of the conduit section. A method includes coupling an installation guide device to the conduit, operating a drill bit device while the installation guide device is coupled to the conduit to cause the drill bit device to move longitudinally to a protrusion distance that is equal to or less than a particular protrusion distance defined by a protrusion stop structure to drill through the sidewall thickness of the conduit to form an access point opening through the sidewall thickness of the conduit into a conduit interior of the conduit, and coupling an adaptor device to the conduit section at the exposed access point opening, to establish fluid communication into the conduit section interior through the adaptor device.

3 Claims, 50 Drawing Sheets

(56) References Cited

U.S. PATENT DOCUMENTS

2010/0147876 A1    6/2010  Mehus et al.

OTHER PUBLICATIONS

"IFLO® Smart Automated AC Drain Line Cleaner," webpage <https://iflo.com>, 6 pages, available on Internet as of Aug. 17, 2023, retrieved from Internet on Feb. 29, 2024.

"IFLO Smart Automated AC Drain Line Cleaning System, Includes 36oz Cleaner Cartridge," webpage <https://iflo.com/products/iflo®-device-starter-kit>, 9 pages, available on Internet as of Dec. 7, 2023, retrieved from Internet on Mar. 20, 2024.

"FAQ—iFLO," webpage <https://iflo.com/pages/faq>, 22 pages, available on Internet as of Dec. 19, 2023, retrieved from Internet on Feb. 29, 2024.

Screen captures of animated video entitled "iFLO—Closed Drain Line Installation Video," 10 pages, retrieved from Internet: <https://cdn.shopify.com/videos/c/o/v/5d1d5d15ffe447cbb31718f246086bdb.mp4>, available on Internet as of Dec. 19, 2023, retrieved from Internet on Feb. 29, 2024.

Screen captures of animated video entitled "iFLO—Open Drain Line Installation Video," 6 pages, retrieved from Internet: <https://cdn.shopify.com/videos/c/o/v/ff6be7a49c6e4943ab0e3a069fc5b209.mp4>, available on Internet as of Dec. 19, 2023, retrieved from Internet on Feb. 29, 2024.

* cited by examiner

ADAPTOR DEVICES, INSTALLATION GUIDE DEVICES, AND METHODS

BACKGROUND

Field

The present inventive concepts relate generally to systems, devices, and methods to supply fluids, including for example cleaning compositions, into conduits, including for example condensate drain lines of air conditioning systems, for example via access point openings of said conduits, and more particularly to systems, devices, and methods for providing a fluid connection into a conduit section interior of a conduit section of a conduit through an access point opening into the conduit section interior.

Description of Related Art

Air-conditioning systems may include an air handler, also referred to as an air handling unit (AHU) that may circulate and cool air within a space and/or structure. An air handler may move air, via operation of an air mover such as a blower or fan, to flow in thermal communication with a heat exchanger such as an air coil. The air handler may circulate a refrigerant through the heat exchanger to absorb (e.g., remove) heat from the flow of air to cool the air, and the air-conditioning system may circulate the refrigerant through a heat exchanger to discharge the absorbed heat into a heat sink (e.g., the ambient environment).

In some cases, cooling air due to the heat exchanger absorbing heat from the air may result in condensation of moisture (e.g., condensate) out of the cooled air at the heat exchanger. The condensate may be collected and discharged from the air handler via a condensate drain line.

SUMMARY

According to some example embodiments, a method to provide a fluid connection into a conduit section interior of a conduit section of a conduit through a sidewall thickness of a conduit section sidewall of the conduit section may include: coupling an installation guide device to the conduit section, the installation guide device including a drill bit device configured to drill through the sidewall thickness of the conduit section, the installation guide device including a guide conduit having at least a lower guide opening, the installation guide device configured to enable longitudinal movement of the drill bit device at least partially through the guide conduit and at least partially through the lower guide opening, the installation guide device including a protrusion stop structure configured to limit longitudinal protrusion of the drill bit device from the lower guide opening to a particular protrusion distance, the coupling the installation guide device to the conduit section aligns the lower guide opening with an access point location on an outer sidewall surface of the conduit section. The method may include operating the drill bit device while the installation guide device is coupled to the conduit to cause the drill bit device to move longitudinally at least partially through the lower guide opening to a protrusion distance that is equal to or less than the particular protrusion distance, such that the drill bit device drills through the sidewall thickness of the conduit section from the access point location to form an access point opening through the sidewall thickness of the conduit section into a conduit interior of the conduit section. The method may include decoupling the installation guide device from the conduit section to expose the access point opening. The method may include coupling an adaptor device to the conduit section at the exposed access point opening, the adaptor device including an adaptor conduit extending between an adaptor inlet and an adaptor outlet, the coupling the adaptor device at least partially aligns the adaptor outlet with the access point opening to establish fluid communication from the adaptor inlet to the conduit section interior through at least the adaptor conduit and the access point opening.

The adaptor device may include an inlet connector that is configured to couple with a fluid supply source to cause the adaptor inlet to be in fluid communication with the fluid supply source. The method may further include coupling the inlet connector to the fluid supply source to establish fluid communication between the fluid supply source and the conduit section interior through at least the adaptor conduit and the access point opening.

The conduit may include a condensate drain line of an air conditioning system and is configured to direct condensate from a drip pan of an air handler of the air conditioning system to a condensate drain outlet through at least the conduit section interior. The fluid may include a cleaning composition. The fluid supply source may include a cleaner dispensing system configured to dispense the cleaning composition. The method may further include operating the cleaner dispensing system to dispense the cleaning composition, such that the adaptor device directs the cleaning composition dispensed by the cleaner dispensing system through the adaptor conduit and into the conduit section interior to be supplied into at least a portion of the condensate drain line to cause at least some biological substances to be removed from at least a portion of the condensate drain line.

The protrusion stop structure may be fixed in relation to the drill bit device such that the protrusion stop structure is configured to move with the drill bit device in relation to the guide conduit, and inhibit protrusion of the drill bit device beyond the particular protrusion distance from the lower guide opening while the installation guide device is coupled to the conduit section based on a lower surface of the protrusion stop structure contacting the outer sidewall surface of the conduit section, or the protrusion stop structure may be fixed in relation to the guide conduit such that the drill bit device is configured to move longitudinally at least in relation to the protrusion stop structure while moving at least partially through the lower guide opening, and the protrusion stop structure is configured to inhibit protrusion of the drill bit device beyond the particular protrusion distance from the lower guide opening while the installation guide device is coupled to the conduit section based on an upper surface of the protrusion stop structure contacting a lower surface of the drill bit device.

The installation guide device may include a distal stop structure that is configured to inhibit longitudinal movement of the drill bit device away from the lower guide opening and at least partially through the guide conduit.

The installation guide device may include a guide connector that is configured to couple the installation guide device to the conduit section.

The guide connector may include a clamp that is configured to directly engage and clamp the outer sidewall surface to couple the installation guide device to the conduit section.

The adaptor device may include an outlet nozzle extending below a lower surface of the adaptor device and defining the adaptor outlet at a distal end and further defining at least a portion of the adaptor conduit through an interior of the outlet nozzle, such that the adaptor conduit at least partially extends through the outlet nozzle to the adaptor outlet. The coupling the adaptor device to the conduit section may cause at least the distal end of the outlet nozzle to at least partially extend through the access point opening from the outer sidewall surface.

The coupling the adaptor device to the conduit section may cause the distal end of the outlet nozzle to extend through an entirety of the access point opening from the outer sidewall surface such that the distal end of the outlet nozzle is within the conduit section interior.

The outlet nozzle may device an opening having at least a side opening through a sidewall of the outlet nozzle, and the coupling the adaptor device to the conduit causes a portion of the sidewall of the outlet nozzle that is opposite to the side opening to face towards an upstream end of the conduit section such that the portion of the sidewall is configured to at least partially shield the adaptor conduit from a flow of a fluid flowing through the conduit section interior towards the access point opening.

The adaptor device may include a sealing member at a lower end of an adaptor conduit structure of the adaptor device. The coupling the adaptor device to the conduit section may cause the sealing member to seal at least an outer edge of the access point opening.

According to some example embodiments, an adaptor device may be configured to establish a fluid connection between a fluid supply source and a conduit interior of a conduit section of a conduit through an access point opening in the conduit section. The adaptor device may include an adaptor conduit structure at least partially defining an adaptor conduit extending between an adaptor inlet and an adaptor outlet, an inlet connector configured to couple with the fluid supply source externally to the conduit section to cause the adaptor inlet to be in fluid communication with the fluid supply source, and a conduit connector configured to engage the conduit section to couple the adaptor device to the conduit section to at least partially align the adaptor outlet with the access point opening to establish fluid communication from the adaptor inlet to the conduit interior through at least the adaptor conduit.

The conduit may include a condensate drain line of an air conditioning system and is configured to direct condensate from a drip pan of an air handler of the air conditioning system to a condensate drain outlet through at least the conduit section interior. The fluid may include a cleaning composition. The fluid supply source may include a cleaner dispensing system configured to dispense the cleaning composition. The adaptor device may be configured to, based on being coupled to both the conduit section and the fluid supply source, receive cleaning composition at the adaptor inlet from the cleaner dispensing system based on the cleaner dispensing system dispensing the cleaning composition through an outlet thereof, and direct the received cleaning composition through the adaptor conduit and into the conduit section interior to be supplied into at least a portion of the condensate drain line to cause at least some biological substances to be removed from at least a portion of the condensate drain line.

The adaptor device may further include an inlet nozzle extending to a distal end from the upper end of the adaptor conduit structure, the inlet nozzle defining the adaptor inlet at the distal end of the inlet nozzle and further defining at least a portion of the adaptor conduit extending to the adaptor inlet, such that the adaptor conduit at least partially extends through the inlet nozzle to the adaptor inlet.

The inlet connector may include a fitting configured to engage an inner surface of a fluid supply conduit based on being inserted into the fluid supply conduit.

The adaptor conduit structure may have an upper end and a lower end. The conduit connector may be configured to couple the adaptor device to the conduit section such that the lower end of the adaptor conduit structure is held in place proximate to an outer sidewall surface of the conduit section to at least partially align the adaptor outlet with the access point opening.

The conduit connector may include a clamp that is configured to directly engage and clamp the outer sidewall surface to couple the adaptor device to the conduit section.

The adaptor device may further include an outlet nozzle extending to a distal end from the lower end of the adaptor conduit structure, the outlet nozzle defining the adaptor outlet at the distal end of the outlet nozzle and further defining at least a portion of the adaptor conduit extending to the adaptor outlet, such that the adaptor conduit at least partially extends through the outlet nozzle to the adaptor outlet. The outlet nozzle may be configured to at least partially extend through the access point opening from the outer sidewall surface of the conduit section based on the conduit connector coupling the adaptor device to the conduit section.

The outlet nozzle may be configured to extend through an entirety of the access point opening from the outer sidewall surface such that the distal end of the outlet nozzle is within the conduit section interior based on the conduit connector coupling the adaptor device to the conduit section.

The outlet nozzle may define an opening having at least a side opening through a sidewall of the outlet nozzle.

The adaptor device may further include a sealing member at the lower end of the adaptor conduit structure, the sealing member at least partially surrounding a proximate end of the outlet nozzle in a plan view, the sealing member configured to seal at least an outer edge of the access point opening based on the conduit connector coupling the adaptor device to the conduit section such that the outlet nozzle at least partially extends through the access point opening from the outer sidewall surface of the conduit section.

The adaptor device may further include a sealing member at the lower end of the adaptor conduit structure, the sealing member configured to seal at least an outer edge of the access point opening based on the conduit connector coupling the adaptor device to the conduit section.

The adaptor conduit structure may have an upper end and a lower end. The conduit connector may be configured to couple the adaptor device to the conduit section such that the lower end of the adaptor conduit structure is held in place proximate to the access point opening to at least partially align the adaptor outlet with the access point opening. The conduit connector may include a stepped connector structure, the stepped connector structure defining at least two axially separated connection positions associated with different conduit diameters and each configured to receive and engage access point openings having different diameters, such that the stepped connector structure is configured to couple the adaptor device with the access point opening at a particular one of the at least two axially separated connection positions based on a diameter associated with the access point opening.

The stepped connector structure may define the at least two axially separated connection positions as being associated with different conduit outer diameters, such that the stepped connector structure is configured to couple the adaptor device with the access point opening at a particular one of the at least two axially separated connection positions based on a conduit outer diameter associated with the access point opening, or the stepped connector structure may define the at least two axially separated connection positions as being associated with different conduit inner diameters, such that the stepped connector structure is configured to couple the adaptor device with the access point opening at a particular one of the at least two axially separated connection positions based on a conduit inner diameter associated with the access point opening.

According to some example embodiments, an installation guide device may be configured to establish an access point opening through a sidewall thickness of a conduit section of a conduit to provide a fluid connection into a conduit section interior of the conduit section through the sidewall thickness of the conduit section. The installation guide device may include: a drill bit device configured to drill through the sidewall thickness of the conduit section, a guide conduit having at least a lower guide opening, the installation guide device configured to enable longitudinal movement of the drill bit device at least partially through the guide conduit and at least partially through the lower guide opening, and a protrusion stop structure configured to limit longitudinal protrusion of the drill bit device from the lower guide opening to a particular protrusion distance.

The protrusion stop structure may be fixed in relation to the drill bit device such that the protrusion stop structure is configured to move with the drill bit device in relation to the guide conduit, and inhibit protrusion of the drill bit device beyond the particular protrusion distance from the lower guide opening while the installation guide device is coupled to the conduit section based on a lower surface of the protrusion stop structure contacting an outer sidewall surface of the conduit section, or the protrusion stop structure may be fixed in relation to the guide conduit such that the drill bit device is configured to move longitudinally at least in relation to the protrusion stop structure while moving at least partially through the lower guide opening, and the protrusion stop structure is configured to inhibit protrusion of the drill bit device beyond the particular protrusion distance from the lower guide opening while the installation guide device is coupled to the conduit section based on an upper surface of the protrusion stop structure contacting a lower surface of the drill bit device.

The installation guide device may further include a distal stop structure that is configured to inhibit longitudinal movement of the drill bit device away from the lower guide opening and at least partially through the guide conduit.

The installation guide device may further include a guide connector that is configured to couple the installation guide device to the conduit section.

The guide connector may include a clamp that is configured to directly engage and clamp an outer sidewall surface of the conduit section to couple the installation guide device to the conduit section.

The conduit may include a condensate drain line of an air conditioning system and is configured to direct condensate from a drip pan of an air handler of the air conditioning system to a condensate drain outlet through at least the conduit section interior.

According to some example embodiments, a system may include the adaptor device and the installation guide device.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
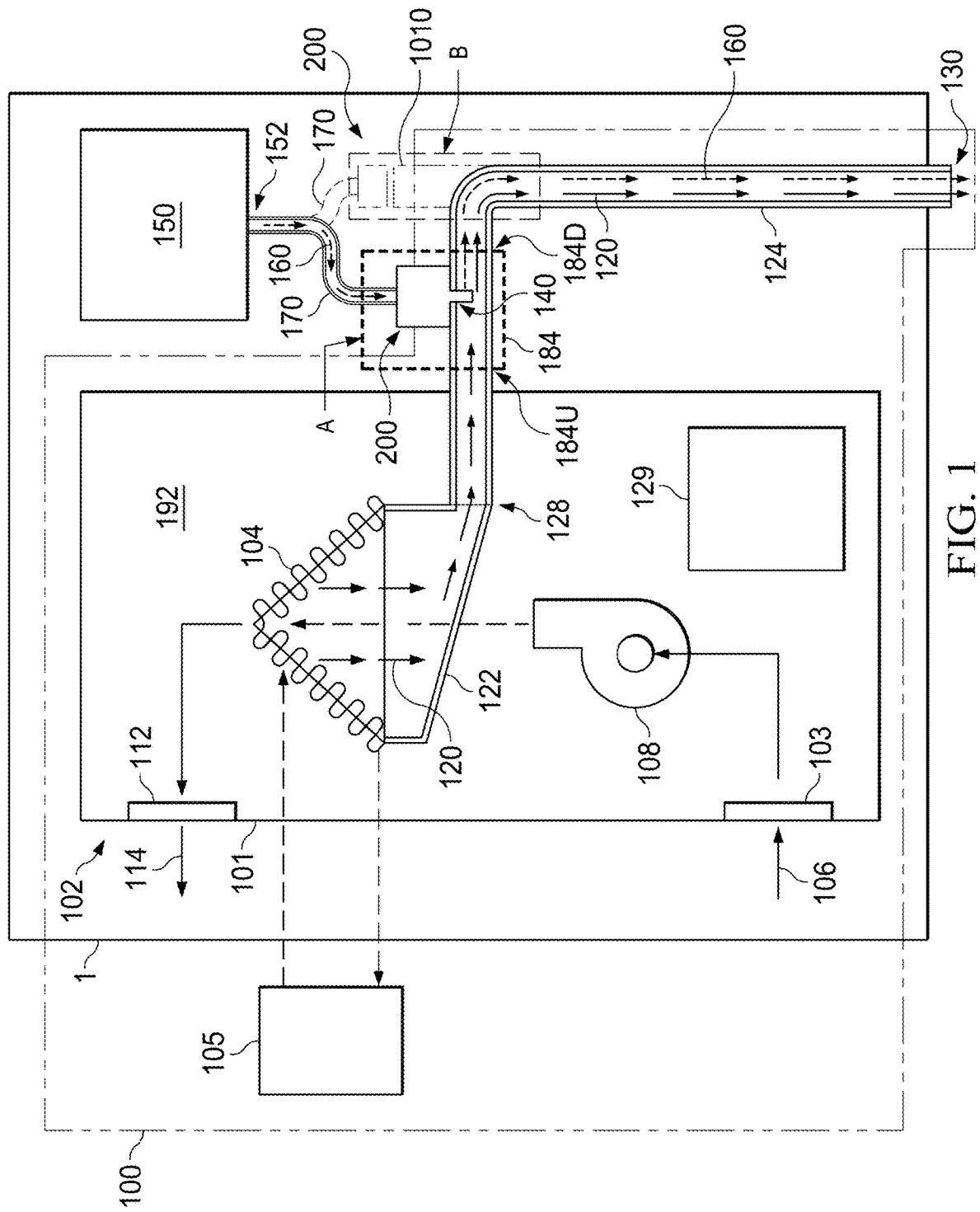
FIG. 1 is a schematic diagram of a system including a fluid supply source, a system including a conduit supported by the fluid supply source, and an adaptor device configured to provide fluid dispensed by the fluid supply source into a conduit section of the conduit through an access point opening of the conduit section, according to some example embodiments.

Reference will now be made in detail to example embodiments, some of which are illustrated in the accompanying drawings, wherein like reference labels refer to like elements throughout. However, specific structural and functional details disclosed herein are merely representative for purposes of describing example embodiments. Example embodiments may be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments of the inventive concepts.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

It will be understood that elements and/or properties thereof (e.g., structures, surfaces, directions, or the like), which may be referred to as being "perpendicular," "parallel," "paraxial," "flush," or the like with regard to other elements and/or properties thereof (e.g., structures, surfaces, directions, or the like) may be "perpendicular," "parallel," "paraxial," "flush," or the like or may be "substantially perpendicular," "substantially parallel," "substantially paraxial," or "substantially flush," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially paraxial" with regard to other elements and/or properties thereof will be understood to be "paraxial" with regard to the other elements and/or properties thereof within manufacturing tolerances and/or material tolerances and/or have a deviation in magnitude and/or angle from "paraxial," or the like with regard to the other elements and/or properties thereof that is equal to or less than 10% (e.g., a. tolerance of ±10%).

Elements and/or properties thereof (e.g., structures, surfaces, directions, or the like) that are "substantially flush" with regard to other elements and/or properties thereof will be understood to be "flush" with regard to the other elements and/or properties thereof within manufacturing tolerances and/or material tolerances and/or have a deviation in magnitude and/or angle from "flush," or the like with regard to the other elements and/or properties thereof that is equal to or less than 10% (e.g., a. tolerance of ±10%).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being the "substantially" the same and/or identical encompasses elements and/or properties thereof that have a relative difference in magnitude that is equal to or less than 10%. Further, regardless of whether elements and/or properties thereof (e.g., "perpendicular," "parallel," "paraxial," "flush," or the like) are modified as "substantially," it will be understood that these elements and/or properties thereof (e.g., "perpendicular," "parallel," "paraxial," "flush," or the like) should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

FIG. 1 is a schematic diagram of a system including a fluid supply source 150, a system 100 including a conduit 124 supported by the fluid supply source 150, and an adaptor device 200 configured to provide fluid 160 dispensed (e.g., supplied, provided, discharged, output, etc.) by the fluid supply source 150 into a conduit section 184 of the conduit 124 through an access point opening 140 of the conduit section 184, according to some example embodiments.

Referring to FIG. 1, a fluid supply source 150 may be configured to supply ("dispense," "provide," "discharge," "output," etc.) a controlled amount of a fluid 160 via an outlet 152 thereof to at least a portion of a conduit 124. The portion of the conduit 124 to which the fluid 160 may be supplied may include a conduit section 184 of the conduit 124. The conduit 124 may be included in a system 100 that includes a process unit 102, where the conduit 124 is configured to direct a separate fluid 120 through the conduit 124 from a conduit inlet 128 to a conduit outlet 130 at opposite ends of the conduit 124 to be discharged from the system 100 and/or a structure 1 at least partially enclosing the system 100.

In some example embodiments, a conduit 124 may comprise multiple conduit sections (e.g., pipe segments) and/or fittings that are separate pieces that are coupled together to define the conduit 124, and the conduit section 184 may be a particular conduit section (e.g., a particular length of pipe) coupled to at least one other conduit section and/or fitting to at least partially define the conduit 124. For example, in some example embodiments the conduit 124 may comprise polyvinyl chloride (PVC) conduit sections and/or fittings, and the conduit section 184 may be a length of PVC pipe segment. However, it will be understood that example embodiments are not limited thereto, and the conduit 124 and/or any conduit sections thereof 184 may include any material and may have any dimensions.

In some example embodiments, including the example embodiments shown in FIG. 1, the system 100 includes a process unit 102 that is configured to discharge a fluid 120 through the conduit 124, such that the conduit 124 extends from a conduit inlet 128 that is coupled to the process unit 102 to a conduit outlet 130 at an opposite end of the conduit 124 and is configured to direct the fluid 120 therethrough from the conduit inlet 128 to the conduit outlet 130, which may be a conduit outlet 130 that directs the fluid 120 out of the system 100, and the fluid supply source 150 is configured to supply (e.g., dispense, discharge, provide, output, etc.) a fluid 160 to be directed into at least a conduit section 184 of the conduit 124 (e.g., independently of either the conduit inlet 128 or the conduit outlet 130). In some example embodiments, a fluid connection is established between the fluid supply source 150 and the conduit 124 independently of the conduit inlet 128 or the conduit outlet 130, such that the fluid 160 that is supplied from the fluid supply source 150 is directed into the conduit 124 via an opening that is separate from the conduit inlet 128 or the conduit outlet 130. Such an opening is referred to herein as an access point opening 140. An access point opening may serve as an opening to access at least a portion of the conduit 124 for cleaning, maintenance, or the like independently of the conduit inlet 128 or the conduit outlet 130.

As shown in FIG. 1, in some example embodiments the system 100 includes an air conditioning system, the process unit 102 includes an air handler unit (AHU), also referred to as an "air handler," and the conduit 124 includes a condensate drain line that is configured to direct a separate fluid 120 that includes condensate from the air handler to a conduit outlet 130 to be discharged from the air conditioning system and/or a structure 1 containing at least a portion thereof. In some example embodiments, including example embodiments where the system 100 includes an air conditioning system, the fluid supply source 150 may include a cleaner dispensing system that is configured to supply a fluid 160 that includes a cleaning composition that is configured to break down, remove, etc. biological material. The cleaning composition (as fluid 160) may be supplied into at least the conduit section 184 of the condensate drain line (as conduit 124) via the access point opening 140 to mitigate (e.g., break down, clean, remove, etc.) biological material (e.g., biological substances) that may be located within the interior of the condensate drain line in order to mitigate (e.g., remove, clean, break down, etc.) biological material accumulation within the condensate drain line and thus reduce the likelihood of condensate backflow through the condensate drain line due to a blockage in the condensate drain line due to such biological material accumulation.

However, it will be understood that example embodiments are not limited to such example embodiments where the system 100 includes an air conditioning system, the fluid supply source 150 includes a cleaner dispensing system, the fluid 160 includes a cleaning composition, and the conduit 124 includes a condensate drain line. Accordingly, it will be understood that the system 100 as described herein according to any of the example embodiments may be an air conditioning system for example as shown with regard to system 100 in FIG. 1, the process unit 102 as described herein according to any of the example embodiments may be an air handler that may include at least the drip pan 122 as shown with regard to process unit 102 in FIG. 1, the conduit 124 as described herein according to any of the example embodiments may be a condensate drain line having a condensate drain inlet (conduit inlet 128) and a condensate drain line outlet (conduit outlet 130), the fluid supply source 150 as described herein according to any of the example embodiments may be a cleaner dispensing system configured to dispense a fluid 160 that is or includes a cleaning composition as shown with regard to the fluid supply source 150 in FIG. 1, the fluid 160 as described herein according to any of the example embodiments may be a cleaning composition.

Referring to some example embodiments, including the example embodiments shown in FIG. 1, a system 100 that includes an air conditioning system, which may be interchangeably referred to as an air conditioner system, air conditioner, or the like, may be configured to provide cooling of air within an interior of a structure 1 and may be at least partially located within the structure 1, but example embodiments are not limited thereto. The air conditioning system may be included as a part of a heating, ventilation, and air conditioning (HVAC) system, but example embodiments are not limited thereto, and in some example embodiments the air conditioning system may be separate from any heating system.

Referring to some example embodiments, including the example embodiments shown in FIG. 1, where the system 100 includes an air conditioning system, the system 100 may include a process unit 102 that includes an air handler and a condenser assembly 105 that are configured to draw return air 106 from an interior of the structure 1, cool (e.g., absorb heat from) the drawn return air 106 into conditioned air 114, and discharge (e.g., supply) the conditioned air 114 back into the interior of the structure 1. The air handler may include, within a housing 101 that may at least partially comprise metal (e.g., steel) and at least define an interior 192 space, an air intake 103, an air mover 108 (e.g., fan, blower, etc.), a heat exchanger 104, a drip pan 122, a conduit 124 that includes a condensate drain line (also referred to herein as a condensate drain conduit, condensate drain pipe, etc.), a controller 129, and an air outlet 112. The condenser assembly 105 may include a compressor, a second heat exchanger (e.g., condenser coil), and an air mover (e.g., fan, blower, etc.).

It will be understood that example embodiments of an air conditioning system, air handler, condenser assembly, or the like may have different arrangements of devices therein and may omit or add to the aforementioned elements of the air conditioning system as shown in FIG. 1. It will be understood, for example, that elements shown as being included in the air handler may in some example embodiments be located in the condenser assembly 105 (e.g., the controller 129 may be located in the condenser assembly 105 instead of the air handler). As shown, the condenser assembly 105 may be located external to the structure 1 while the air handler is located internal to the structure 1, but example embodiments are not limited thereto.

In some example embodiments, the air conditioning system (system 100) may draw return air 106 into the air handler (process unit 102) via the air intake 103. The air mover 108 (e.g., blower) may induce the flow of air into, through, and out of, the air handler. The air mover 108 may move (e.g., blow) the return air 106 to the heat exchanger 104. The return air 106 may flow in thermal communication with (e.g., in contact with outer surfaces of) one or more coils of the heat exchanger 104 so that heat is removed from the return air 106 to cool the return air 106 into conditioned air 114. The air handler may move the conditioned air 114 out of the air handler and back into an interior space of the structure 1 via the air outlet 112.

An air conditioning system (system 100) may circulate a working fluid (e.g., a refrigerant, including known R22 refrigerant, R410A refrigerant, or any known refrigerant) between the heat exchanger 104 and a heat exchanger of the condenser assembly 105 to remove heat from the return air 106 based on the return air 106 flowing in thermal communication (e.g., through, across, over, and/or in contact with one or more outer surfaces of) the heat exchanger 104. The heat exchanger 104 may include any known heat exchanger used for an air conditioning system, for example an evaporator coil exchanger that includes one or more coils of one or more tubes through which the working fluid flows (e.g., as a cooled liquid). The heat exchanger 104 may cause heat to be transferred from the return air 106 and into the working fluid when the return air 106 is caused to flow across (e.g., in contact with, in thermal communication with, etc.) the one or more coils (e.g., one or more outer surfaces thereof), thereby resulting in the working fluid becoming heated (e.g., heated into a low-pressure gas). The heated working fluid may be drawn, via a fluid line (e.g., fluid conduit, pipe, etc.) into the condenser assembly 105.

As further shown, the air conditioning system may include a controller 129 that is configured to control elements of the air conditioning system, including for example controlling operation of the air handler, condenser assembly 105, or any part thereof. The controller 129, and any functionality thereof, may be implemented by a computing device, including a memory storing a program of instructions (e.g., a solid state drive (SSD) memory or storage device) and a processor (e.g., a central processing unit (CPU)) configured to execute the program of instructions. While the controller 129 is shown as being included within the housing 101 of the air handler, it will be understood that the controller 129 may be located external to the housing 101 and, in some example embodiments, may be located within the condenser assembly 105 or may be attached to an exterior of the air handler for case of manual access.

Still referring to FIG. 1, when heat is removed from the return air 106 based on the return air 106 passing in thermal communication with the heat exchanger 104, water may condense out of the cooled conditioned air 114 as a fluid 120 that may be a condensate at the heat exchanger 104, for example on one or more outer surfaces thereof. The air handler (process unit 102) may include a drip pan 122 located beneath the heat exchanger 104, and the condensate (fluid 120) may fall under gravity from the one or more outer surfaces of the heat exchanger 104 to collect in the drip pan 122.

In some example embodiments, including the example embodiments shown in FIG. 1 where the system 100 is an air conditioning system and the process unit 102 includes an air handler, the system 100 may include a conduit 124 that includes a condensate drain line having an inlet opening (conduit inlet 128) coupled to the drip pan 122 of the air handler (e.g., a bottom surface or a side surface of the drip pan 122), for example a side surface proximate to a lowest level of a bottom surface of the drip pan 122 where the bottom surface is at least partially inclined to be angled downwards towards the inlet opening (conduit inlet 128) of the conduit 124. The conduit 124 may include an outlet opening (conduit outlet 130) that is external to the structure 1 and open to the ambient environment, as shown. Condensate (e.g., fluid 120) collected in the drip pan 122 may pass (e.g., under gravity) to the inlet opening (conduit inlet 128) of the condensate drain line (conduit 124), and the condensate drain line may direct the condensate to flow out of the air handler (process unit 102) and out of the structure 1 to the ambient environment via the outlet opening (conduit outlet 130) of the condensate drain line (conduit 124).

In some example embodiments, various substances may accumulate in one or more portions of a system 100 (e.g., in an air conditioning system, the drip pan 122, the condensate drain line conduit 124, etc.), which may clog one or more portions of condensate removal elements thereof (e.g., drip pan 122, condensate drain line conduit 124, etc.). Such substances, referred to herein as biological materials, biological substances, or the like, may include, for example, mold, algae, mildew, bacteria, and/or fungi. Such biological material accumulation may obstruct the flow of fluid 120 (e.g., condensate) through the conduit 124 to the outlet opening (conduit outlet 130) to exit the system 100 and thus cause accumulation of fluid 120 (e.g., condensate) in the conduit 124 (e.g., condensate backflow). Such accumulation of fluid 120 in the conduit 124 may potentially result in condensate accumulation (backflow) from the conduit 124 (e.g., condensate drain line) into the process unit 102 (e.g., drip pan 122 of an air handler). Such accumulation of fluid 120 may cause damage to the process unit 102 (e.g., air handler), system 100 (e.g., air conditioning system) and/or to a structure 1 in which the process unit 102 is included, including water damage.

Referring to FIG. 1, in some example embodiments a fluid supply source 150 may be configured to supply (e.g., dispense, discharge, output, provide, etc.) a fluid 160 that includes a cleaning composition into at least a portion of the system 100 and/or one or more structures or conduits associated therewith (e.g., into the conduit 124) to clean, break down, remove, etc. various substances (e.g., mold, algae, mildew, bacteria, and/or fungi) that may be accumulated in the portion of the system 100 and/or one or more structures or conduits associated therewith. As shown, a fluid supply source 150 may be configured to provide fluid 160 to one or more locations associated with the system 100 (e.g., an interior of the conduit 124) via an outlet 152 of the fluid supply source 150, including for example providing a fluid 160 to the interior of the conduit 124 via an access point opening 140 into said interior at a conduit section 184 of the conduit 124. Such a fluid supply source 150 may be understood to be "serving," "servicing," and/or "supporting" the system 100, the conduit 124, the conduit section 184, the process unit 102 to which the conduit inlet 128 of the conduit 124 is coupled and from which the conduit 124 is configured to receive a separate fluid 120, any combination thereof, or the like.

The fluid supply source 150 may include a dispenser device that is configured to operate to dispense (e.g., controllably dispense) a fluid 160 (e.g., via an outlet 152, also referred to herein as a dispensing outlet, of the fluid supply source 150). As described herein, "dispensing" a fluid 160 (e.g., cleaning composition) may include supplying (e.g., discharging, outputting, etc.) the fluid 160 via operating a pump (e.g., "pumping") of the fluid supply source 150, actuating one or more actuators and/or valves of the fluid supply source 150, or any combination thereof. A conduit, also referred to herein as a fluid supply conduit 170, may extend from one end coupled to the fluid supply source 150 (e.g., the outlet 152) to a location at, in, and/or associated with the 100, such as the conduit 124 through an access point opening 140 thereof. As shown in FIG. 1, for example, the fluid supply conduit 170 to direct fluid 160 from the outlet 152 may extend to an opening of the conduit 124. The fluid supply conduit 170 may comprise any material, including any flexible or rigid material (e.g., any metal material, any plastic and/or rubber material, or the like). The fluid supply conduit 170 may comprise any known tubing having any dimensions. For example, the fluid supply conduit 170 may comprise PVC tubing that may be transparent, opaque, and/or translucent.

Figure 2:
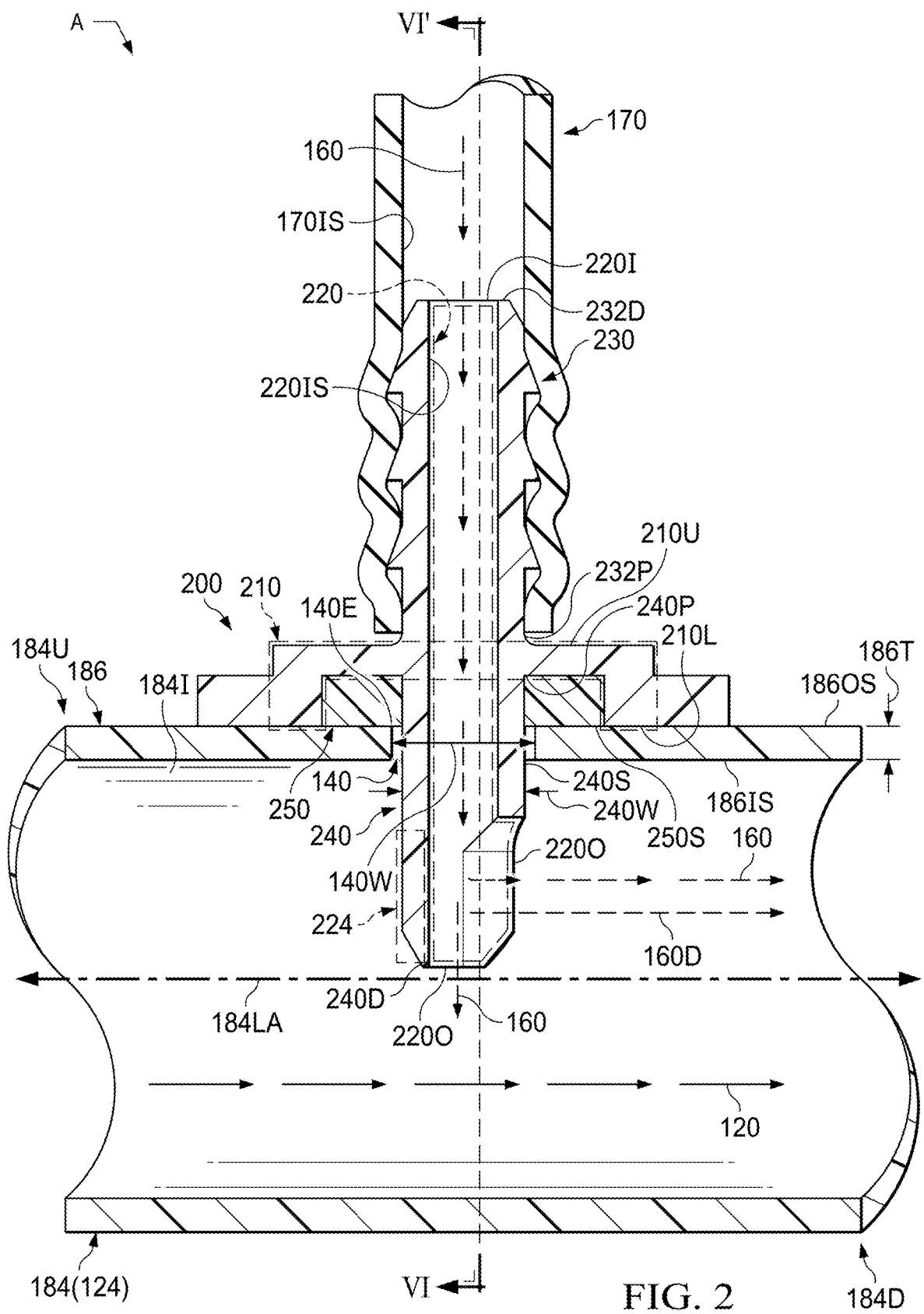
FIG. 2 is an expanded cross-sectional view of region A of FIG. 1, according to some example embodiments.
Figure 10:
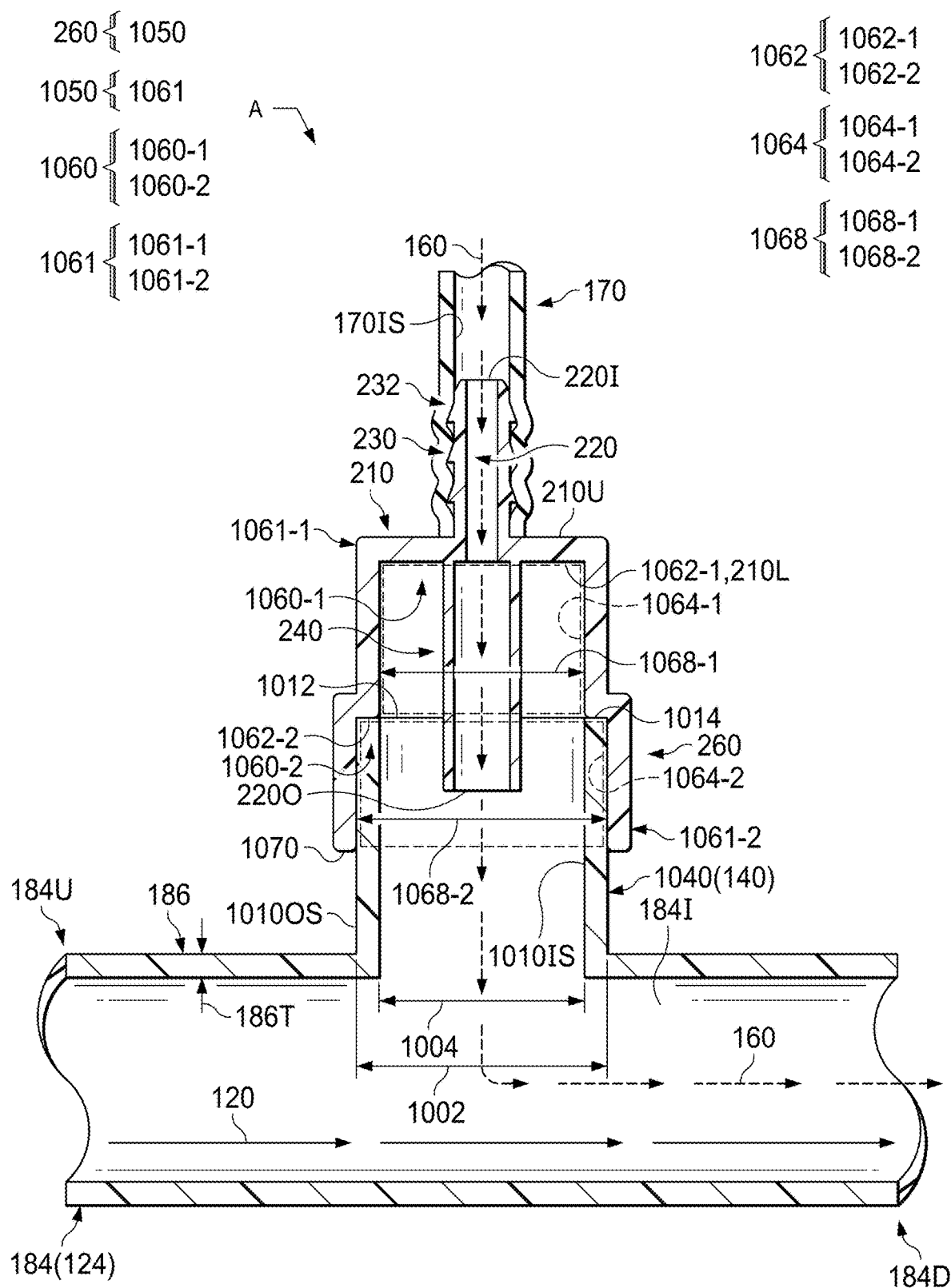
FIG. 10 is an expanded cross-sectional view of region A of FIG. 1, showing an adaptor device providing a fluid connection into a conduit section interior of an open access point opening of an open conduit section of a condensate drain line, according to some example embodiments.

As shown in FIG. 1, and as further shown in at least FIGS. 2 and 10, an adaptor device 200, which may be referred to herein interchangeably as a "conduit access adaptor device," may be coupled to the conduit 124 (e.g., condensate drain line) at a particular portion thereof, said portion herein being referred to as a conduit section 184, to establish fluid communication between an interior of the conduit 124 at the conduit section (herein, the conduit section interior 184I) and an exterior environment that is external to the conduit 124 via an adaptor conduit 220 that extends from an adaptor inlet 220I to an adaptor outlet 220O. The adaptor device 200 is configured to, based on being coupled to the conduit 124 and/or the conduit section thereof 184, provide the adaptor outlet 220O to be exposed to (e.g., located within) the conduit section interior 184I through an access point opening 140 into the conduit section interior 184I and to further provide the adaptor inlet 220I to be exposed to the exterior environment external to the conduit 124. The adaptor device 200 may be further configured to be coupled with the fluid supply source 150 (e.g., via coupling with one end of a fluid supply conduit 170 that is coupled at an opposite end thereof to the outlet 152 of the fluid supply source 150) to establish fluid communication between the adaptor inlet 220I and the outlet 152 of the fluid supply source 150. As a result, the adaptor device 200 may be coupled to the conduit section 184 and further coupled to the fluid supply source 150 (e.g., via fluid supply conduit 170) to enable the adaptor device 200 to fluid 160 dispensed by the fluid supply source 150 to flow into the conduit section interior 184I of the conduit section 184 of the conduit 124 via the adaptor conduit 220 of the adaptor device 200. and any fluid supply conduit 170 that may connect the adaptor inlet 220I to the outlet 152 of the fluid supply source 150. The adaptor device 200 may be considered to be part of the system 100 or separate from the system 100.

Accordingly, fluid 160 (e.g., cleaning composition) that is dispensed by the fluid supply source 150 (e.g., cleaner dispensing system) may be directed (e.g., by at least the fluid supply conduit 170 and the adaptor device 200) into an interior of at least a portion (e.g., conduit section interior 184I of conduit section 184) of the conduit 124, where such fluid 160 may include cleaning composition and thus may mitigate (e.g., clean, break down, remove, etc.) various substances (e.g., biological material, including mold, algae, mildew, bacteria, and/or fungi) that may be accumulated in the interior of the conduit 124, thereby reducing the risk of backflow of fluid 120 (e.g., condensate) in the system 100 (e.g., backflow in a conduit 124 that includes a condensate drain line which may further accumulate back into a drip pan 122 of a process unit 102 that includes an air handler via conduit inlet 128, etc.) which might cause overflow of fluid 120 (e.g., condensate) in the system 100, process unit 102, and/or structure 1. Thus, the adaptor device 200, based on enabling supply of fluid 160 (e.g., cleaning composition) into the interior of the conduit 124, may improve operational performance of the system 100 and reduce the risk for damage to the system 100, process unit 102, and/or structure 1 due to backflow of fluid 120 (e.g., condensate) in the conduit 124 (e.g., condensate drain line.

As described herein, a fluid 160 that includes a cleaning composition may be any known chemical composition (e.g., solution, liquid, fluid, etc.) that may be configured to clean (e.g., remove, break down, etc.) potential buildup substances, also referred to herein as biological substances (e.g., mold, algae, mildew, bacteria, and/or fungi), from a surface of the system 100, including for example an inner surface of the conduit 124, any combination thereof, or the like. In some example embodiments, the fluid 160 may include a cleaning composition that may be a chemical substance that is or includes a chelating agent (e.g., chelant) including, for example, sodium hexametaphosphate, that is configured to remove potential buildup substances from one or more portions of the air conditioning system based on chelation upon contact with the potential buildup substances. For example, the fluid 160 may include a cleaning composition that may be a liquid solution that includes 3%-7% sodium hexametaphosphate, by weight of the total weight of the cleaning composition. Based on the adaptor device 200 being configured to direct fluid 160 that includes a cleaning composition and which is received at the adaptor device 200 from the fluid supply source 150 to one or more portions of the system 100, the adaptor device 200 may be configured to enable removal of potential buildup substances (e.g., mold, algae, mildew, bacteria, and/or fungi) from one or more portions of the system 100 (e.g., the interior of at least a portion of the conduit 124) based on directing the fluid 160 into the interior of the conduit 124 (e.g., at least the conduit section interior 184I), which may thereby reduce or prevent the occurrence of backflow and/or overflow in the system 100 (e.g., backflow and/or overflow of the condensate drain line conduit 124 and/or drip pan 122 due to clogging, reduce or prevent the reduction in heat transfer performance of the heat exchanger 104 due to the potential buildup substances, any combination thereof, or the like).

In some example embodiments, the fluid supply source 150 may be configured to dispense (e.g., pump, spray, etc.) the fluid 160 into at least a portion of the system 100 without human intervention (e.g., automatically), for example to dispense discrete amounts (e.g., a particular amount, which may be a particular volume and/or particular mass) of the fluid 160 at a particular (or, alternatively, predetermined) fixed time interval, thereby reducing or preventing accumulation of the various substances in one or more portions of the system 100 while reducing or minimizing human intervention and/or effort expended to implement the dispensing. Because the fluid supply source 150 is configured to dispense the fluid 160 (e.g., repeatedly at a fixed time interval, also referred to herein as a dispensing time interval) without human intervention, the accumulation of potential substances (e.g., biological materials including mold, algae, mildew, bacteria, and/or fungi) in one or more portions of the system 100 (e.g., in the condensate drain line) may be reduced, removed, or prevented, based on the fluid 160 (e.g., cleaning composition) being directed into at least a conduit section 184 of the conduit 124 by the adaptor device 200. Such reduction, removal, or prevention of substance accumulation in the system 100 may thereby improve overall efficiency and/or performance of the system 100 for example at least with regard to cooling the return air 106 in example embodiments where the system 100 includes an air conditioning system as shown in FIG. 1, and may further reduce or prevent the likelihood of fluid 120 (e.g., condensate) backup and/or overflow which might otherwise result in shutdown of at least the process unit 102 (e.g., air handler) and/or system 100, flooding damage to the process unit 102 and/or structure in which the process unit 102 is located, or the like. Because human intervention is not required to implement the dispensing (of the cleaning composition, particularly dispensing of a fluid 160 that includes a cleaning composition repeatedly at a fixed time interval, the likelihood of such accumulation resulting in significant reduction in system 100 (e.g., air conditioning system) performance and/or efficiency, and/or resulting in damage to at least one of the system 100, the process unit 102, or the structure 1, due to a missed or forgotten manual dispensing of cleaning composition by a human operator is reduced or prevented, thereby improving operational performance and/or efficiency of the system 100 and reducing workload by a human operator.

The fluid supply source 150 may include a dispenser device that is configured to operate (e.g., actuate as a valve, operate as a pump, etc.) to dispense an amount of a fluid 160 (e.g., through the outlet 152) and a dispenser controller that is configured to operate the dispenser device to dispense the amount of the fluid 160. The fluid supply source 150 may include a fluid source that may be in fluid communication with an inlet of the dispenser device, such that the dispenser device may be configured to dispense fluid 160 received from the fluid source to the outlet 152 of the fluid supply source 150 and thus to a location external to the fluid supply source 150 via the outlet 152. In some example embodiments, the fluid source may be a detachable cartridge that is separate from a base (also referred to herein interchangeably as a base device, a base structure, a base apparatus, a fluid supply source base, or the like) that includes the dispenser device and the dispenser controller, where the cartridge may be detachably coupled to the base to reversibly establish flow communication between the cartridge interior (e.g., cartridge reservoir) and the inlet of the dispenser device. However, it will be understood that example embodiments are not limited thereto. For example, in some example embodiments the fluid source may be a fixed reservoir that is integral to (e.g., not removable from) the base of the fluid supply source 150. In another example, the fluid source may be a fluid port that is configured to receive the fluid 160 from an external supply source via a conduit coupled to the fluid port.

The dispenser device of the fluid supply source 150 may include any device configured to be controlled to control a flow of an amount of fluid 160. In some example embodiments, the dispenser device may include at least one valve that is configured to be actuated to be selectively opened (e.g., to selectively open a flow path through the at least one valve) based on a control signal generated by the dispenser controller to establish a flow path through the at least one valve and through which the fluid 160 may flow (e.g., a flow path from the fluid supply source to the outlet 152). For example, a valve of the dispenser device as described herein may include an electromechanically operated valve, including a solenoid valve, which may be selectively actuated based on a control signal from the dispenser controller. In some example embodiments, the dispenser device may include any known pump, including any known positive displacement pump, rotary pump, worm pump, gear pump, or the like that is configured to operate for a particular period of time to move the amount of the fluid 160 from an inlet of the dispenser device which is in fluid communication with the cleaning composition supply source to an outlet of the dispenser device which is in fluid communication with the outlet 152, based on a control signal generated by the dispenser controller.

The dispenser controller may, in some example embodiments, include a memory (e.g., a solid state drive, or SSD), also referred to herein as a dispenser memory, storing a program of instructions (referred to herein as a program of dispenser instructions) and a processor (e.g., a central processing unit, or CPU), also referred to herein as a dispenser processor, configured to execute the program of instructions to implement the functionality of the dispenser controller as described herein. Accordingly, where a dispenser controller and/or a fluid supply source 150 is described herein to perform or be configured to perform any functionality, function, operation, method, or the like, it will be understood that the dispenser controller may include a dispenser memory storing a program of dispenser instructions and a dispenser processor configured to execute the program of dispenser instructions to perform (or to configure the dispenser controller and/or the fluid supply source 150 to perform) the functionality, function, operation, method, or the like of the dispenser controller and/or of the fluid supply source 150.

In some example embodiments, the operation of the dispenser device by the dispenser controller may include operating the dispenser device to dispense the fluid 160 (e.g., move the fluid 160 from an inlet of the dispenser device that is in fluid communication with the fluid supply source to an outlet of the dispenser device that is in fluid communication with the outlet 152 of the fluid supply source 150) for a particular duration of time. Such a particular duration of time may be, for example 3 seconds, 5 seconds, or the like, but example embodiments are not limited thereto. In some example embodiments, the operation of the dispenser device by the dispenser controller may include operating the dispenser device 206 of the dispensing duration in response to an elapse of a particular time interval since a previous operation of the dispenser device (e.g., since the beginning or end of the previous operation). Such a time interval may be, for example, 7 days, 168 hours, or the like, but example embodiments are not limited thereto. For example, in some example embodiments, the fluid supply source may be configured to hold a total volume of 36 oz of fluid 160, so that, in some example embodiments where the one or more dispenser parameters includes a dispensing time interval that is 7 days and a dispensing duration that corresponds to causing the dispenser device to dispense 3 oz of fluid 160, the fluid supply source 150 may be configured to operate the dispenser device thereof according to one or more parameter values of the one or more dispenser parameters to dispense 3 oz of fluid 160 (e.g., cleaning composition) through the outlet 152 every 7 days for a period of 12 weeks (84 days).

Still referring to FIG. 1, and further referring to FIGS. 2, 3A-3I, 10, 11A-11F, 14A-14B, and 15, in some example embodiments an adaptor device 200 may be coupled to at least a conduit section 184 of the conduit 124 to establish a fluid connection between an external environment external to the conduit 124 (including for example a fluid supply source 150) and a conduit section interior 184I of at least the conduit section 184 of the conduit 124 through an access point opening 140 in the conduit section 184. The adaptor device 200 may be further configured to be coupled to the fluid supply source 150 (e.g., the outlet 152 thereof) to establish a fluid connection between the fluid supply source 150 (e.g., via connection with an end of a fluid supply conduit 170 that is connected at an opposite end to the outlet 152 of the fluid supply source 150) and the conduit section interior 184I of at least the conduit section 184 through an access point opening 140 into the conduit section interior 184I, thereby enabling the fluid 160 supplied by the fluid supply source 150 to be directed into at least a portion of the conduit 124. For example, in example embodiments where the conduit 124 is a condensate drain line and the fluid supply source 150 is a cleaner dispensing system that dispenses a fluid 160 that includes a cleaning composition, the adaptor device 200 may be configured to enable such cleaner composition that is supplied from the cleaner dispensing system to be directed into the interior of the condensate drain line via the access point opening 140 to mitigate (e.g., remove, clean, break down, etc.) biological materials within the condensate drain line to mitigate or prevent condensate backflow therein.

As described further below, in some example embodiments, the adaptor device 200 may include an adaptor conduit structure at least partially defining an adaptor conduit extending between an adaptor inlet and an adaptor outlet, an inlet connector configured to couple with the fluid supply source externally to the conduit section to cause the adaptor inlet to be in fluid communication with the fluid supply source, and a conduit connector configured to engage the conduit section to couple the adaptor device to the conduit section to at least partially align the adaptor outlet with the access point opening to establish fluid communication from the adaptor inlet to the conduit interior through at least the adaptor conduit and the access point opening.

In some example embodiments, and as described further below with reference to at least FIGS. 10-15, the conduit section 184 of the conduit 124 that includes the access point opening 140 may be a conduit section 184 that includes a conduit section (referred to herein as an "open" access point opening) extending to an opening (e.g., end opening 1012, also referred to herein as a port) at one end and extending into the conduit 124 at the opposite end, where the opening may be independent of the conduit inlet 182 and the conduit outlet 130 defining opposite ends of a flow path through the entire length of the conduit 124, and where the opening may be exposed or may be covered with a cap that may be removed to expose the opening, for example a T-junction having a branch with an exposed opening (e.g., end opening 1012) or an opening covered with a removable cap. Such a conduit section may be referred to as an "open" access point opening 140, such that the conduit section 184 and/or the conduit 124 may be referred to as being "open", and the adaptor device 200 may be coupled to such an access point opening 140 defined by the conduit segment 1010 at one end (e.g., axial end 1014 including the end opening 1012) and further coupled to the fluid supply source 150 at another end to establish the fluid connection between the fluid supply source 150 and the conduit section interior 184I. Such an adaptor device 200, including for example the adaptor devices 200 shown and/or described with reference to FIGS. 10-15, may be referred to herein as an open conduit adaptor device.

In some example embodiments, and as described further below with reference to at least FIGS. 2-9, the access point opening 140 may be a conduit that extends through a sidewall thickness 186T of a conduit section sidewall 186 of at least the conduit section 184 of the conduit 124 to establish fluid communication between the conduit section interior 184I and the exterior of the conduit 124 through the sidewall thickness 186T. In some example embodiments, such an access point opening 140 may be initially absent from the conduit section 184, such that the conduit section 184 (and in some example embodiments the entirety of the conduit 124 between the conduit inlet 128 and the conduit outlet 130) may be a "closed" conduit extending between opposite ends and defined by an inner sidewall surface 186IS of a conduit section sidewall 186 of the conduit section 184 that does not include any access point opening 140 extending into the conduit section interior 184I from an exterior of the conduit 124 independently of the conduit inlet 128 and the conduit outlet 130 (e.g., extending through a thickness direction of the sidewall thickness 186T that extends perpendicular to the longitudinal axis 184LA of the conduit section 184), such that the conduit section 184 initially omits any opening via which the adaptor device 200 may establish fluid communication with the adaptor conduit thereof (and through which the adaptor device may establish fluid communication between the conduit section interior 184I and the fluid supply source 150). The access point opening 140 may, in some example embodiments, be formed (e.g., based on drilling through the sidewall thickness 186T of the conduit section) and the adaptor device 200 may be coupled with the conduit 124 (e.g., coupled with at least the conduit section 184) to align an adaptor outlet 220O of an adaptor conduit 220 extending through the adaptor device 200 to be exposed to the conduit section interior 184I through the access point opening 140 through the sidewall thickness 186T of the conduit section 184, and a fluid connection between an adaptor inlet 220I of the adaptor conduit 220 and the fluid supply source 150 may be established to establish the fluid connection between the fluid supply source 150 and the conduit section interior 184I via the adaptor device 200 and the access point opening 140 through the sidewall thickness 186T of the conduit section 184. As a result, the adaptor device 200 may be enabled to provide fluid 160 (e.g., cleaning composition) from a fluid supply source 150 into the interior of the conduit 124 even when the conduit 124 initially does not include a preexisting "open" access point opening into the conduit 124 independently of the conduit inlet 128 and the conduit outlet 130 at opposite ends of the conduit 124 (e.g., at opposite ends of a flow path from the process unit 102 to an exterior of the system 100 through the entire length of the conduit 124) and/or the adaptor device 200 may be enabled to provide fluid 160 (e.g., cleaning composition) from a fluid supply source 150 into the interior of the conduit 124 via an access point opening 140 that extends through a sidewall thickness 186OS of the conduit section sidewall 186 extending between (e.g., entirely between as shown in at least FIGS. 2, 6A-6H, 7A-7H, and 8) the outer sidewall surface 186OS and the inner sidewall surface 186IS of the conduit section 184. Such an adaptor device 200, including for example the adaptor devices 200 shown and/or described with reference to FIGS. 2-9, may be referred to herein as a closed conduit adaptor device.

Figure 14A:
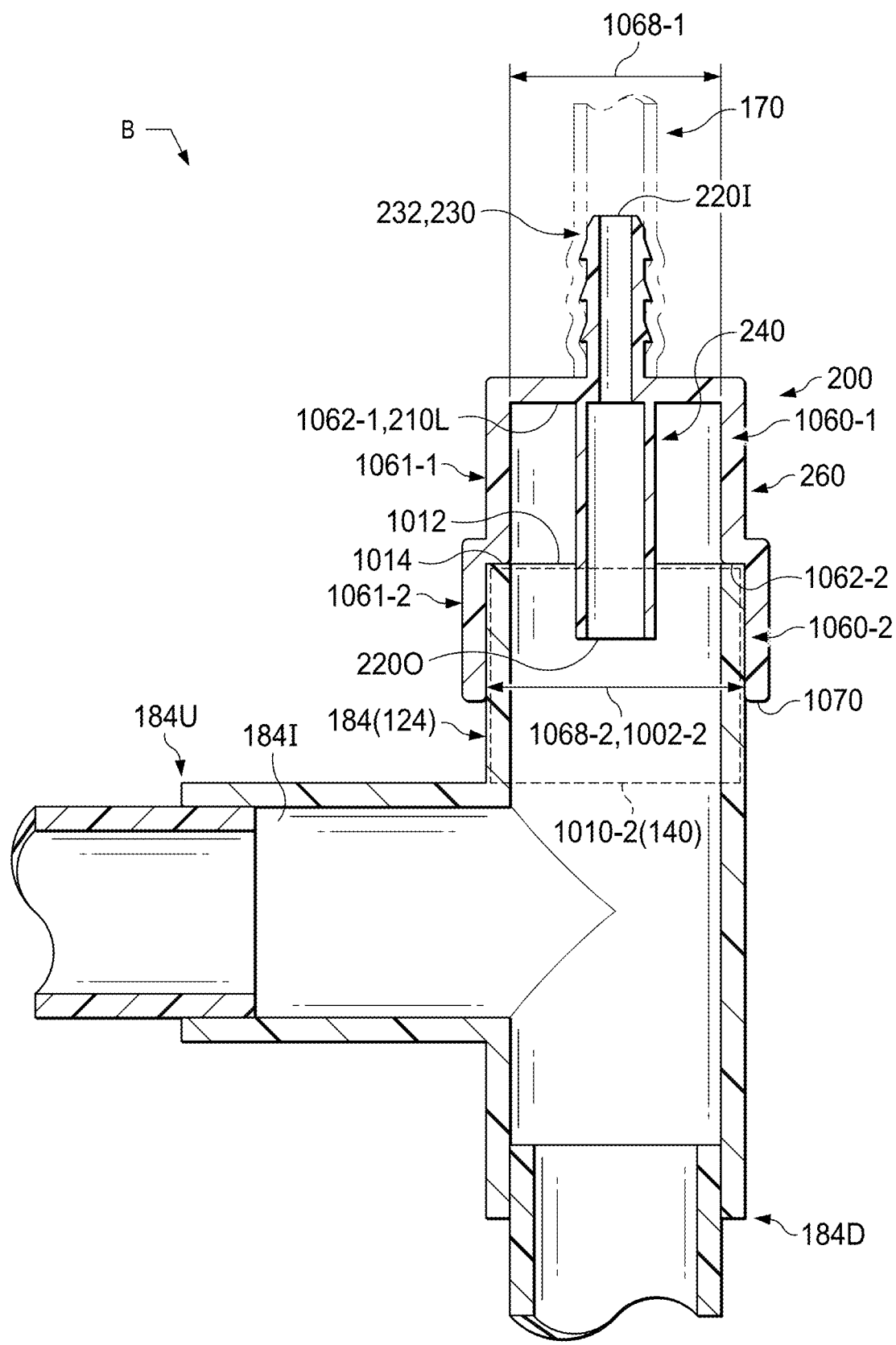
FIGS. 14A and 14B are expanded cross-sectional views of region B of FIG. 1, showing an adaptor device providing a fluid connection into a conduit section interior of an open access point opening of an open conduit section of a condensate drain line, according to some example embodiments.
Figure 14B:
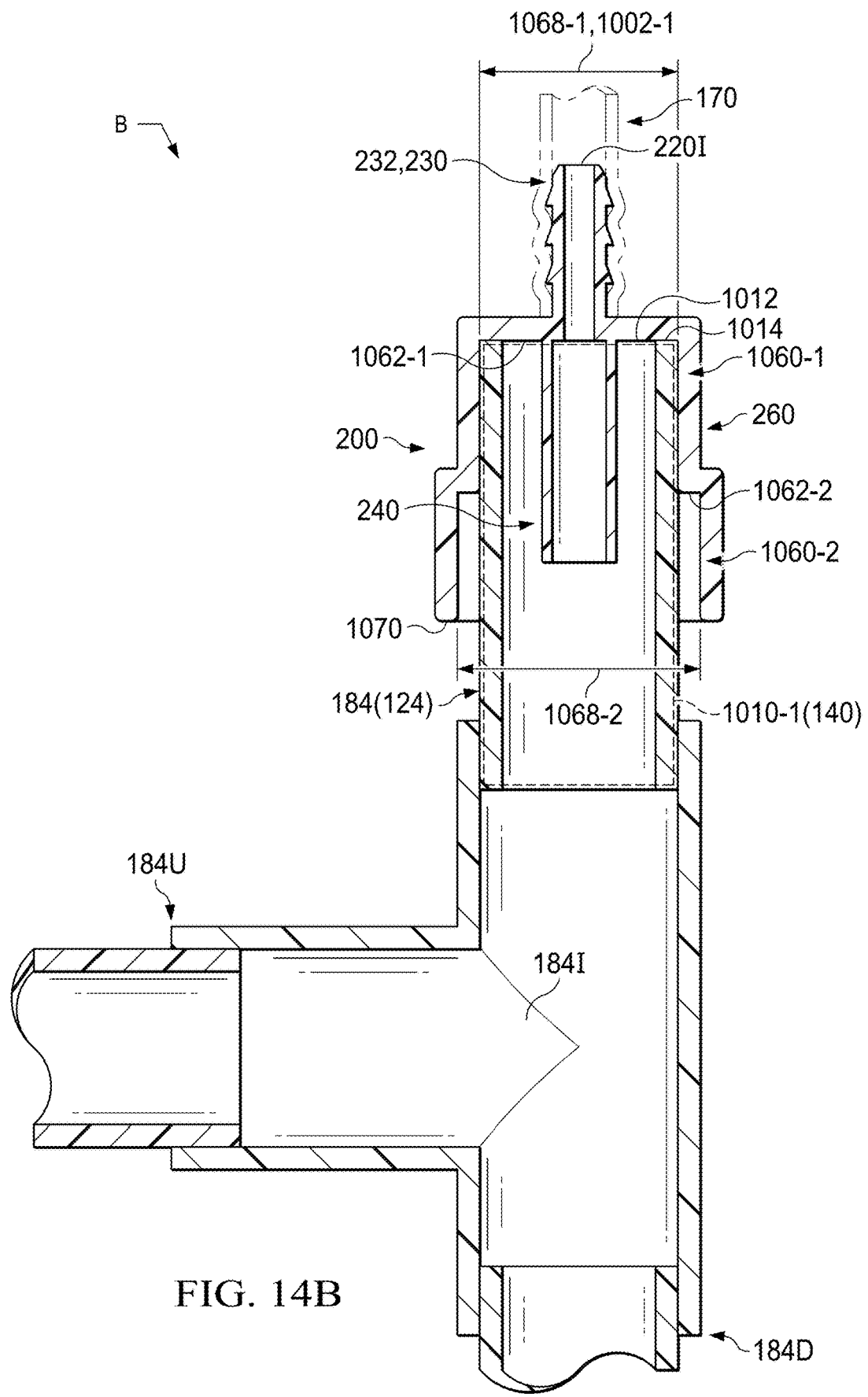

FIG. 1 illustrates an adaptor device 200 in region A that is coupled to a conduit section (which may include an "open" or "closed" conduit section 184 as shown in FIGS. 2 and 10) so as to be configured to direct fluid 160 into at least the conduit section 184 interior through an access point opening 140 having a longitudinal axis (e.g., central longitudinal axis) extending in a direction crossing (e.g., perpendicular to) the longitudinal axis of the conduit section 184 (e.g., through the sidewall thickness of the conduit section sidewall as described herein with regard to at least FIGS. 2-9). In addition FIG. 1 also illustrates that, in some example embodiments, an adaptor device 200 may be in region B to be coupled to a conduit segment 1010 (as shown in FIGS. 14A and 14B) where the longitudinal axis (e.g., central longitudinal axis) of the conduit segment defining the access point opening 140 may be parallel to an upstream or downstream end of the conduit segment 184. it will be understood that, for a given conduit 124, an adaptor device 200 may be coupled to a conduit section 184 of the conduit 124 as shown in region A (e.g., in FIGS. 2 and/or 10) and not as shown in region B (e.g., in FIGS. 14A and/or 14B) or an adaptor device 200 (e.g., a different adaptor device 200) may be coupled to a conduit section 184 as shown in region B (e.g., in FIGS. 14A and/or 14B) and not as shown in region A (e.g., in FIGS. 2 and/or 10), but example embodiments are not limited thereto. For example, in some example embodiments multiple adaptor devices 200 may be coupled to separate, respective conduit sections of a conduit 124, where each adaptor device 200 may be coupled to the conduit 124 according to any of the example embodiments, including any of the example embodiments as shown in region A (e.g., in FIGS. 2 and/or 10) and/or any of the example embodiments as shown in region B (e.g., in FIGS. 14A and/or 14B).

While example embodiments herein describe a fluid supply source 150 that may include a cleaner dispensing system that dispenses a fluid 160 that may include a cleaner composition into a conduit section 184 of a conduit 124 that may include a condensate drain line of a system 100 that may include an air conditioning system, it will be understood that example embodiments are not limited thereto. For example, the conduit section 184 may be a conduit section of a conduit 124 that is configured to direct any fluid (e.g., any liquid) along a flow path extending from the conduit inlet 128 at one end of the conduit 124 to a conduit outlet 130 at an opposite end of the conduit 124, and the description herein of any example embodiments including the conduit 124 and the conduit section 184 thereof may be applied to any example embodiments including at least one conduit (e.g., any fluid conduit) that is configured to direct any fluid (e.g., any liquid) and any conduit section thereof. For example, the conduit section 184 may be a pipe, tube, tubing, or the like that defines a conduit section interior 184I therein and is configured to direct any fluid through the conduit section interior 184I thereof, and the description herein of any example embodiments including the conduit section 184 may apply to example embodiments including any conduit section, segment, piece, or the like of any conduit. For example, the system 100 may be understood to be an example of a process, machinery, equipment or the like which is configured to cause a fluid to flow through a conduit (e.g., a pipe) that includes the conduit section 184 as a section of such conduit, and any descriptions of any example embodiments including the system 100 and the conduit 124 thereof may be applied to example embodiments including any process, machinery, equipment or the like which is configured to cause a fluid to flow through a conduit (e.g., a pipe) that includes the conduit section 184 as a section of such conduit. For example, a cleaner composition may be an example of a fluid 160 (e.g., any liquid) that may be supplied from a fluid supply source 150 into a conduit 124 via an adaptor device 200, and any descriptions herein of any example embodiments including a fluid 160 may apply to example embodiments including any fluid (e.g., any liquid). For example, the fluid supply source 150 that is configured to dispense a fluid 160 via an outlet 152 may be an example of a fluid supply source that is configured to provide a fluid (e.g., any fluid) via an outlet and which may be coupled to the adaptor device 200 (e.g., via a fluid supply conduit 170) to establish fluid communication between the fluid supply source 150 and the conduit section interior 184I of a conduit section 184 to which the adaptor device 200 is coupled such that the fluid supply source may dispense a fluid 160 that may be directed by the adaptor device 200 into the conduit section interior 184I of the conduit section 184, and any descriptions herein of example embodiments including a fluid supply source 150 that is configured to dispense a fluid 160 via an outlet 152 may be applied to any example embodiments including any fluid supply source that is configured to provide a fluid (e.g., any fluid) via an outlet and which may be coupled to the adaptor device 200 (e.g., via a fluid supply conduit 170) to establish fluid communication between the fluid supply source and the conduit section interior 184I of a conduit section 184 to which the adaptor device 200 is coupled.

Figure 3A:
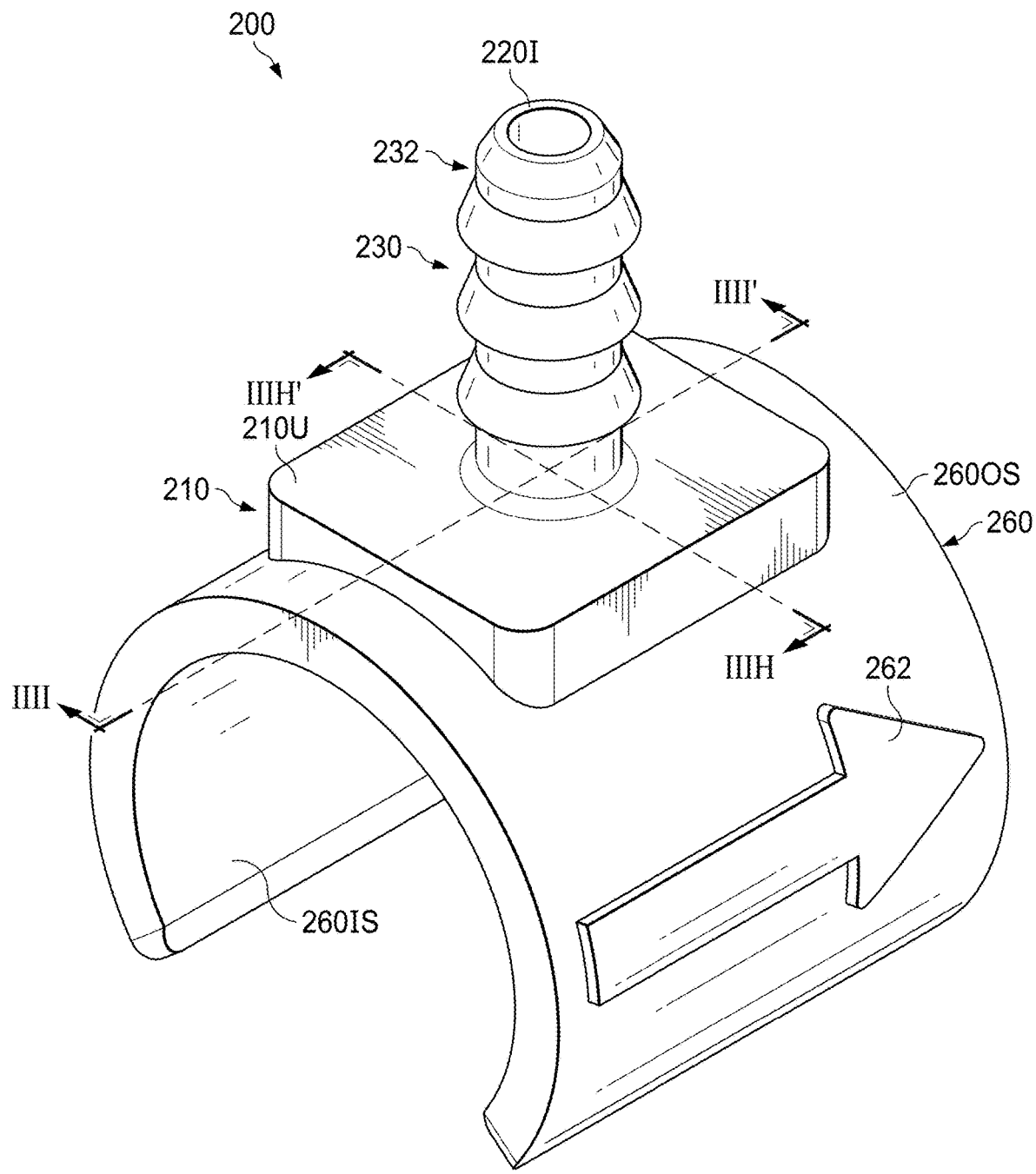
FIGS. 3A, 3B, 3C, 3D, 3E, 3F, and 3G are views of an adaptor device, according to some example embodiments.
Figure 3B:
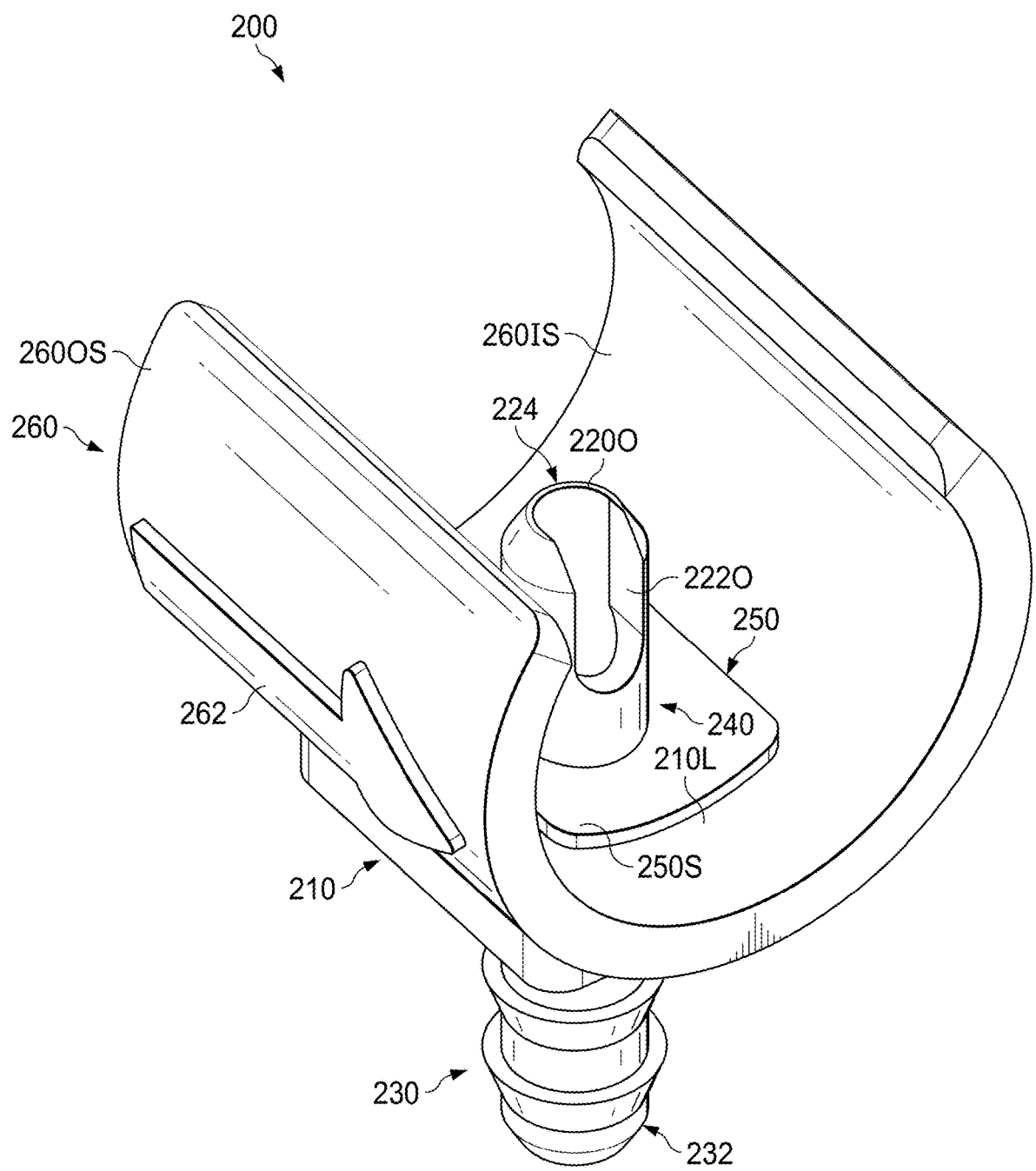
Figure 3C:
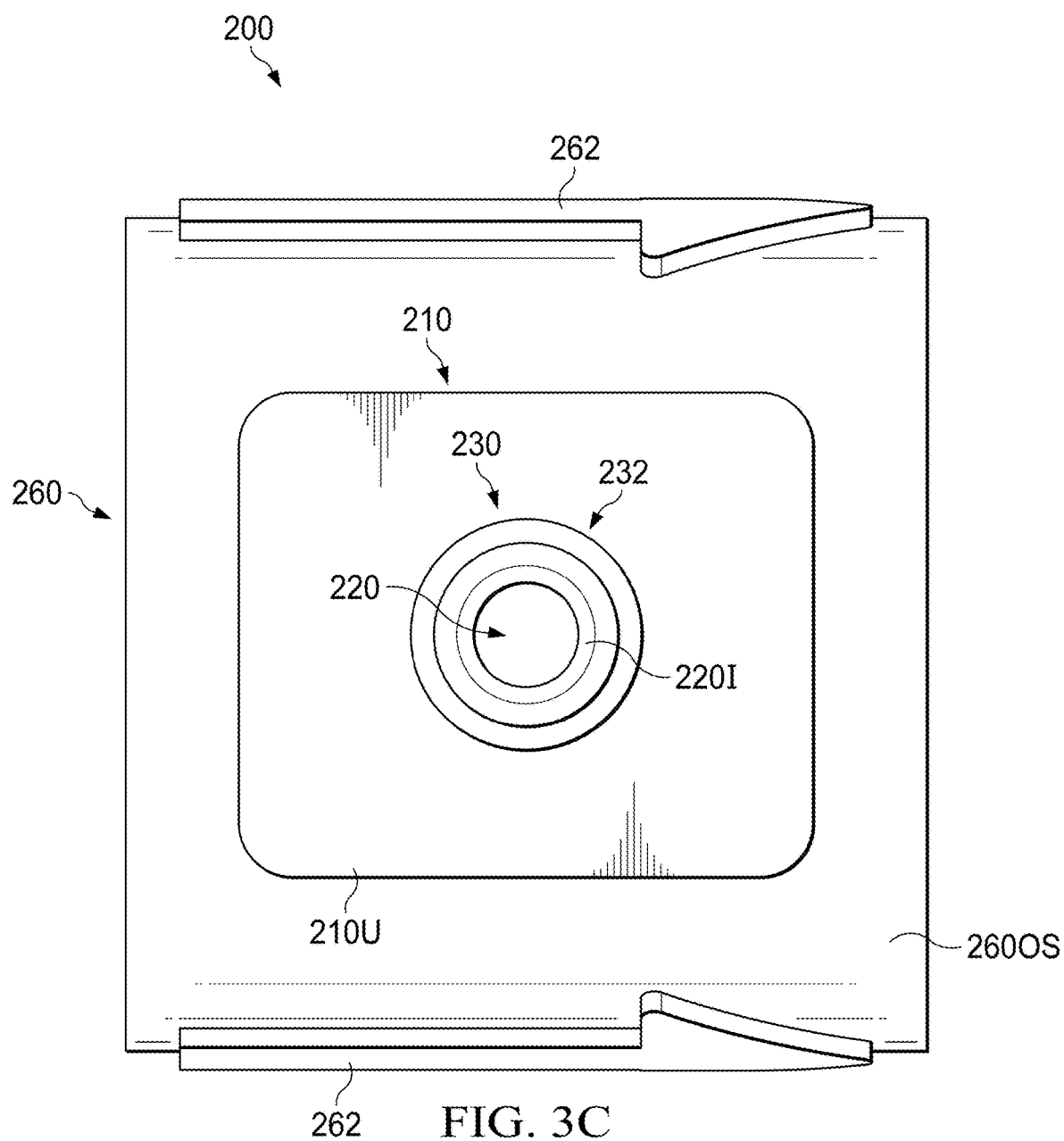
Figure 3D:
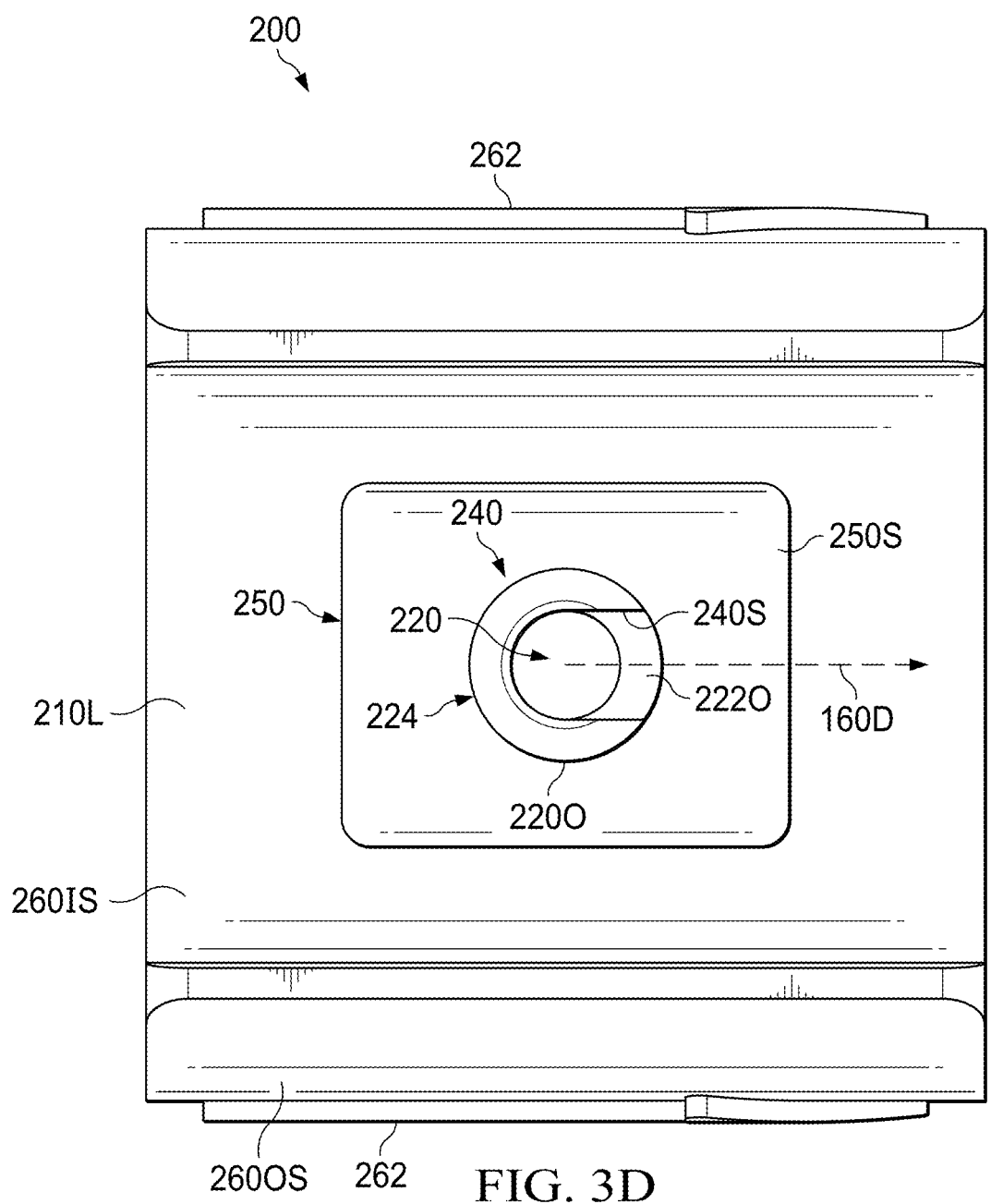
Figure 3E:
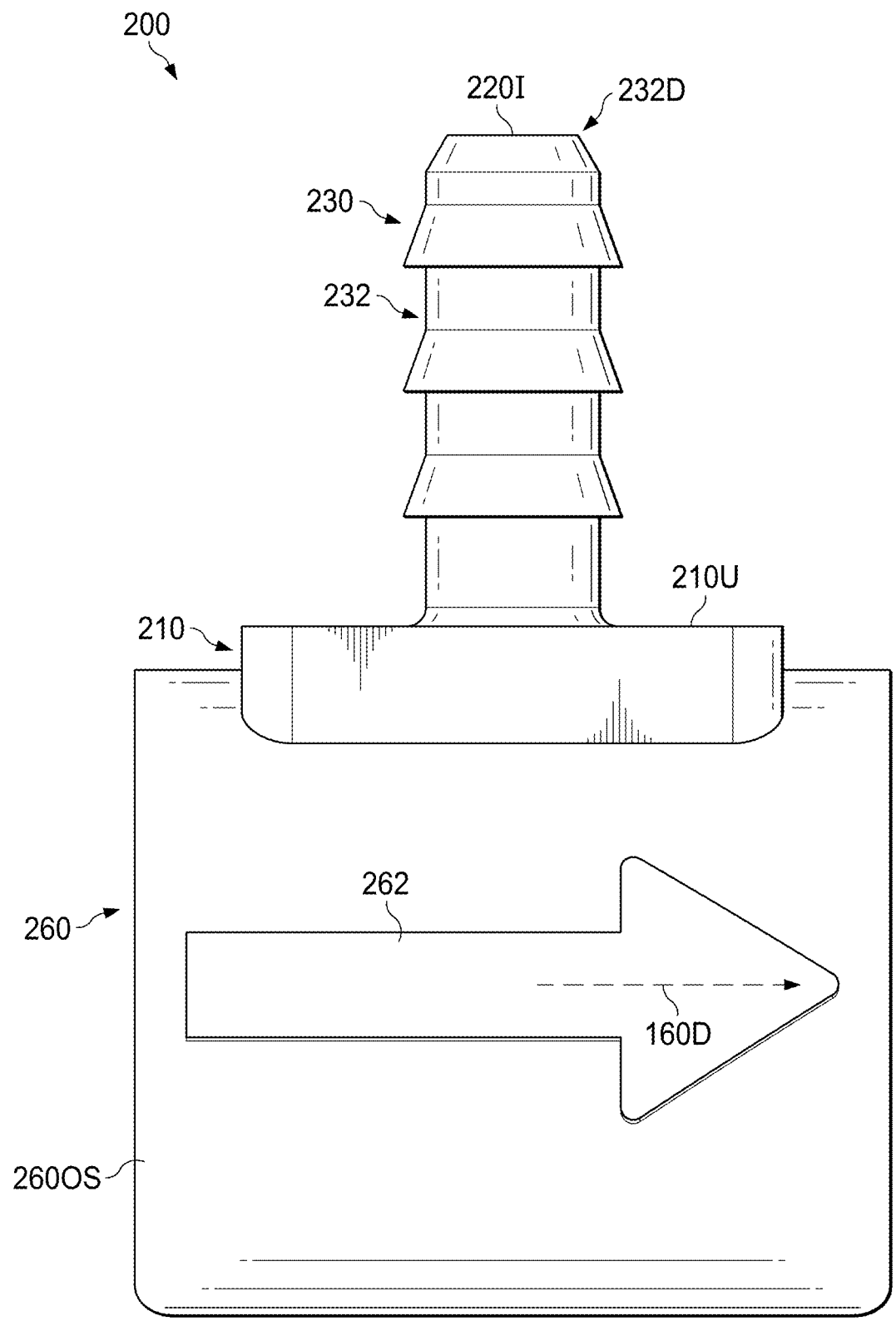
Figure 3F:
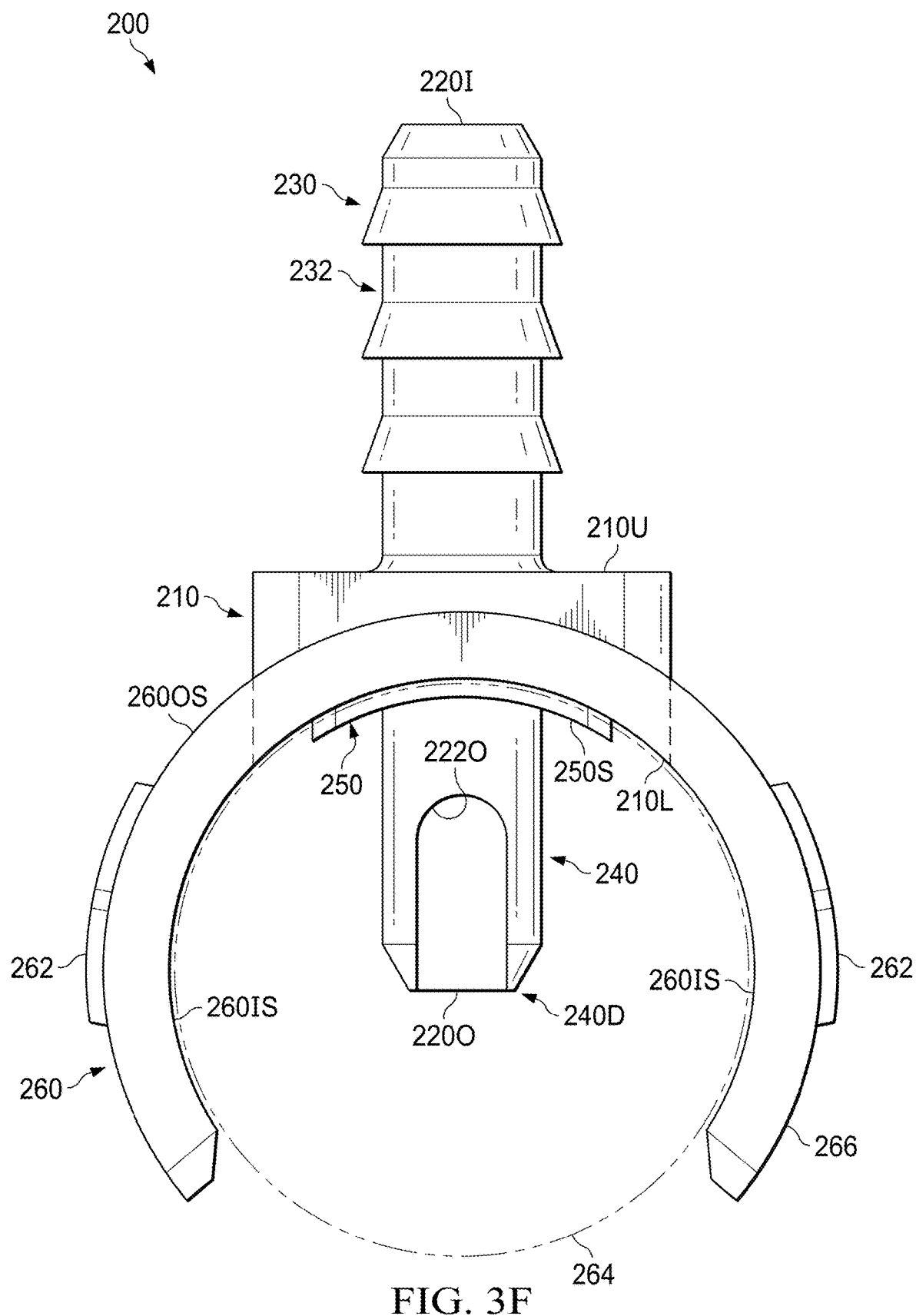
Figure 3G:
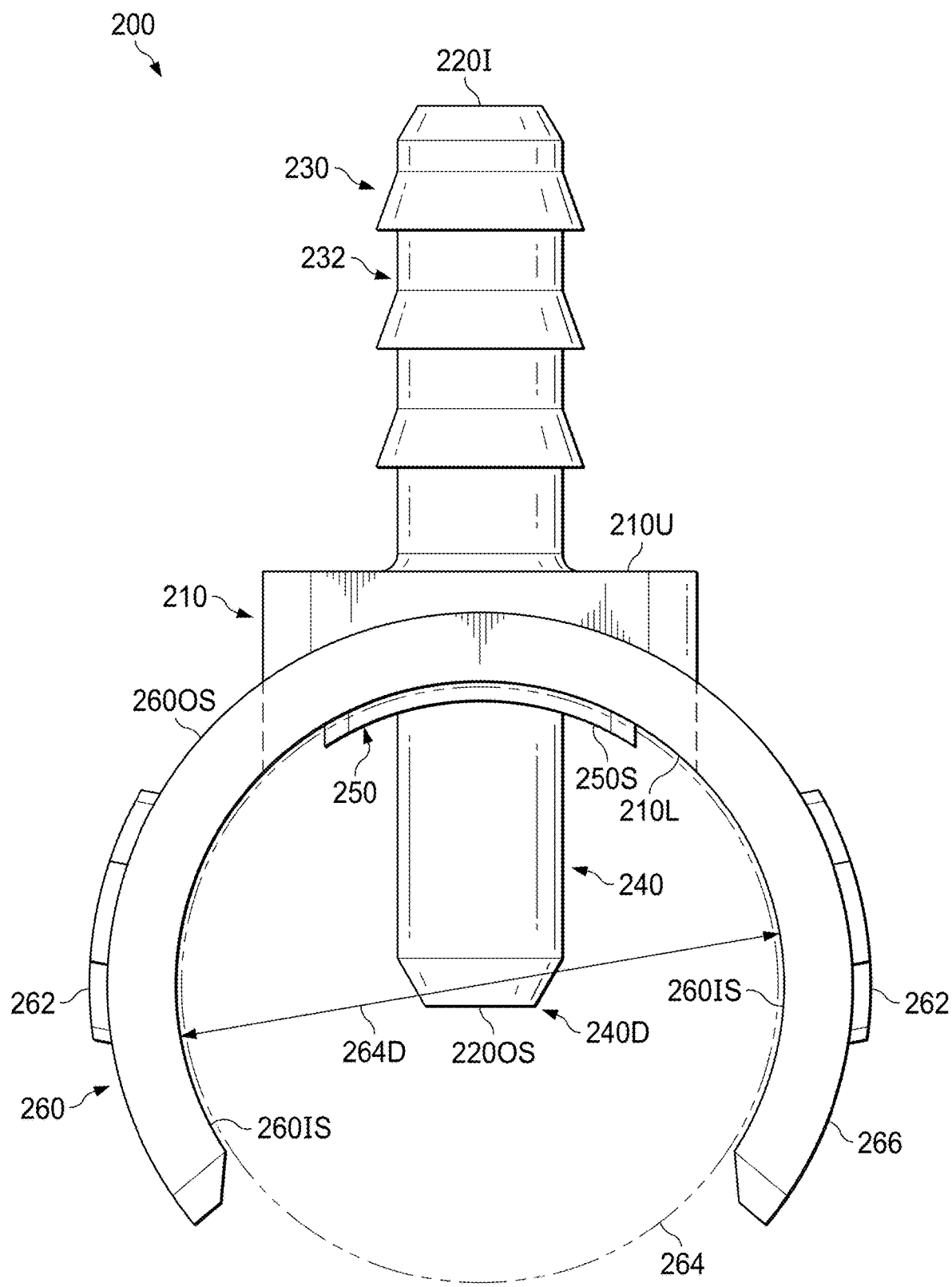
Figure 3H:
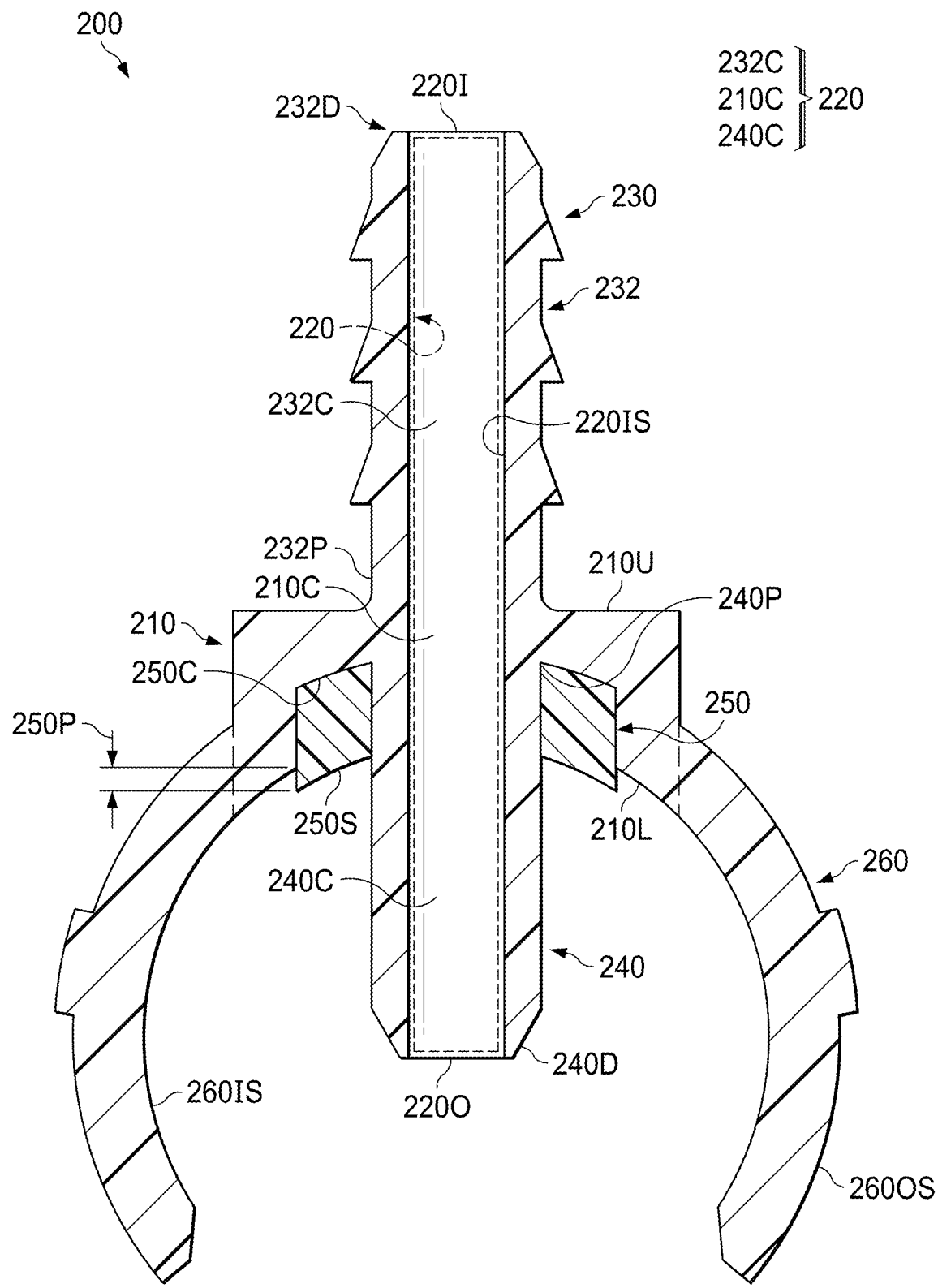
FIGS. 3H and 3I are cross-sectional elevation views of the adaptor device of FIGS. 3A-3G along cross-sectional view lines IIIH-IIIH' and IIII-IIII', respectively, shown in FIG. 3A, according to some example embodiments.
Figure 3I:
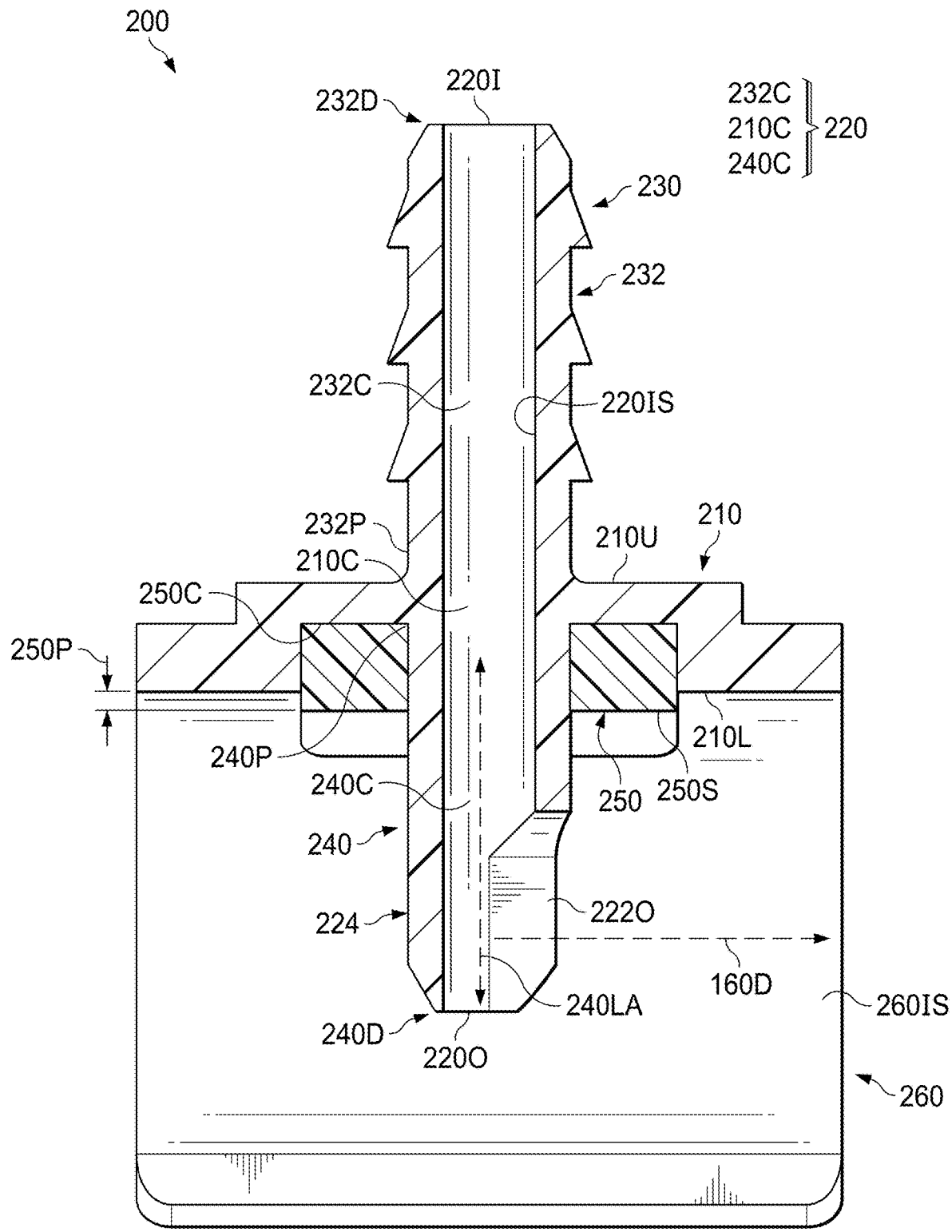

FIG. 2 is an expanded cross-sectional view of region A of FIG. 1, showing an adaptor device providing a fluid connection into a conduit section interior of a closed conduit section of a condensate drain line through a sidewall thickness of a conduit section sidewall of the conduit section, according to some example embodiments. FIGS. 3A, 3B, 3C, 3D, 3E, 3F, and 3G are views of an adaptor device, according to some example embodiments, where FIGS. 3A and 3B are top and bottom perspective views respectively, FIGS. 3C and 3D are top and bottom plan views respectively, and FIGS. 3E, 3F, and 3G are side, front, and rear elevation views, respectively. FIGS. 3H and 3I are cross-sectional elevation views of the adaptor device of FIGS. 3A-3G along cross-sectional view lines IIIH-IIIH' and IIII-IIII', respectively, shown in FIG. 3A, according to some example embodiments.

Referring to FIGS. 2 and 3A-3I, in some example embodiments an adaptor device 200 is configured to establish a fluid connection between a fluid supply source 150 (e.g., via a fluid supply conduit 170 coupled between the adaptor device 200 and an outlet 152 of the fluid supply source 150 as shown in FIG. 1) and a conduit section interior 184I of a conduit section 184 of a conduit through an access point opening 140 in the conduit section 184, where the access point opening 140 includes a conduit extending through a sidewall thickness 186T of a conduit section sidewall 186 of the conduit section 184 (e.g., extending perpendicular to the longitudinal axis 184LA of the conduit section 184). It will be understood that a longitudinal axis of an element as described herein, including for example the longitudinal axis 184LA of the conduit section 184, may be referred to interchangeably as a central axis of the element, a central longitudinal axis of the element, or the like.

In some example embodiments, including the example embodiments shown in FIGS. 2 and 3A-3I, the adaptor device 200 may include an adaptor conduit structure 210 that at least partially defines an adaptor conduit 220 extending between an adaptor inlet 220I and an adaptor outlet 220O. As shown, the adaptor conduit 220 may be at least partially defined by one or more inner surfaces 220IS of the adaptor conduit structure 210. As shown, the adaptor conduit structure 210 may include an upper end 210U, also referred to herein interchangeably as an upper surface and which may or may not be an uppermost surface of the adaptor conduit structure 210. As shown, the adaptor conduit structure 210 may include a lower end 210L, also referred to herein interchangeably as a lower surface and which may or may not be a lowermost surface of the adaptor conduit structure 210. As shown, the lower end 210L may be inwardly curved to be complementary to an outer sidewall surface 186OS of the conduit section sidewall 186 of the conduit section 184, in order to promote a flush fit or connection between the adaptor device 200 and the conduit section 184. In some example embodiments, the adaptor conduit structure 210 is a single piece of material. In some example embodiments, the adaptor conduit structure is formed from molded plastic. However, example embodiments are not limited thereto. As shown, the adaptor conduit 220 may include a portion 210C (e.g., a base conduit portion) extending through (e.g., defined by) the adaptor conduit structure 210 between the upper and lower ends 210U and 210L of the adaptor conduit structure 210.

The adaptor device 200 may include an inlet nozzle 232 extending to a distal end 232D from the upper end 210U of the adaptor conduit structure 210 (e.g., from a proximate end 232P that is at the upper end 210U to the distal end 232D), the inlet nozzle 232 defining the adaptor inlet 220I at the distal end 232D of the inlet nozzle 232 and further defining at least a portion 232C (also referred to herein as an inlet conduit portion) of the adaptor conduit 220 extending to the adaptor inlet 220I, such that the adaptor conduit 220 at least partially extends through the inlet nozzle 232 to the adaptor inlet 220I. As shown, the portions 232C and 210C of the adaptor conduit 220 may be open to each other and may collectively define a continuous portion of the adaptor conduit 220 as a single conduit extending from the adaptor inlet 220I to the lower end 210L of the adaptor conduit structure 210 and which may have a constant or variable inner diameter along its length. As shown, the inlet nozzle 232 may be integral to the adaptor conduit structure 210 so that the inlet nozzle 232 and the adaptor conduit structure 210 are separate portions of a single, unitary piece of material and/or such that the inlet nozzle 232 is configured to be a portion of the adaptor conduit structure 210. However, example embodiments are not limited thereto. In some example embodiments the inlet nozzle 232 may be omitted. In some example embodiments the inlet nozzle 232 may include a separate piece of material that is coupled to the adaptor conduit structure 210.

The adaptor device 200 may include an inlet connector 230 configured to couple with the fluid supply source 150 externally to the conduit section to cause the adaptor inlet 220I to be in fluid communication with the fluid supply source. As shown, the inlet connector 230 may be at least partially defined by the inlet nozzle 232 extending from the upper end 210U of the adaptor conduit structure 210 to the distal end 232D, such that the inlet nozzle 232 may be considered to be a part of the inlet connector 230 (or alternatively the inlet connector 230 may be considered to be a part of the inlet nozzle 232), but example embodiments are not limited thereto.

The inlet nozzle 232 and/or the inlet connector 230 may be integral with the adaptor conduit structure 210 such that the adaptor conduit structure 210, together with the inlet nozzle 232 and/or the inlet connector may be separate portions of a single, unitary piece of material. However, example embodiments are not limited thereto, and in some example embodiments at least one of the inlet connector 230 or the inlet nozzle 232 at least partially defining the inlet connector 230 and/or the adaptor inlet 220I may be included in a separate piece of material from that of the adaptor conduit structure 210 and may be coupled to the adaptor conduit structure 210.

In some example embodiments, and as shown in at least FIG. 2, the inlet connector 230 may include a fitting configured to engage an inner surface 170IS of a fluid supply conduit 170 based on being inserted into the fluid supply conduit 170 (e.g., at one end of the fluid supply conduit 170). The fluid supply conduit 170 may include any length of flexible tubing that is configured to flex around a surface of the fitting to engage the fitting (e.g., via compression). As shown, the inlet connector 230 may include a male barbed connector fitting that is configured to engage an inner surface 170IS of a fluid supply conduit 170 (e.g., flexible tubing, PVC tubing, etc.), but example embodiments are not limited thereto. As shown in FIG. 1, an opposite end of the fluid supply conduit 170 may be connected to the outlet 152 of the fluid supply source 150 so as to establish fluid communication between the adaptor inlet 220I and the fluid supply source 150 and thus enable fluid 160 that is output (e.g., supplied, discharged, etc.) from the fluid supply source 150 via the outlet 152 to be directed to the adaptor inlet 220I and thus directed through the adaptor conduit 220 via the adaptor inlet 220I.

While the inlet connector 230 is shown to be at least partially defined by the inlet nozzle 232 which further defines the adaptor inlet 220I and at least a portion of the adaptor conduit 220 (e.g., inlet conduit portion 232C), example embodiments are not limited thereto. In some example embodiments, the inlet connector 230 may be completely separate from the adaptor inlet 220I and/or any structure such as an inlet nozzle 232 defining the adaptor inlet 220I. For example, in some example embodiments the inlet nozzle 232 may extend from the upper end 210U of the adaptor conduit structure 210 to define the adaptor inlet 220I at the distal end 232D thereof while the inlet connector 230 may be a separate structure and/or device coupled to a different portion of the adaptor conduit structure 210 and configured to engage a fluid supply source 150 and/or fluid supply conduit 170 to hold an end of the fluid supply source 150 and/or fluid supply conduit 170 in fluid communication with (e.g., on, covering, engaging, contacting, etc.) the adaptor inlet 220I.

In some example embodiments, the conduit 124 may include a condensate drain line of an air conditioning system and may be configured to direct a separate fluid 120 that includes a condensate from a drip pan of an air handler of the air conditioning system to a condensate drain outlet (e.g., conduit outlet 130) through at least the conduit section interior 184I, the fluid 160 may include a cleaning composition, the fluid supply source 150 may include a cleaner dispensing system configured to dispense the cleaning composition, and the adaptor device 200 may be configured to, based on being coupled to both the conduit section 184 and the fluid supply source (e.g., cleaner dispensing system), receive cleaning composition at the adaptor inlet 220I from the cleaner dispensing system based on the cleaner dispensing system dispensing the cleaning composition through an outlet thereof, and direct the received cleaning composition through the adaptor conduit 220 and into the conduit section interior 184I to be supplied into at least a portion of the condensate drain line to cause at least some biological substances to be removed from at least a portion of the condensate drain line. However, example embodiments are not limited thereto.

The adaptor device 200 may include a conduit connector 260. As shown, the conduit connector 260 may be a connector device that is configured to engage the conduit section 184 (e.g., the outer sidewall surface 186OS thereof) to couple the adaptor device 200 to the conduit section 184 to at least partially align the adaptor outlet 220O with the access point opening 140 to establish fluid communication from the adaptor inlet 220I to the conduit section interior 184I through at least the adaptor conduit 220, where the adaptor conduit 220 is aligned with, and thus exposed to and/or at least partially extending through the access point opening 140.

The conduit connector 260 may be configured to couple the adaptor device 200 to the conduit section 184 such that the lower end 210L of the adaptor conduit structure 210 is held in place proximate to an outer sidewall surface 186OS of the conduit section 184 to at least partially align the adaptor outlet 220O with the access point opening 140. For example, the conduit connector 260 may be configured to engage the conduit section sidewall 186 to press at least a portion of the lower end 210L of the adaptor conduit structure 210 into contact (e.g., flush contact) with at least a portion of the outer sidewall surface 186OS so as to establish a flush or substantially flush complementary fit between the outer sidewall surface 186OS and the lower end 210L. As shown, the lower end 210L may have a curvature that is complementary to the curvature of the outer sidewall surface 186OS to further enable such a flush complementary fit. However, it will be understood that example embodiments are not limited thereto. In some example embodiments the lower end 210L may be spaced apart from the outer sidewall surface 186OS when the adaptor device 200 is coupled with the conduit section 184 by the conduit connector 260.

As shown, the conduit connector 260 may include a flexible clamp device 266 having one or more inner surfaces 260IS that are configured to flex around the conduit section sidewall 186 and engage (e.g., directly engage) and clamp the conduit section outer sidewall surface 186OS such that the clamp device 266 may exert a clamping force (e.g., compressive force) on the conduit section sidewall 186 to couple the adaptor device 200 to the conduit section 184 and which may, in some example embodiments, "grip" the conduit section sidewall 186 to hold the adaptor device 200 in place in relation to the conduit section 184. The conduit connector 260 (e.g., the clamp device 266) may be flexible to enable "snap-on" connection of the conduit connector 260 to the conduit section sidewall 186, and thus to enable "snap-on" connection of the adaptor device 200 to the conduit section 184. In some example embodiments, the conduit connector 260 (e.g., the flexible clamp device 266) is configured to detach from the conduit section 184 to enable disconnection of the adaptor device 200 from the conduit section 184.

As shown, the conduit connector 260 may include a clamp device 266, but example embodiments are not limited thereto, and the conduit connector 260 may be any device, material, or the like which may engage the conduit section 184 to hold the adaptor device 200 in place in relation to the conduit section 184 to at least partially align the adaptor outlet 220O with the access point opening 140 to establish fluid communication from the adaptor inlet 220I to the conduit interior through at least the adaptor conduit 220. For example, in some example embodiments the conduit connector 260 may include an adhesive material on the lower end 210L of the adaptor conduit structure 210 that is configured to adhere or bond with the outer sidewall surface 186OS of the conduit section 184 to couple the adaptor device 200 to the conduit section 184.

As further shown in at least FIGS. 3A-3I, the conduit connector 260 and the adaptor conduit structure 210 may be integrated with each other so as to be separate portions of a single, unitary piece of material. As shown, the inner surface 260IS of the conduit connector 260 may be continuous with at least a portion of the lower end 210L of the adaptor conduit structure 210 such that at least a portion of the inner surface 260IS and the lower end 210L collectively define a single continuous curvature which may be configured to be at least partially complementary to the outer sidewall surface 186OS of the conduit section. For example, as shown in at least FIG. 3G, the lower end 210L of the adaptor conduit structure 210 and the inner surface 260IS of the conduit connector 260 may be continuous with each other and may collectively define at least a portion of a cylindrical gap space 264 having a circumference that may approximate (e.g., be within a 5% margin, 10% margin, etc.) the cross-sectional circumference of the outer sidewall surface 186OS of the conduit section 184 and may have a diameter 264D that may approximate (e.g., be within a 5% margin, 10% margin, etc.) the outer diameter of the conduit section 184 at least partially defined by the outer sidewall surface 186OS. The circumference and/or diameter 264D of the cylindrical gap space 264 may be smaller than that of the outer sidewall surface 186OS of the conduit section 184 to ensure that the conduit connector 260 flexes around and "grips" (e.g., exerts compressive force on) the outer sidewall surface 186OS, and a portion of the circumference of the cylindrical gap space 264 may be exposed by a gap between opposing sides of the conduit connector 260, at a bottom end that is distal from the adaptor conduit structure 210, to provide an opening via which the conduit section sidewall 286 may be inserted into the cylindrical gap space 264. Based on the conduit connector 260 engaging the conduit section 184 to couple the adaptor device 200 to the conduit section 184, the portions of the inner surface(s) 260IS of the conduit connector 260 and the lower end 210L of the adaptor conduit structure 210 that collectively define the portion of the circumference of the cylindrical gap space 264 may contact the outer sidewall surface 186OS of the conduit section 184 and may be held in continuous or substantially continuous contact therewith. As a result, the conduit connector 260, together with the lower end 210L of the adaptor conduit structure 210, may establish a good "grip" of the adaptor device 200 with the conduit section 184 and may enable a good seal of the access point opening 140 to be established by the adaptor device 200.

As further shown, the inlet nozzle 232 at least partially defining the inlet connector 230 may also be integrated with the adaptor conduit structure 210, so that the adaptor conduit structure 210, at least the inlet nozzle 232, and the conduit connector 260 may be separate portions of a single, unitary piece of material.

Still referring to FIGS. 2 and 3A-3I, the adaptor device 200 may include an outlet nozzle 240 extending from the lower end 210L of the adaptor conduit structure 210 to a distal end 240D. As shown, the outlet nozzle 240 may define the adaptor outlet 220O at the distal end 240D of the outlet nozzle 240 and may further define at least a portion of the adaptor conduit 220 extending to the adaptor outlet 220O, where such a portion may be referred to herein as an outlet conduit portion 240C, such that the adaptor conduit 220 at least partially extends through the outlet nozzle 240 to the adaptor outlet 220O. As shown, the outlet nozzle 240 may be integral with the adaptor conduit structure 210 such that the adaptor conduit structure 210 and the outlet nozzle 240 are separate portions of a single, unitary piece of material, but example embodiments are not limited thereto.

As further shown, in some example embodiments the adaptor device 200 may include an adaptor conduit structure 210, an inlet nozzle 232, an outlet nozzle 240, a conduit connector 260, or any combination thereof that are separate portions of a single, unitary piece of material, but example embodiments are not limited thereto.

The outlet conduit portion 240C and the base conduit portion 210C may be open to each other and collectively define a single conduit portion extending to the adaptor outlet 220O. As shown, in example embodiments of an adaptor device 200 that include both the inlet nozzle 232 and the outlet nozzle 240, the inlet conduit portion 232C defined by the inlet nozzle 232, the outlet conduit portion 240C defined by the outlet nozzle 240, and the base conduit portion 210C defined by the adaptor conduit structure 210 may collectively define the adaptor conduit 220 extending from the adaptor inlet 220I to the adaptor outlet 220O.

As shown, the outlet nozzle 240 may extend downward from the lower end 210L of the adaptor conduit structure 210. In some example embodiments, the outlet nozzle 240 may be configured to at least partially extend (e.g., protrude) through an access point opening 140 from the outer sidewall surface 186OS of the conduit section 184 based on the conduit connector 260 coupling the adaptor device 200 to the conduit section 184. For example, as shown in at least FIG. 2 in view of FIGS. 3F-3I, the outlet nozzle 240 may extend into a cylindrical gap space 264 at least partially at least partially defined by the lower end 210L and the inner surface(s) 260IS of the conduit connector 260 and which the conduit connector 260 is configured to cause to be occupied by the conduit section 184 based on the adaptor device 200 being coupled to the conduit section 184.

As shown, the outlet nozzle 240 may have an outer diameter 240W that is equal to or smaller than the diameter 140W of the access point opening 140, such that the outlet nozzle 240 may be configured to extend at least partially or entirely through the access point opening 140 towards the conduit section interior 184I, although example embodiments are not limited thereto. As a result, based on the outlet nozzle 240 partially or entirely extending through the access point opening 140 based on the adaptor device 200 being coupled to the conduit section 184, an annular "remainder" conduit 140AN may be defined between the sidewall 240S of the outlet nozzle 240 and the inner sidewall of the access point opening 140 as defined by one or more inner surfaces of the conduit section sidewall 186.

As shown in at least FIG. 2, the outlet nozzle 240 may extend away from the lower end 210L by a length that is at least equal to or greater than the sidewall thickness 186T of the conduit section sidewall 186, such that the outlet nozzle 240 is configured to extend through an entirety of the access point opening 140 from the outer sidewall surface 186OS (e.g., at least through the outer end opening of the access point opening 140 in the outer sidewall surface 186OS and at least to and/or through the inner end opening of the access point opening 140 in the inner sidewall surface 186IS) such that the distal end 240D of the outlet nozzle 240 is directly exposed to and/or within the conduit section interior 184I that is defined by the inner sidewall surface 186IS of the conduit section 184, based on the conduit connector 260 coupling the adaptor device 200 to the conduit section 184. As a result, the adaptor device 200 may be configured to direct a fluid 160, received at the adaptor inlet 220I and directed through the adaptor conduit 220, directly into the conduit section interior 184I at a position within the conduit section interior 184I which may be a position that is between the inner sidewall surface 186IS and the longitudinal axis 184LA (which may be the central longitudinal axis) of the conduit section 184 and/or the conduit section interior 184I in the radial direction or a direction different from (e.g., perpendicular to) the longitudinal axis 184LA. Accordingly, the adaptor device 200 may be configured to cause the fluid 160 to be introduced into the conduit 124 with reduced probability of the fluid being "stuck" to the inner sidewall surface 186IS adjacent to the inner end opening of the access point opening 140. Additionally, based on being configured to cause the fluid 160 to be introduced into the conduit section interior 184I at a location spaced apart from the access point opening 140 and/or the inner sidewall surface 186IS based on the outlet nozzle 240 extending through the entire access point opening 140 and into the conduit section interior 184I, the likelihood of leakage of the fluid 160, delivered from the adaptor conduit 220 through the adaptor outlet 220O, out of the conduit section 184 through the access point opening 140 (e.g., backflow of the fluid 160 through the access point opening 140 from the conduit section interior 184I through an annular conduit 140AN between the inner sidewall of the access point opening 140 and the sidewall 240S of the outlet nozzle 240) may be reduced, minimized or prevented. Thus, the supply (e.g., provision, delivery, etc.) of the fluid 160 into the conduit 124 (e.g., to break down biological materials when the fluid 160 is a cleaning composition) without loss to the inner sidewall surface 186IS or leakage back out of the access point opening 140 may be improved.

In some example embodiments, the adaptor outlet 220O may be perpendicular to the longitudinal axis 240LA (e.g., central longitudinal axis) of the outlet nozzle 240 and/or the outlet conduit portion 240C of the adaptor conduit 220, but example embodiments are not limited thereto. In some example embodiments, the adaptor outlet 220O is at least partially angled in relation to the longitudinal axis 240LA. In some example embodiments, the adaptor outlet 220O defined by the outlet nozzle 240 may further define, have, or include a side opening 222O, also referred to herein as an axial recess or groove, a side recess or groove, or the like, that extends at least partially along the sidewall 240S of the outlet nozzle 240 to be an opening through at least a portion of the sidewall 240S to expose at least a distal part of the outlet conduit portion 240C in a particular direction defined by the position of the opening, such direction extending radially from the longitudinal axis 240LA of the outlet nozzle 240. The side opening 222O may be configured to cause fluid 160 passing through the outlet nozzle 240 to flow at least partially in a particular direction 160D that is at least partially perpendicular to the longitudinal axis 240LA of the outlet nozzle 240 and may be at least partially paraxial to the longitudinal axis 184LA of the conduit section 184 and/or conduit section interior 184I and thus may flow along a length of the conduit section 184, thereby improving the delivery of the fluid 160 (e.g., a cleaning composition) along a greater length of the conduit 124 and further improving the effects provided by the fluid 160 (e.g., breakdown of biological substances accumulating in the conduit 124 interior) over a greater proportion of the length of the conduit 124. As shown in at least FIGS. 3A-3G, the adaptor device 200 may include direction indicator symbols 262 on an outer surface of the adaptor device 200 (e.g., the outer surface 260OS of the conduit connector 260 as shown) to point in the direction 160D in which the side opening 222O of the adaptor outlet 220O is facing, to enable the adaptor device 200 to be coupled to the conduit section 184 to cause the side opening 222O and the corresponding direction 160D of fluid flow 160 to be directed in a desired direction, for example towards the downstream end 184D of the conduit section 184 as shown in FIG. 2.

In addition, a portion of the sidewall 240S of the outlet nozzle 240 that is opposite the side opening 222O across the longitudinal axis 240LA of the outlet nozzle 240 may define a base structure 224 which may at least partially obscure the adaptor outlet 220O, including the side opening 222O, in a direction opposite to the direction 160D in which the outlet nozzle 240 is configured to cause at least a portion of the discharged fluid 160 to flow. For example, referring to FIG. 2, where the conduit section 184 is configured to direct a separate fluid 120 (e.g., condensate) from an upstream end 184U (which may be proximate to the conduit inlet 128 of the conduit 124 to a downstream end 184D (which may be proximate to the conduit outlet 130 of the conduit 124), the adaptor device 200 may be configured to couple to the conduit section 184 to cause the side opening 222O to face towards the downstream end 184D of the conduit section 184 thus to be configured to direct fluid 160 exiting the adaptor conduit 220 via the side opening 222O to flow at least partially paraxial to the longitudinal axis 184LA towards the downstream end 184D in the same direction that the separate fluid 120 is directed to flow in the conduit section 184, and the base structure 224 may face towards the upstream end 184U and may obscure the side opening 222O from the upstream end 184U, thereby blocking the separate fluid 120 from splashing into the side opening 222O and thus potentially disrupting the flow of fluid 160 out of the outlet nozzle 240 via the side opening 222O and further mitigating the risk of biological material accumulation on the outlet nozzle 240 to block or clog the adaptor conduit 220, and thereby improving the operation of the adaptor device 200 to deliver a reliable flow (e.g., stream) of the fluid into the conduit section interior 184I.

In some example embodiments, the adaptor device 200 includes a scaling member 250 at the lower end 210L of the adaptor conduit structure 210. As shown, the adaptor conduit structure 210 may at least partially define a recess, or cavity 250C in which the sealing member 250 may be at least partially located. As shown, the lower surface 250S of the sealing member 250 may be exposed from the adaptor conduit structure 210 and may, in the absence of a countering force, protrude away from the adaptor conduit structure 210 and the lower end 210L thereof by a protrusion distance 250P. The sealing member 250 may be included in a separate piece of material than at least the adaptor conduit structure 210. The sealing member 250 may comprise a material that may be flexible, deformable, and/or clastic. The sealing member 250 may comprise a material that may have greater flexibility, deformability, and/or elasticity (e.g., a greater clastic modulus) than the material comprising at least the adaptor conduit structure 210 (which may be, for example, molded plastic). For example the sealing member 250 may be formed of (e.g., may entirely comprise) silicone (e.g., polysilicone). However, example embodiments are not limited thereto, and in some example embodiments the sealing member 250 and at least one of the adaptor conduit structure 210, the conduit connector 260, the outlet nozzle 240, the inlet nozzle 232, any combination thereof, or the like may be separate portions of a single, unitary piece of material.

In some example embodiments, the sealing member 250 may be configured to seal at least an outer edge 140E of the access point opening 140 based on the conduit connector 260 coupling the adaptor device 200 to the conduit section 184. For example, based on the sealing member 250 extending (e.g., protruding) from the lower end 210L of the adaptor conduit structure 210 by a protrusion distance 250P and/or based on the sealing member 250 comprising a flexible, deformable, and/or elastic material (e.g., silicone), the adaptor device 200 may be configured to be coupled to the conduit section 184 to bring the lower end 210L into direct contact with the outer sidewall surface 186OS to thereby cause the protruding portion of the sealing member 250 that protrudes from the lower end 210L by the protrusion distance 250P to be compressed to establish a seal that axially covers and/or surrounds the outer edge 140E of the access point opening 140. In some example embodiments, the adaptor device 200 may be configured to be coupled to the conduit section 184 to bring the lower end 210L into direct contact with the outer sidewall surface 186OS to thereby cause the protruding portion of the scaling member 250 that protrudes from the lower end 210L by the protrusion distance 250P to move at least partially into the access point opening 140 from the outer end thereof to thereby improve the sealing of the outer edge 140E of the access point opening 140.

As further shown, the lower surface 250S of the sealing member 250, even in an uncompressed state as shown in FIGS. 3F-3H, may have a curvature that is configured to be complementary to the curvature of the outer sidewall surface 186OS of the conduit section 184, such that the sealing member 250 may be configured to be more uniformly compressed between the adaptor conduit structure 210 and the outer sidewall surface 186OS based on the adaptor device 200 being coupled to the conduit section 184, thereby improving the uniformity and thus the reliability of the sealing of at least the outer edge 140E of the access point opening 140 by the sealing member 250. As further shown, the lower end 210L, the inner surface 260IS, and the lower surface 250S may be configured to, based on the adaptor device 200 being coupled to the conduit section 184, define separate portions of a same curvature of a same cylindrical gap space 264 having a particular circular circumference. While at least a portion of the upper surface of the sealing member 250 opposite the lower surface 250S are shown in at least FIG. 3H to be curved, example embodiments are not limited thereto, and in some example embodiments the upper surface of the sealing member 250 opposite the lower surface 250S may be planar (e.g., parallel to the upper end 210U of the adaptor conduit structure 210 as shown in at least FIG. 3H), and similarly the cavity 250C of the adaptor conduit structure 210 configured to receive at least a portion of the scaling member 250 may have a complementary planar surface to engage in a flush or substantially flush fit with the upper surface of the sealing member 250.

In some example embodiments, including example embodiments where the adaptor device 200 includes an outlet nozzle 240 extending to a distal end 240D from the lower end 210L of the adaptor conduit structure 210, the scaling member 250 may at least partially surround a proximate end 240P of the outlet nozzle 240 in a plan view (e.g., as shown in at least FIG. 3D), which may also be referred to as the sealing member 250 surrounding the circumference of a portion of the outlet nozzle 240 that is axially proximate to the proximate end 240P of the outlet nozzle 240. In some example embodiments, and as shown in at least FIG. 2, the sealing member 250 may be configured to seal at least an outer edge 140E of the access point opening 140 based on the conduit connector 260 coupling the adaptor device 200 to the conduit section 184 such that the outlet nozzle 240 at least partially extends through the access point opening 140 from the outer sidewall surface 186OS of the conduit section 184. For example, based on the scaling member 250 extending (e.g., protruding) from the lower end 210L of the adaptor conduit structure 210 by a protrusion distance 250P and/or based on the scaling member 250 comprising a flexible, deformable, and/or elastic material (e.g., silicone), the adaptor device 200 may be configured to be coupled to the conduit section 184 to bring the lower end 210L into direct contact with the outer sidewall surface 186OS to thereby cause the protruding portion of the scaling member 250 that protrudes from the lower end 210L by the protrusion distance 250P to be compressed to establish a seal that axially covers and/or surrounds the outer edge 140E of the access point opening 140. The sealing member 250 may further cover and seal an outer end of an annular conduit 140AN defined between the sidewall 240S of the outlet nozzle 240 and the inner sidewall of the access point opening 140. In some example embodiments, the adaptor device 200 may be configured to be coupled to the conduit section 184 to bring the lower end 210L into direct contact with the outer sidewall surface 186OS to thereby cause the protruding portion of the sealing member 250 that protrudes from the lower end 210L by the protrusion distance 250P to move at least partially into the annular conduit 140AN from the outer end thereof to thereby improve the sealing of the outer edge 140E of the access point opening 140.

Based on the scaling member 250 sealing the outer edge 140E based on the adaptor device 200 being coupled to the conduit section 184, the likelihood of leakage of either the fluid 160 directed into the conduit section interior 184I by the adaptor device 200 or the separate fluid 120 directed through the conduit 124 may be reduced, minimized, or prevented.

Figure 4A:
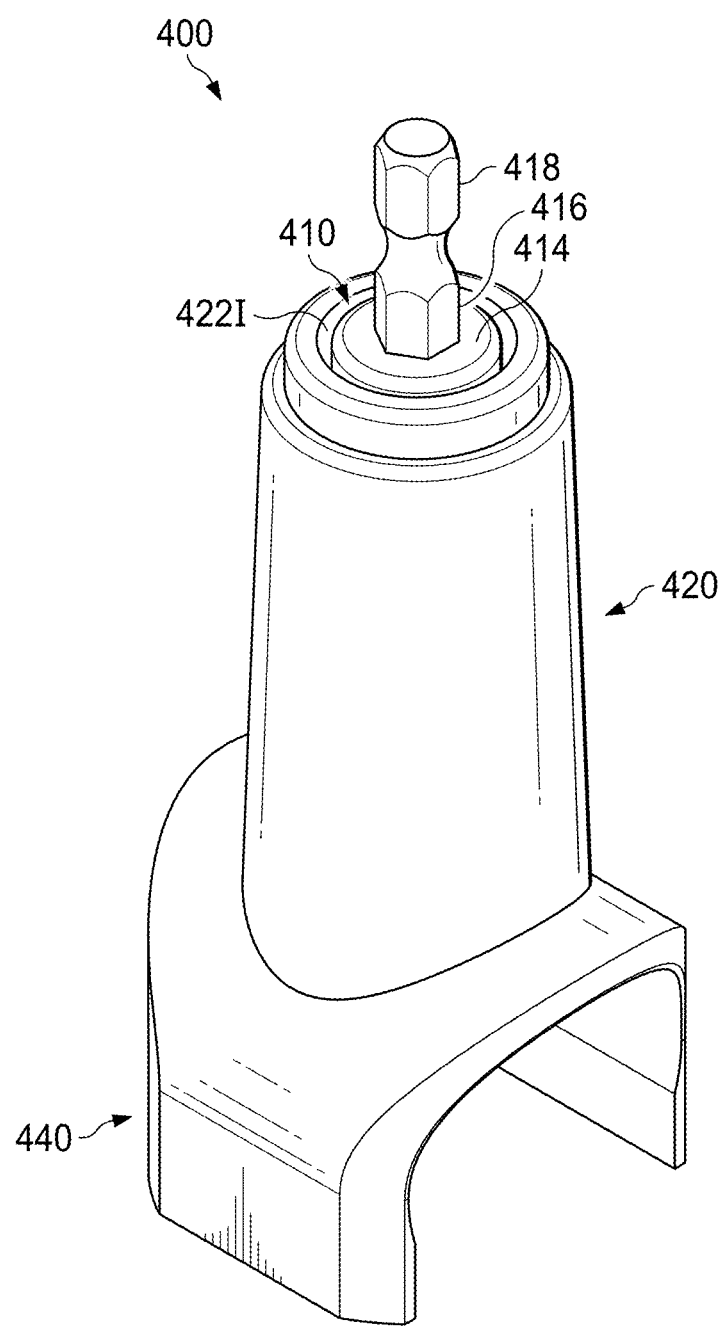
FIGS. 4A, 4B, 4C, and 4D are views of an installation guide device, according to some example embodiments.
Figure 4B:
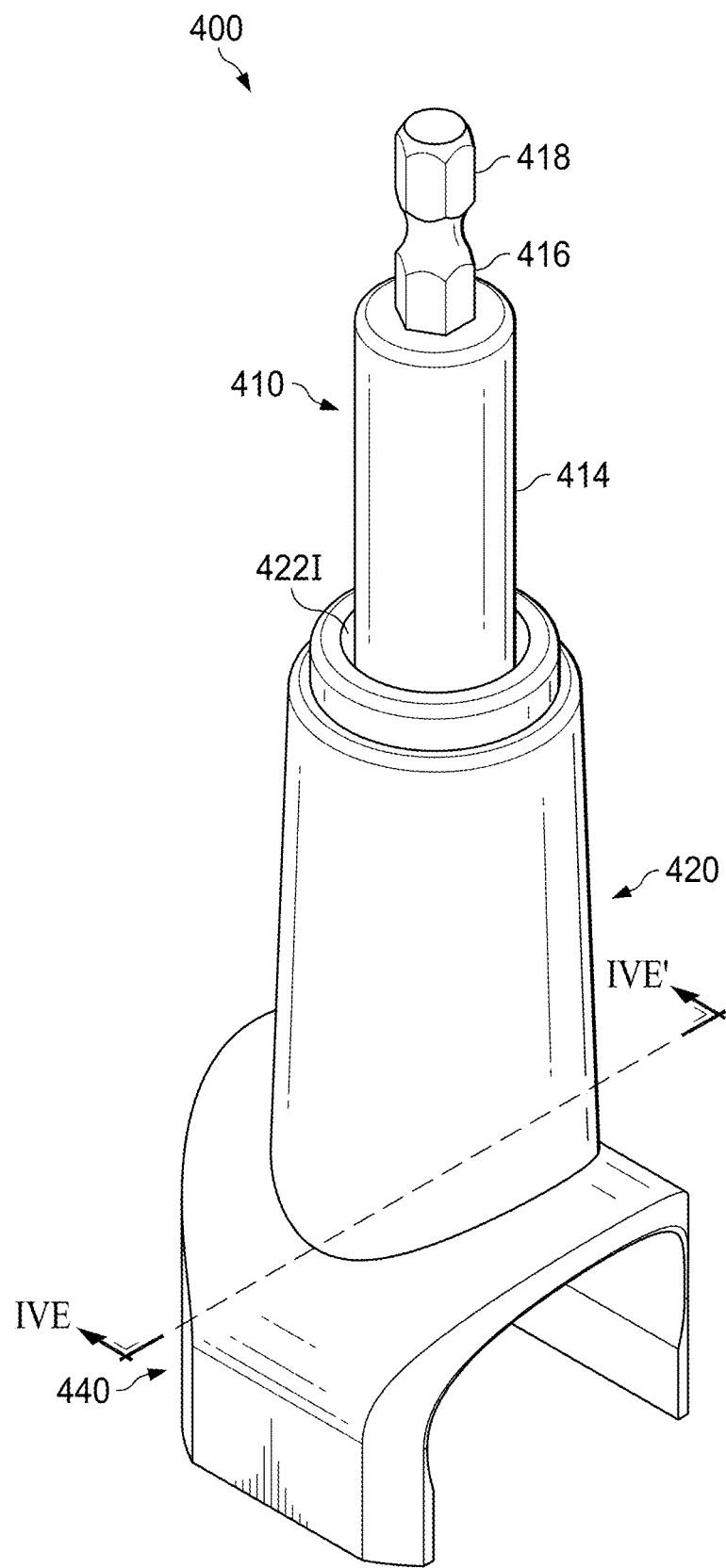
Figure 4C:
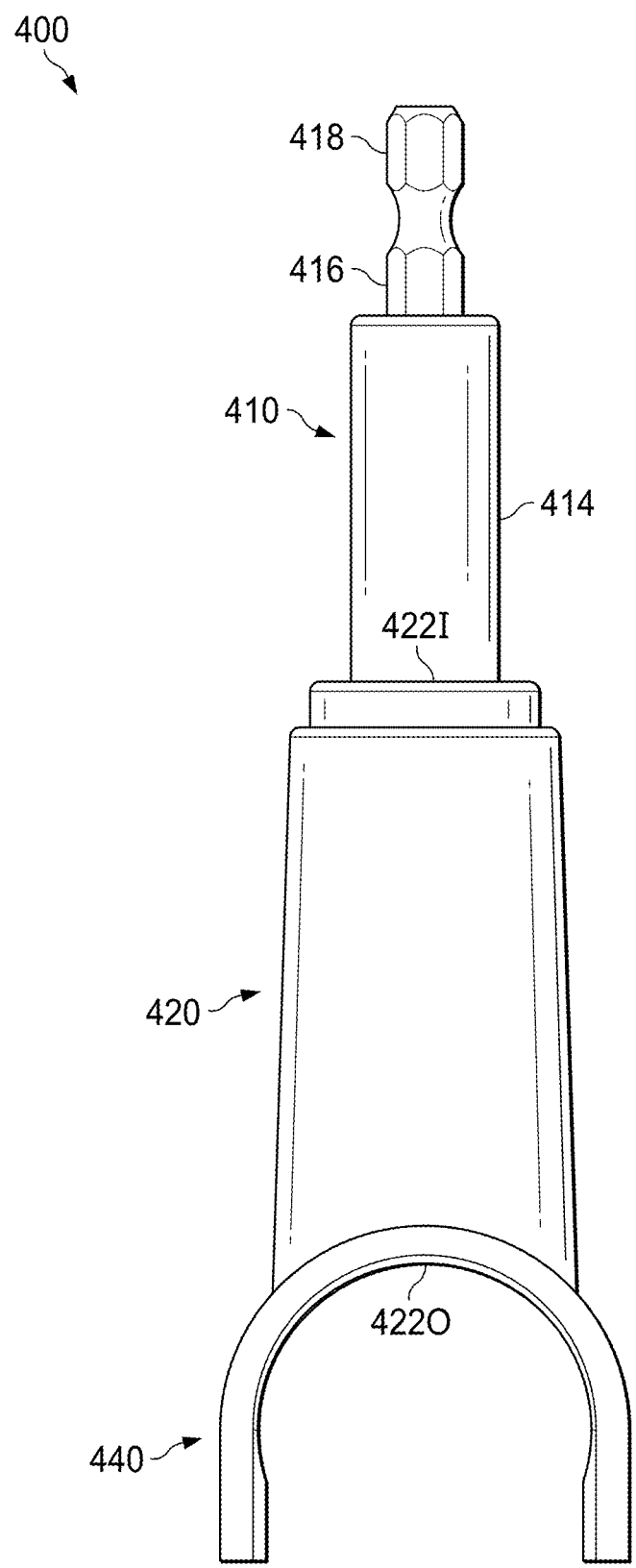
Figure 4D:
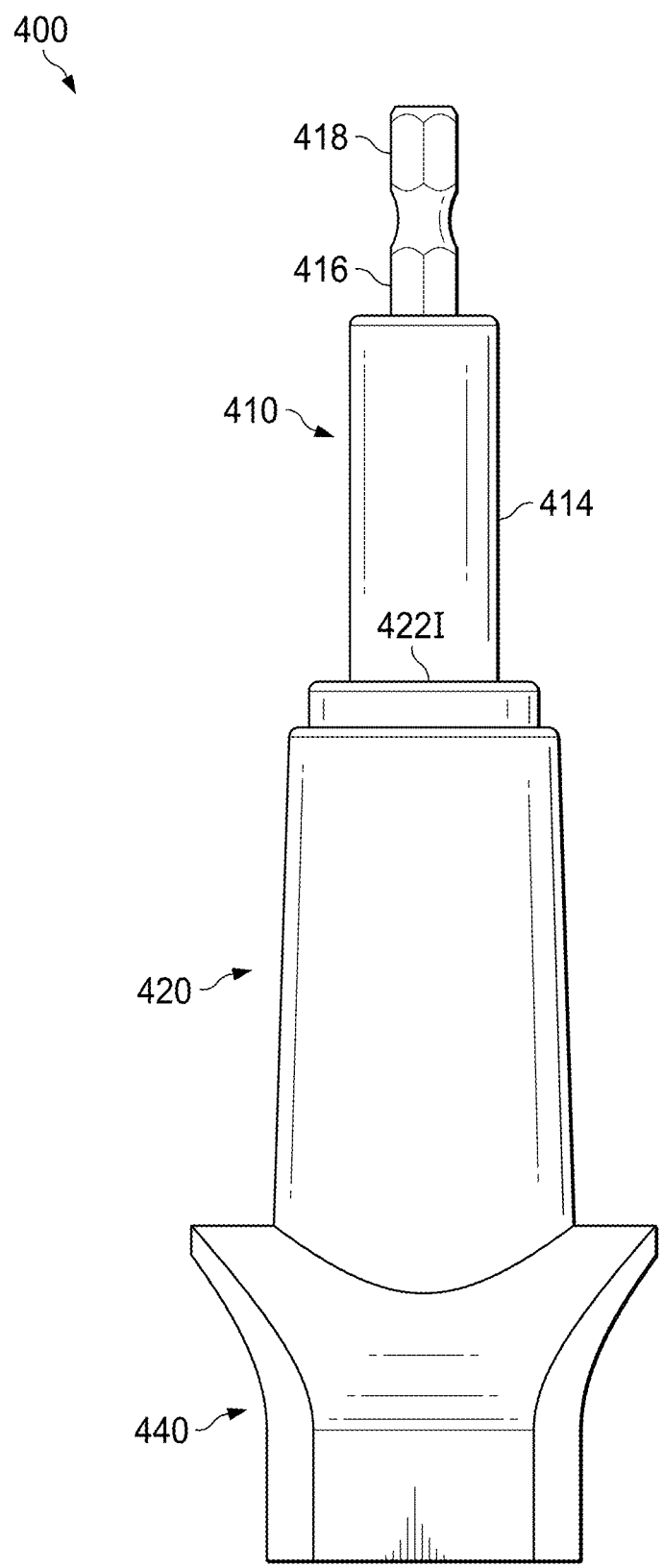
Figure 4E:
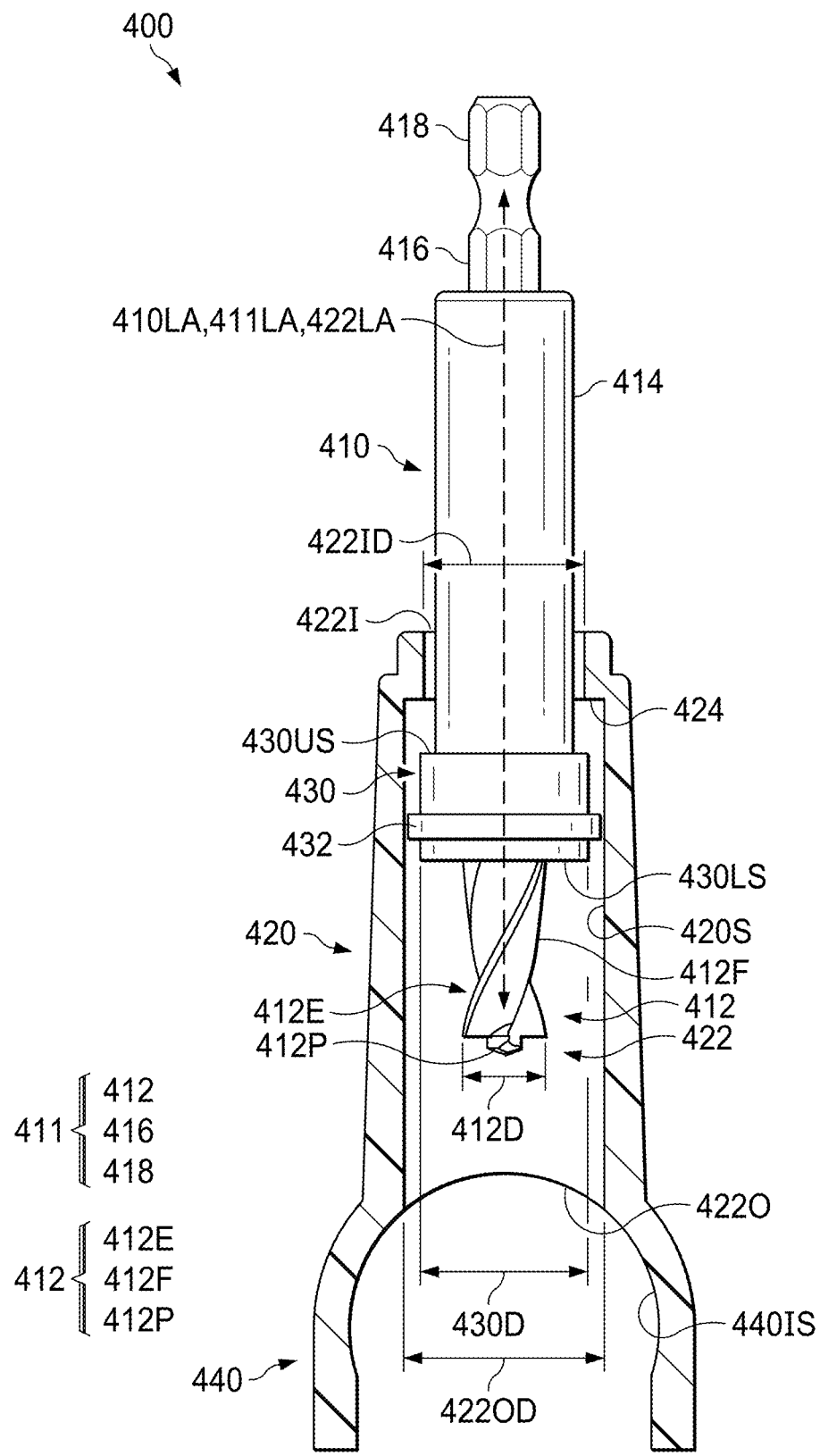
FIG. 4E is a cross-sectional elevation view of the installation guide device along cross-sectional view line IVE-IVE' shown in FIG. 4B, according to some example embodiments.
Figure 4F:
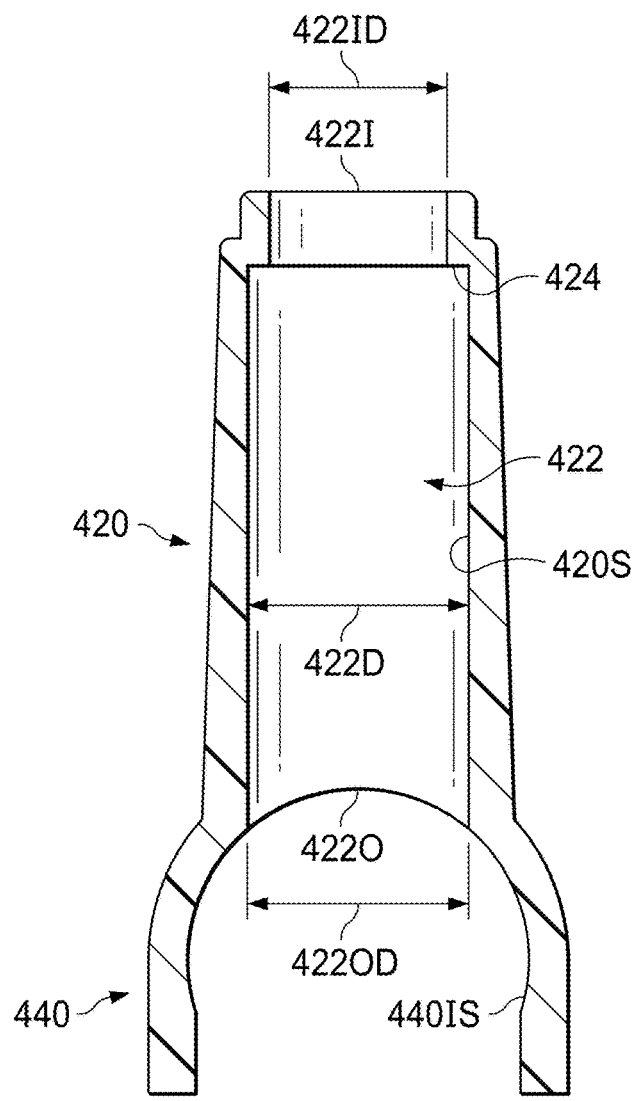
FIG. 4F is a cross-sectional elevation view of the guide conduit of the installation guide device along cross-sectional view line IVE-IVE' shown in FIG. 4B, according to some example embodiments.
Figure 4G:
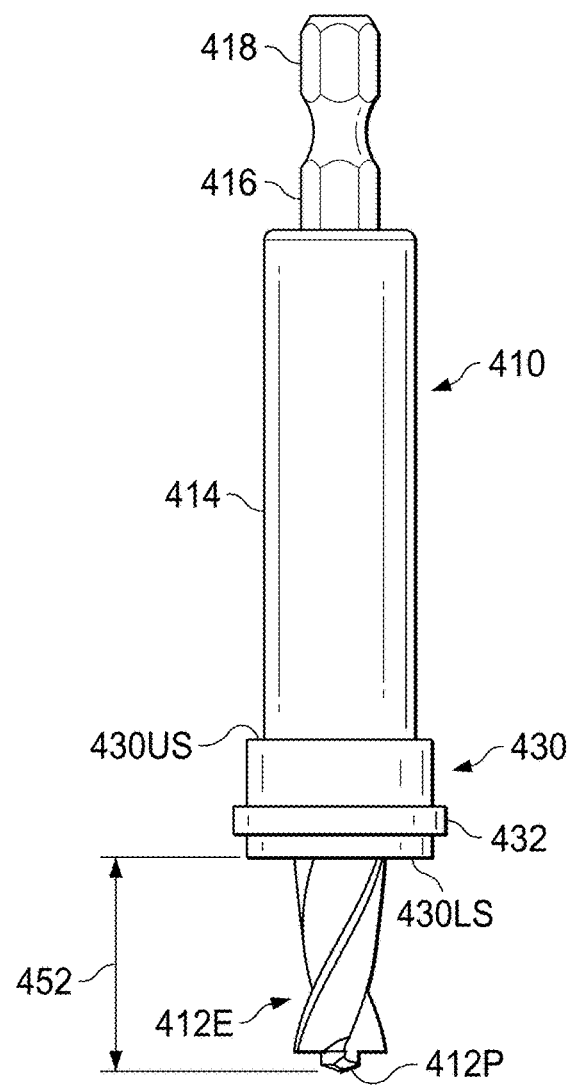
FIG. 4G is an elevation view of the drill bit device of the installation guide device of FIG. 4A, according to some example embodiments.

FIGS. 4A, 4B, 4C, and 4D are views of an installation guide device, according to some example embodiments. FIGS. 4A and 4B are perspective top views of the installation guide device 400 at two different positionings of the drill bit device 410 thereof. FIGS. 4C and 4D are elevation side and front views, respectively. FIG. 4E is a cross-sectional elevation view of the installation guide device along cross-sectional view line IVE-IVE' shown in FIG. 4B, according to some example embodiments. FIG. 4F is a cross-sectional elevation view of the guide conduit of the installation guide device along cross-sectional view line IVE-IVE' shown in FIG. 4B, according to some example embodiments. FIG. 4G is an elevation view of the drill bit device of the installation guide device of FIG. 4A, according to some example embodiments.

In some example embodiments, at least a conduit section 184 to which an adaptor device 200 may be coupled (e.g., an adaptor device 200 configured to align an adaptor outlet 220O thereof with an access point opening 140 that extends through the sidewall thickness 186T of a conduit section 184) may initially omit any access point opening 140 extending through the sidewall thickness 186T such that the conduit section 184 (and in some example embodiments the entirety of the conduit 124 between the conduit inlet 128 and the conduit outlet 130) may be a "closed" conduit extending between opposite ends and defined by an inner sidewall surface 186IS of a conduit section sidewall 186 of the conduit section 184 that does not include any access point opening 140 extending into the conduit section interior 184I from an exterior of the conduit 124 (e.g., extending through a thickness direction of the sidewall thickness of the conduit that extend perpendicular to the longitudinal axis of the conduit section), such that the conduit section 184 initially omits any opening via which the adaptor device 200 may establish fluid communication with the adaptor conduit thereof (and through which the adaptor device may establish fluid communication between the conduit section interior 184I and the fluid supply source 150), thereby initially precluding the adaptor device 200 from being coupled to the conduit section 184 to align an adaptor outlet 220O thereof with an access point opening 140 at the conduit section 184. In some example embodiments, an installation guide device 400 is configured to establish (e.g., "form") an access point opening 140 extending through the sidewall thickness 186T of the conduit section 184 to thereby enable an adaptor device 200 to be coupled thereto to provide a fluid connection into the conduit section interior 184I through the access point opening 140 extending through the sidewall thickness 186T. As a result, the installation guide device 400 may be configured to enable the adaptor device 200 to couple with the conduit section 184 to provide fluid 160 (e.g., cleaning composition) from a fluid supply source 150 into the interior of the conduit 124 via an access point opening 140 through the sidewall thickness 186T even when the conduit 124 initially does not include a preexisting access point opening 4140 through the sidewall thickness 186T into the conduit 124.

As shown in FIGS. 4A-4G, the installation guide device 400 may include a drill bit device 410 configured to drill through the sidewall thickness 186T of the conduit section 184. As shown, the drill bit device 410 may include a drill bit 411 extending along a longitudinal axis 411LA (which may be a central longitudinal axis of the drill bit 411). The longitudinal axis 411LA of the drill bit 411 may be coaxial with the longitudinal axis 410LA of the drill bit device 410 (which may be a central longitudinal axis of the drill bit device 410). The drill bit device 410 may include a sheath structure 414 that is fixed (e.g., bonded, adhered, bolted, or attached via any known attachment mechanisms) to the drill bit 411. An exposed portion of the drill bit 411 may protrude from the sheath structure 414 along the longitudinal axis 411LA, 410LA by a particular protrusion distance 452. In some example embodiments, the sheath structure 414 and the drill bit 411 are separate pieces of material (e.g., the sheath structure 414 may be a plastic cylindrical structure attached to the drill bit 411, which may include any known material including any material described herein), but example embodiments are not limited thereto, and in some example embodiments the drill bit 411 and the sheath structure 414 may be separate portions of a single, unitary piece of material.

In some example embodiments, and as shown, the drill bit 411 may include a body 412 extending to a point 412P and having a land with flutes 412F in the body 412 of the drill bit 411 as shown. A portion of the body 412 of the drill bit 411 including the flutes 412F and the point 412P may comprise the exposed portion 412E of the drill bit body 412, and a remainder of the body 412 may be surrounded in directions perpendicular to the longitudinal axis 410LA, 411LA by the sheath structure 414. As shown, the drill bit body 412 is configured to drill a hole, conduit or the like having a particular diameter, referred to herein as the drill bit size 412D, which may be the same as the outer or maximum diameter of the exposed portion 412E of the drill bit body 412. The drill bit 411 may further include a shank 416 and tang 418 (although at least one thereof may be omitted) extending from an opposite end of the drill bit 411 from the point 412P of the drill bit 411 and configured to engage and thus mechanically couple with a drilling machine (e.g., a handheld drill device) referred to herein as a driver device and which may be any known drilling machine and/or driver to enable the drill bit 411, and thus the drill bit device 410, to be rotated around the longitudinal axis 410LA, 411LA based on operation of the driver device mechanically coupled with the shank 416 and tang 418 of the drill bit device 410. The driver device may further impart a force on the drill bit device 410 to cause the drill bit device 410 to move longitudinally, along the longitudinal axis 410LA, 411LA of the drill bit device 410 and/or of the drill bit 411.

The installation guide device 400 may include a guide device 420 having one or more inner surfaces 420S defining a guide conduit 422 having at least a lower guide opening 422O having a particular diameter 422OD. The guide conduit 422 may have a longitudinal axis 422LA, which may be a central longitudinal axis of the guide conduit 422. As shown, the guide conduit 422 may extend between opposite upper and lower guide openings 422I and 422O, but example embodiments are not limited thereto and in some example embodiments the upper guide opening 422I may be omitted. As shown, the installation guide device 400 may be configured to enable longitudinal movement of the drill bit device 410 (e.g., along the longitudinal axis 410LA of the drill bit device 410, which may be paraxial (e.g., coaxial) with the longitudinal axis 422LA of the guide conduit 422) in relation to the guide conduit 422, for example such that the drill bit device 410 moves longitudinal at least partially through the guide conduit 422 and at least partially through the lower guide opening 422O. Accordingly, the guide device 420 may be configured to restrict and guide the translation movements of the drill bit device 410 (and thus the drill bit 411) in relation to the guide device 420 to longitudinal movements of the drill bit device 410 in relation to the guide conduit 422 to cause the drill bit device 410 to adjustably protrude from through the lower guide opening 422O of the guide device 420 along the longitudinal axis 410LA, 411LA, and/or 422LA.

As shown, the sheath structure 414 of the drill bit device 410 may provide clearance and protection to the drill bit 411 within the guide conduit 422 and may be configured to at least partially align the longitudinal axis 411LA of the drill bit 411 with the longitudinal axis 422LA of the guide conduit 422 to thereby "center" the drill bit 411 in the guide conduit 422. However, as shown, the diameter of the sheath structure 414 may be smaller than that of the guide conduit 422, to provide clearance margins for ease of operation and to enable longitudinal movement of at least a portion of the drill bit device through one or more openings that are smaller in diameter than the diameter 422D of the guide conduit 422 (which may be the same as or different from the diameter 422OD of the lower guide opening 422O).

Still referring to FIGS. 4A-4G, the installation guide device 400 may include, as part of the guide device 420, a guide connector 440 that is configured to couple at least the guide device 420 of the installation guide device to the conduit section 184. As shown, the guide connector 440 may include a flexible clamp device having one or more inner surfaces 440IS that are configured to flex around the conduit section sidewall 186 and engage (e.g., directly engage) and clamp the conduit section outer sidewall surface 186OS such that the flexible clamp may exert a clamping force (e.g., compressive force) on the conduit section sidewall 186 of the conduit section 184 to couple at least the guide device 420 to the conduit section 184 and which may, in some example embodiments, "grip" the conduit section sidewall 186 to hold at least the guide device 420 in place in relation to the conduit section 184. The guide connector 440 (e.g., the clamp device) may be flexible to enable "snap-on" connection of the guide connector 440 to the conduit section sidewall 186, and thus to enable "snap-on" connection of the installation guide device 400 to the conduit section 184. In some example embodiments, the guide connector 440 (e.g., a flexible clamp device) is configured to detach from the conduit section 184 to enable disconnection of the installation guide device 400 from the conduit section 184. As shown, the guide connector 440 and the guide device 420 may be integral with each other so as to be separate portions of a single, unitary piece of material (e.g., any plastic material), but example embodiments are not limited thereto and in some example embodiments the guide device 420 and the guide connector may include separate pieces of material that are coupled together. As shown, the guide connector 440 may include a clamp device, but example embodiments are not limited thereto, and the guide connector 440 may be any device, material, or the like which may engage the conduit section 184 to hold at least the guide device 420 in place in relation to the conduit section 184 to at least partially align the lower guide opening 422O with at least a particular location on the outer sidewall surface 186OS of the conduit section 184. For example, in some example embodiments the guide connector 440 may be an adhesive material on the lower end of the guide device 420 that is configured to adhere or bond with the outer sidewall surface 186OS of the conduit section 184 to couple the guide device 420 to the conduit section 184. In some example embodiments the guide connector 440 may be omitted.

Still referring to FIGS. 4A-4G, the installation guide device 400 may include a protrusion stop structure 430 that is configured to limit longitudinal protrusion of the drill bit device 410 along one or more of the longitudinal axis 410LA, 411LA, 422LA, and particularly longitudinal protrusion of at least the exposed portion 412E of the drill bit body 412, at least partially out of the guide conduit 422 via the lower guide opening 422O to a particular protrusion distance 452. The protrusion stop structure 430 may be a structure that is configured to engage (e.g., contact) another surface based on longitudinal movement of the drill bit device 410 along the longitudinal axis 410LA, 411LA, and/or 422LA at least partially though the lower guide opening 422O, where the protrusion stop structure 430 is configured to engage (e.g., contact) the other surface to stop (e.g., inhibit the longitudinal movement of the drill bit device 410 out of the lower guide opening 422O beyond the particular protrusion distance 452. Thus the protrusion stop structure 430 may be configured to prevent the drill bit device 410 from over-drilling beyond a certain distance from the lower guide opening 422O.

In some example embodiments, including the example embodiments shown in FIGS. 4A-4G, the protrusion stop structure 430 is fixed in relation to the drill bit device 410 such that the protrusion stop structure 430 is configured to move with the drill bit device 410 in relation to the guide conduit 422 and inhibit protrusion of the drill bit device 410 beyond the particular protrusion distance 452 from the lower guide opening 422O while the installation guide device 400 is coupled to the conduit section 184, based on a lower surface 430LS of the protrusion stop structure 430 contacting an outer sidewall surface 186OS of the conduit section 184. For example, as shown in at least FIGS. 4E and 4G, the protrusion stop structure 430 may include a cylindrical collar device that is fixed to and/or part of the sheath structure 414 that surrounds at least a portion of the drill bit 411. Such a protrusion stop structure 430 and the sheath structure 414 may be separate portions of a single, unitary piece of material. As shown, the protrusion stop structure 430 may be a cylindrical collar device that is proximate to the point 412P of the drill bit body 412 and positioned to define the longitudinal (e.g., axial) length of the exposed portion 412E of the drill bit body 412 that includes the point 412P and flutes 412F to be the particular protrusion distance 452. As described herein, the sheath structure 414 (and the cylindrical collar device of the protrusion stop structure 430 as shown in FIGS. 4E and 4G) may be fixed to the drill bit 411 to be configured to move with the drill bit 411.

As further shown, the cylindrical collar device of the protrusion stop structure 430 may have an outer diameter 430D that is greater than the drill bit size 412D that may be the maximum outer diameter of the exposed portion 412E of the drill bit body 412. As a result, based on the drill bit device 410 moving through the guide conduit 422 and further moving through the lower guide opening 422O to cause the exposed portion 412E of the drill bit 411 to drill a hole (e.g., an access point opening 140) through a material (e.g., through the conduit section sidewall 186 of a conduit section coupled to the guide device 420), the hole may have a diameter (e.g., access point opening diameter 140W) equal to the drill bit size 412D and smaller than the diameter 430D of the protrusion stop structure 430, such that upon the exposed portion 412E of the drill bit 411 extending at least the particular protrusion distance 452 from the outer surface (e.g., the outer sidewall surface 186OS) of the material into which the hole is being drilled (e.g., the conduit section sidewall 186), the lower surface 430LS of the protrusion stop structure 430 may engage (e.g., directly contact) portions of the outer surface (e.g., the outer sidewall surface 186OS) that are adjacent to the hole (e.g., the access point opening 140) being drilled. The protrusion stop structure 430 may thus inhibit (halt) further longitudinal movement of the drill bit device 410 from the outer sidewall surface 186OS of the conduit section 184 into the conduit section interior 184I based on the lower surface 430LS engaging the portions of the outer sidewall surface 186OS that are adjacent to the hole being drilled and axially overlapping at least a portion of the lower surface 430LS along the longitudinal axis 410LA, 411LA, and thus resisting further longitudinal movement of the drill bit device 410 into the conduit section 184 through the conduit section sidewall 186, thereby preventing the drill bit 411 from drilling any further than the particular protrusion distance 452 into the conduit section 184. As a result, the installation guide device 400 may be configured to prevent over-drilling by the drill bit device 410 into the conduit section 184 through the conduit section sidewall 186 beyond the particular protrusion distance 452, thereby preventing damage to conduit section 184 that might otherwise occur due to over-drilling by the drill bit device 410 (e.g., drilling beyond the particular protrusion distance into the conduit section). In some example embodiments, the particular protrusion distance 452 may be configured to be equal to or less than a particular proportion of the inner diameter defined by the inner sidewall surface 186IS of the conduit section sidewall 186, (e.g., equal to or less than ¾" with regard to a ¾" PVC conduit section) to reduce, minimize, or prevent the likelihood that the drill bit device 410 may drill the access point opening 140 into the conduit section interior 184I and continue further through the conduit section interior 184I to start drilling an opposing portion of the inner sidewall surface 186IS at an opposite side of the conduit section interior 184I from the access point opening 140.

As shown, the guide connector 440 may be configured to couple the guide device 420 to the conduit section 184 so that the lower guide opening 422O is directly adjacent to a particular location on the outer sidewall surface 186OS of the coupled conduit section, such that the particular protrusion distance 452 is a distance that the exposed portion 412E of the drill bit body 412 protrudes into the conduit section 184 from the outer sidewall surface 186OS and through the conduit section sidewall 186 into the conduit section interior 184I based on the lower surface 430LS of the protrusion stop structure 430 directly engaging the outer sidewall surface 186OS. However, example embodiments are not limited thereto, and the lower guide opening 422O may be spaced apart from the outer sidewall surface 186OS in the direction of the longitudinal axis 422LA based on the guide connector 440 coupling the guide device 420 to the conduit section 184.

As further shown, the outer diameter 430D of the cylindrical collar device defined by the protrusion stop structure 430 may be smaller than the diameter 422D of the guide conduit and/or the diameter 422OD of the lower guide opening 422O, and an additional spacer 432 may protrude radially from the cylindrical collar device of the protrusion stop structure 430 to an outer diameter that more closely approximates and/or is equal or substantially equal to the diameter 422D of the guide conduit 422 to improve alignment and centering of the drill bit 411 within the guide conduit 422. However, example embodiments are not limited thereto. For example, in some example embodiments the outer diameter 430D of the protrusion stop structure 430 may be equal or substantially equal to the diameters 422D and 422OD, and the spacer 432 may be omitted. As shown, the diameter 430D of the protrusion stop structure 430 may be configured to be equal to or smaller than the diameter 422OD of the lower guide opening 422O to enable the lower surface 430LS of the protrusion stop structure 430 to directly engage the outer sidewall surface 186OS during longitudinal movement of the drill bit device 410 in relation to the guide device 320 to drill an access point opening 140. However, example embodiments are not limited thereto, and the protrusion stop structure 430 may be configured to engage a portion of the guide device 420 to inhibit further longitudinal movement (e.g., downward movement) of the drill bit device 410 through the lower guide opening 422O based on the diameter 430D of the protrusion stop structure 430 being smaller than the diameter 422OD of the lower guide opening 422O.

Still referring to FIGS. 4A-4G, the installation guide device 400 may include a distal stop structure 424 that is configured to inhibit longitudinal movement of the drill bit device 410 away from the lower guide opening 422O and at least partially through the guide conduit 422 (e.g., movement along the longitudinal axis 410LA, 411LA, and/or 422LA). As shown, the distal stop structure 424 may be a part of the guide device 420 and/or may be integral to the guide device 420 such that the distal stop structure 424 and the guide device 420 are separate portions of a single, unitary piece of material, but example embodiments are not limited thereto. As shown, the distal stop device may define an upper guide opening 422I of the guide conduit 422, where the upper guide opening 422I has a diameter 422ID which may be smaller than the outer diameter 430D of the protrusion stop structure 430 (or at least one structure of the drill bit device 410), such that a surface of the distal stop structure 424 may axially overlap at least a portion of the protrusion stop structure 430 and enable the longitudinal movement of the drill bit device 410 away from the lower guide opening 422O and at least partially through the guide conduit 422 to be inhibited based on the upper surface 430US of the protrusion stop structure engaging (e.g., directly contacting the exposed lower surface of the distal stop structure 424 that faces the upper surface 430US and axially overlaps the upper surface 430US. As a result, when the installation guide device 400 is coupled to the conduit section 184, and the protrusion stop structure inhibits (e.g., limits) longitudinal movement of the drill bit device 410 through the lower guide opening 422O (e.g., limits downward longitudinal movement in relation to the guide device 420), the distal stop structure 424 may inhibit (e.g., limit) longitudinal movement of the drill bit device 410 through the upper guide opening 422I (e.g., limits upward longitudinal movement in relation to the guide device 420), thereby keeping the drill bit device 410 at least partially within the guide conduit 422 while at least the guide device 420 is coupled to the conduit section 184. As a result, premature or accidental removal of the drill bit device 410 from the guide device 420 (e.g., due to accidental excessive withdrawing force being applied on the drill bit device by a mechanically coupled driver device) to reduce, minimize, or prevent the risk of injury to an operator of the driver device or nearby equipment, or loss of the drill bit device 410 due to the drill bit device 410 being moved longitudinal upwards through the guide conduit 422 (e.g., withdrawn from a drilled access point opening 140).

Figure 5:
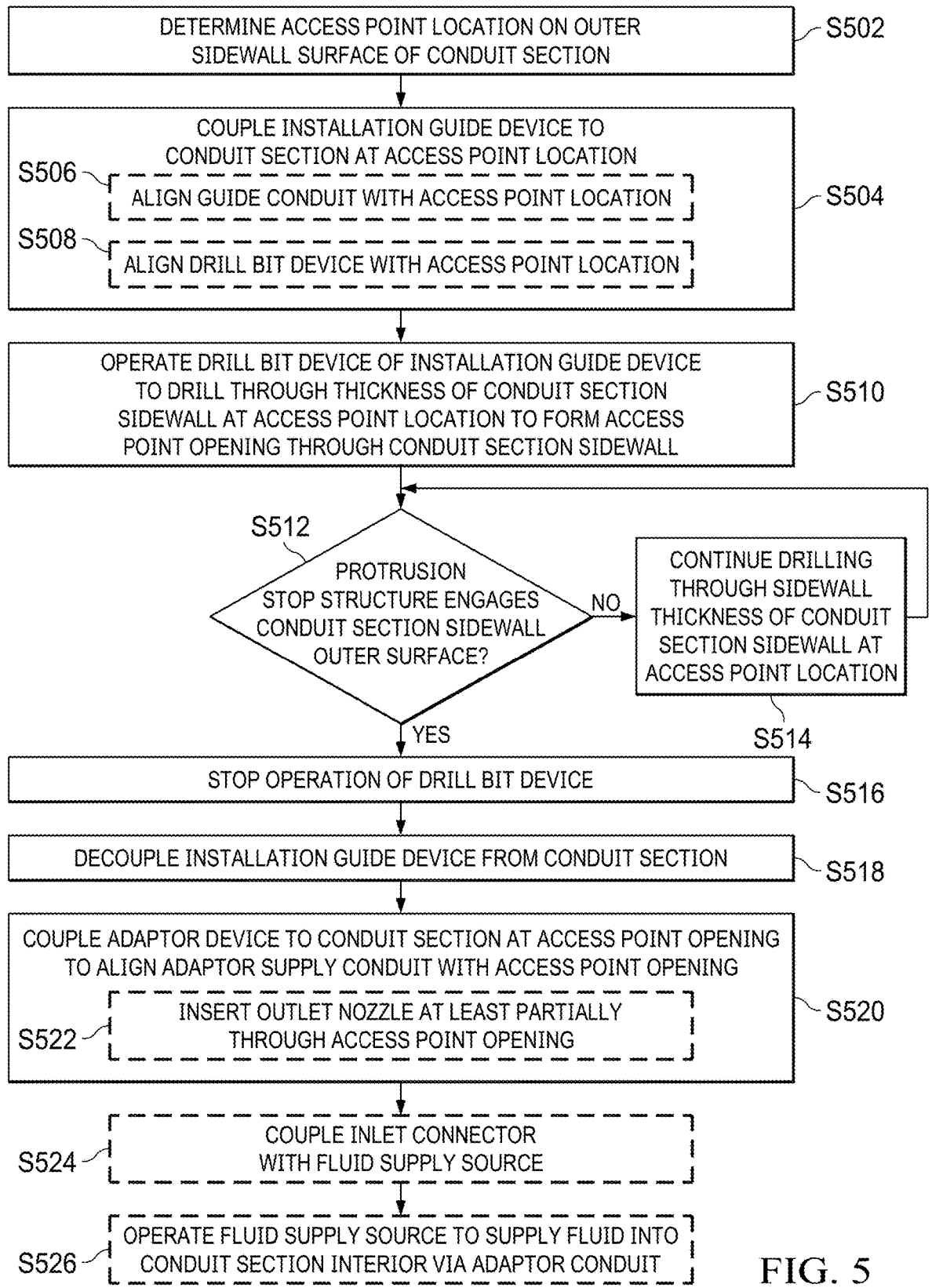
FIG. 5 is a flowchart illustrating a method to provide a fluid connection into a conduit section interior of a conduit section of a conduit through a sidewall thickness of a conduit section sidewall of the conduit section, according to some example embodiments.

FIG. 5 is a flowchart illustrating a method to provide a fluid connection into a conduit section interior of a conduit section of a conduit through a sidewall thickness of a conduit section sidewall of the conduit section, according to some example embodiments. FIGS. 6A, 6B, 6C, 6D, 6E, 6F, 6G, and 6H are perspective views of separate operations of the method shown in FIG. 5, according to some example embodiments. FIGS. 7A, 7B, 7C, 7D, 7E, 7F, 7G, and 7H are cross-sectional elevation views, along the cross-sectional view line VI-VI' shown in FIG. 2, of separate operations of the method shown in FIG. 5, according to some example embodiments. It will be understood that the methods and/or operations thereof as shown in FIGS. 5, 6A-6G, and 7A-7G may be performed with regard to any of the example embodiments of the adaptor device 200 and/or the installation guide device 400 and/or any example embodiments of a system 100, a conduit 124, or any combination thereof. It will be understood that the operations of the method shown in FIG. 5 may be arranged in any order and/or may be rearranged in order relative to the order shown in FIG. 5. One or more of the operations shown in FIG. 5 may be omitted from the method shown in FIG. 5. One or more operations may be added to the method shown in FIG. 5.

Figure 6A:
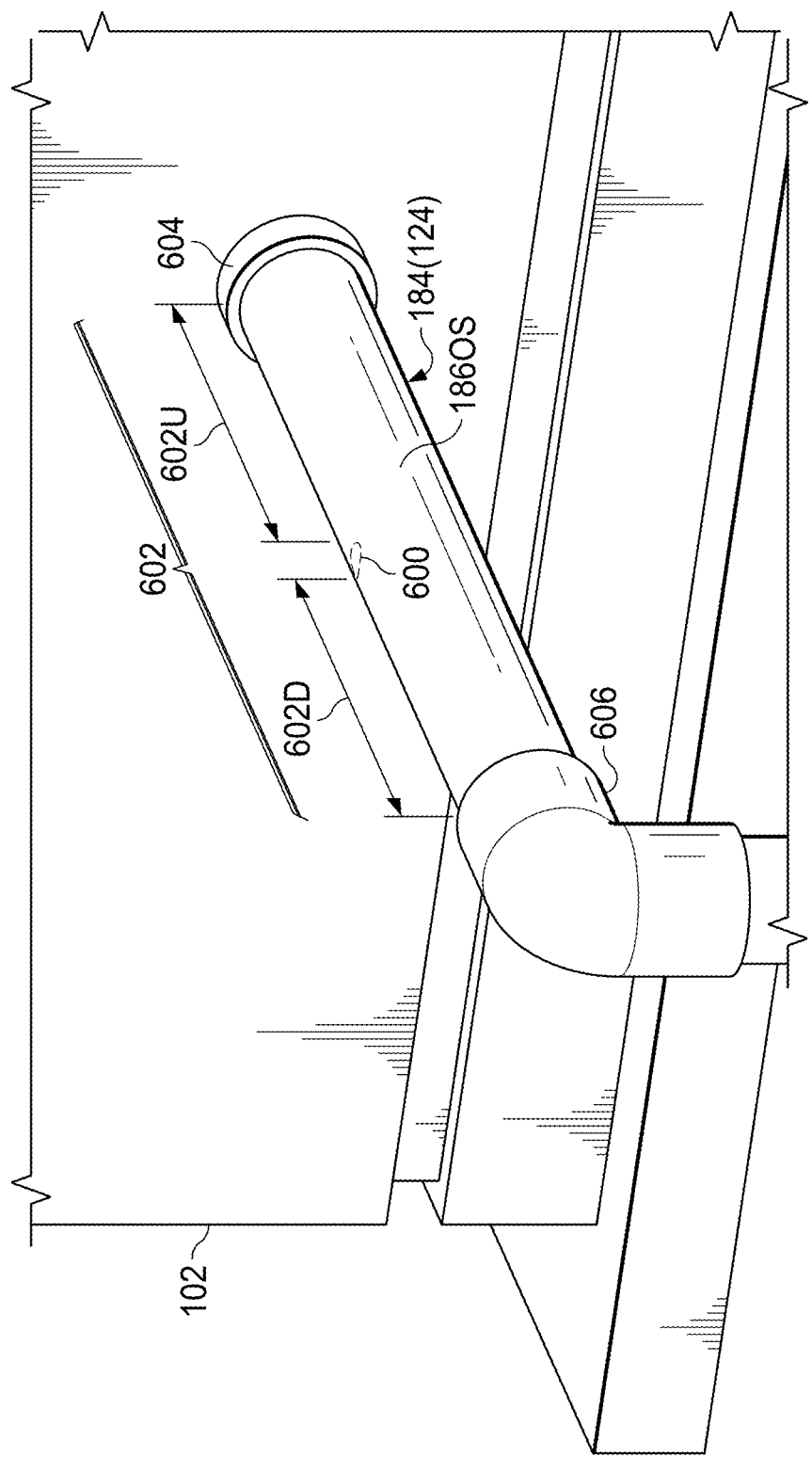
FIGS. 6A. 6B. 6C, 6D, 6E, 6F, 6G, and 6H are perspective views of separate operations of the method shown in FIG. 5, according to some example embodiments.

Referring to FIGS. 5 and 6A, at S502 a "closed" conduit section 184 of a conduit 124 that may not include any openings through the sidewall thickness 186T thereof is inspected to determine an access point location 600 on an outer sidewall surface 186OS of the conduit section 184 that is suitable for forming (establishing) an access point opening 140 through the sidewall thickness 186T of the conduit section 184 at that location 600. As shown in FIG. 6A, in some example embodiments, the conduit 124 is a condensate drain line of an air conditioning system and is configured to direct condensate from a drip pan of a process unit 102 that includes an air handler of the air conditioning system to a conduit outlet 130 of the conduit 124 that is a condensate drain outlet through at least the conduit section interior 184I. However, it will be understood that example embodiments are not limited thereto. The conduit section 184 may be a horizontal length of pipe, for example PVC pipe such that the conduit section sidewall 186 is formed of PVC, but example embodiments are not limited thereto. As shown, the conduit section 184 may be a segment of the conduit 124 that is defined by multiple segments of components (e.g., connection fitting 604 and elbow joint 606) being connected to the conduit section 184, but example embodiments are not limited thereto.

As shown in FIG. 6A, the access point location 600 may be selected to be a location on the outer sidewall surface 186OS that is at least a minimum spacing distance 602 along the length of the conduit section 184, in both an upstream (602U) and a downstream (602D) direction, from adjacent structure and/or other conduit sections. For example, where the conduit section 184 is selected to be a horizontal section of a conduit 124 that is a condensate drain line connected to a process unit 102 that includes an air handler, and where the conduit section 184 is connected between a connection fitting 604 of the conduit 124 to the air handler and an elbow joint 606 (each of which may be considered to be separate conduit sections of the conduit 124), the access point location 600 may be determined to be a location on the upper side of the outer sidewall surface 186OS of the conduit section 184 that is at least a minimum spacing distance of 2" from both the connection 604 (602U) and the elbow joint (602D). Such spacing may reduce or minimize damage to the conduit 124 at the interface between the conduit section 184 and other conduit sections and/or structures (e.g., fittings). In some example embodiments, the spacing distances 602U and 602D are equal or substantially equal, so that the access point location 600 is at a midpoint of along the length (in the direction of the longitudinal axis 184LA) of the conduit section 184.

In some example embodiments where the conduit section 184 extends horizontally (e.g., perpendicular to the direction of gravity), the access point location 600 may be selected as a location at a "top" end of the conduit section opposite from the direction of gravity, so that the access point opening 140 may face "upwards", to mitigate the risk of leakage of fluid from the conduit section through the access point opening 140 via gravity.

As shown in FIGS. 5, 6B-6D, and 7A-7B, at S504 the installation guide device 400 is coupled to the conduit section 184. As shown, the installation guide device 400 may be the same as the installation guide device shown in FIGS. 4A-4G, such that the installation guide device 400 includes a drill bit device 410 configured to drill through the sidewall thickness 186T of the conduit section 184 and a guide conduit 422 having at least a lower guide opening 422O, where the installation guide device 400 is configured to enable longitudinal movement (e.g., along longitudinal axes 410LA, 411LA, 422LA) of the drill bit device 410 at least partially through the guide conduit 422 and at least partially through the lower guide opening 422O. The installation guide device 400 may include a protrusion stop structure 430 configured to limit longitudinal protrusion of the drill bit device 410 (e.g., the exposed portion 412E of the drill bit body 412) from the lower guide opening 422O to a particular protrusion distance 452. However, it will be understood that example embodiments are not limited to such an installation guide device 400.

Figure 6B:
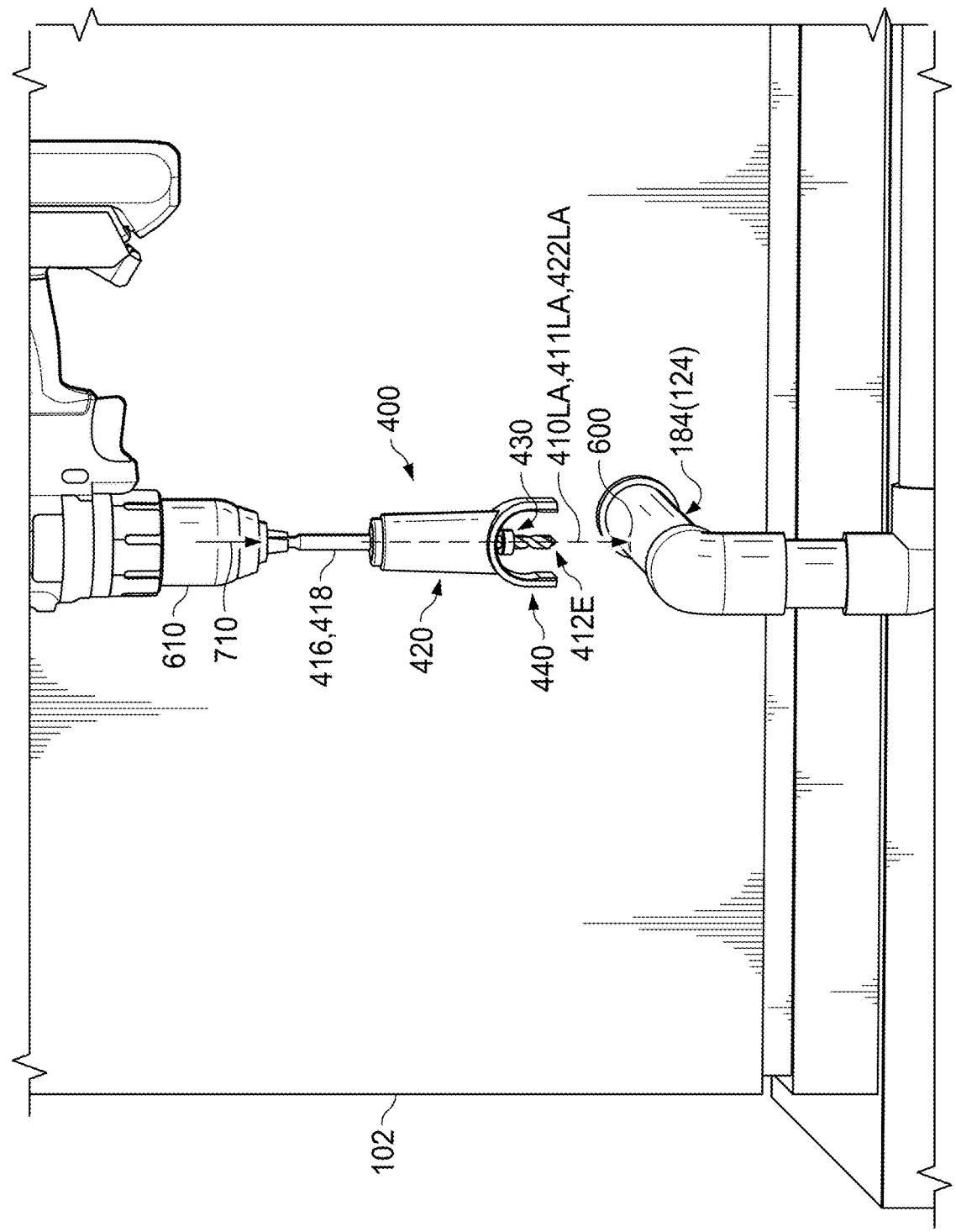
Figure 7A:
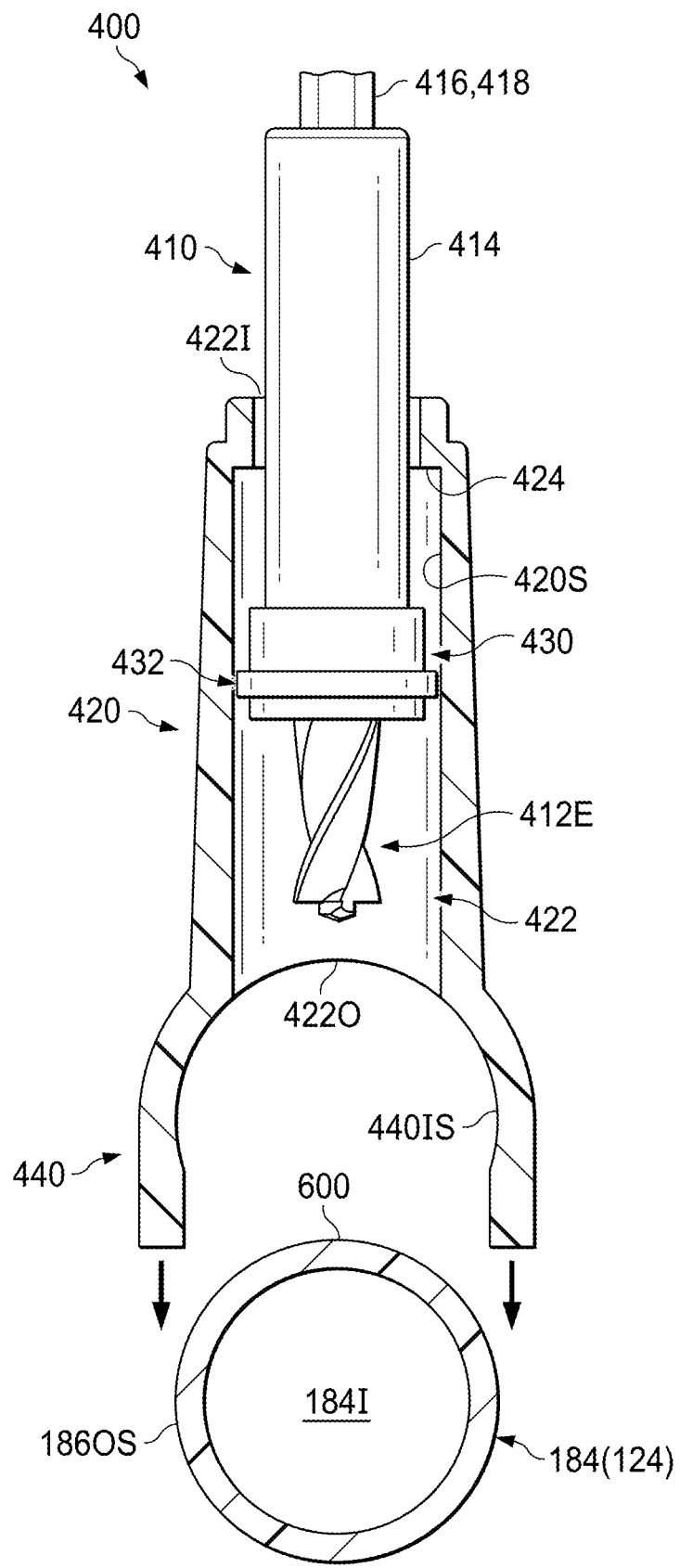
FIGS. 7A, 7B, 7C, 7D, 7E, 7F, 7G, and 7H are cross-sectional elevation views, along the cross-sectional view line VI-VI' shown in FIG. 2, of separate operations of the method shown in FIG. 5, according to some example embodiments.
Figure 7B:
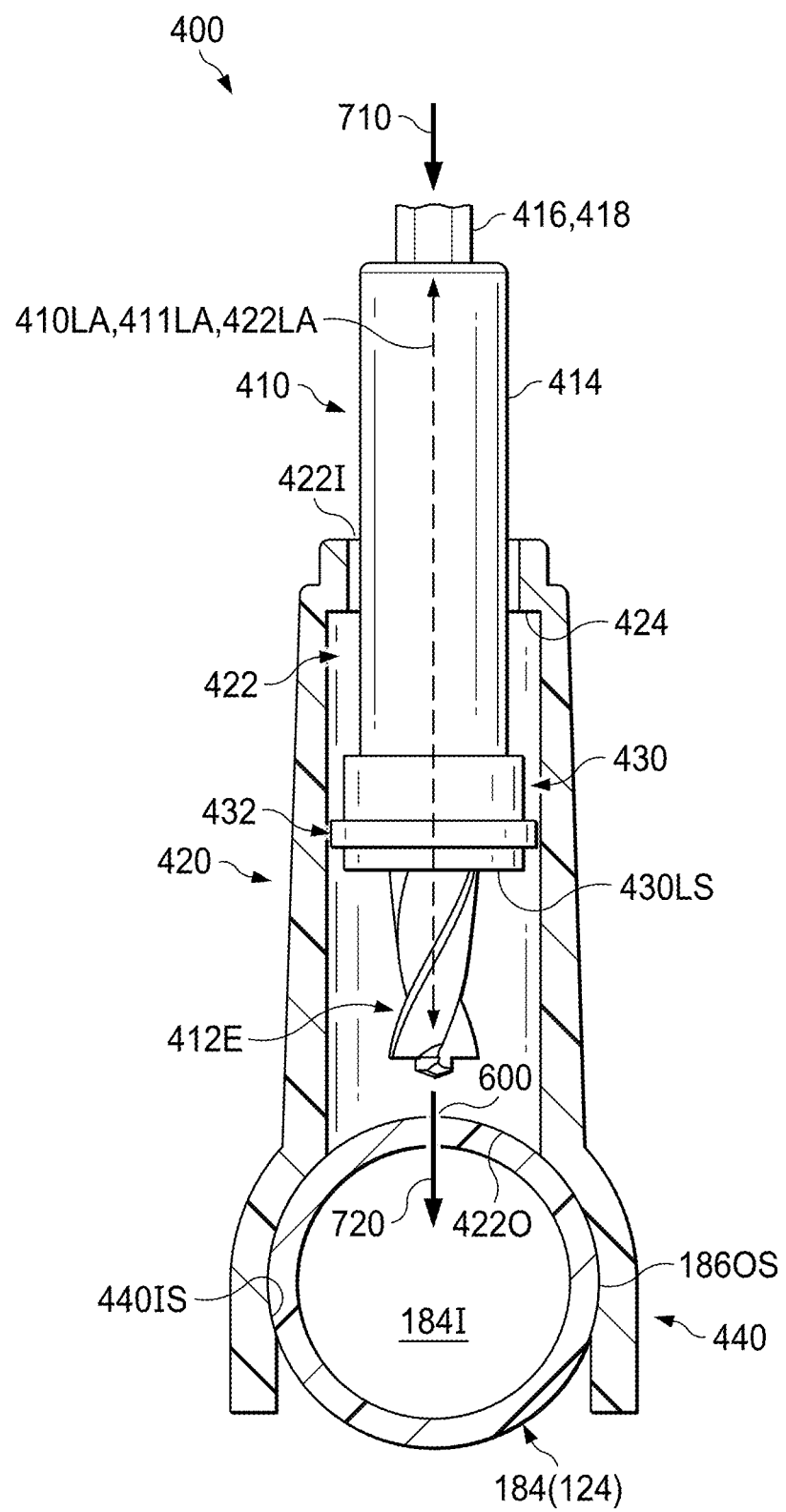

As further shown in FIGS. 5, 6B, and 7A, the coupling the installation guide device 400 to the conduit section 184 at S504 may include, at S506 aligning the lower guide opening 422O with the access point location 600 on the outer sidewall surface 186OS of the conduit section 184, for example to cause the longitudinal axis 422LA of the lower guide opening 422O to axially overlap the access point location 600, for example to intersect the access point location 600 in a direction that is perpendicular to the outer sidewall surface 186OS at the access point location 600.

As further shown in FIGS. 5, 6B-6D, and 7A-7B, the coupling the installation guide device 400 to the conduit section 184 at S504 may include, at S508 aligning the drill bit device 410 with the access point location 600 on the outer sidewall surface 186OS of the conduit section 184, for example to cause the longitudinal axis 410LA of the drill bit device 410 and/or the longitudinal axis 411LA of the drill bit 411 to axially overlap the access point location 600, for example to intersect the access point location 600 in a direction that is perpendicular to the outer sidewall surface 186OS at the access point location 600.

In some example embodiments, and as shown, the installation guide device 400 may include a guide connector 440 that is configured to couple the installation guide device 400 to the conduit section. As shown, the guide connector 440 may be connected to and/or a part of the guide device 420, but example embodiments are not limited thereto. The guide connector may engage (e.g., clamp) the conduit section sidewall 186 at the outer sidewall surface 186OS (e.g., directly engage and clamp the outer sidewall surface 186OS) to couple the installation guide device 400 to the conduit section 184. As shown, where the guide connector 440 is connected to the guide device 420, and where installation guide device 400 includes a distal stop structure 424 that is configured to inhibit longitudinal movement of the drill bit device 410 away from the lower guide opening 422O and at least partially through the guide conduit 422, the coupling at S504 may include aligning the guide connector 440 with the conduit section 184 to align the guide conduit 422 with the access point location 600 before, during, or after manipulating the guide connector 440 to engage and couple with (e.g., clamp) the conduit section 184 (e.g., the outer sidewall surface 186OS thereof). Such aligning and coupling may simultaneously align the drill bit device 410 with the access point location 600, based on the drill bit device being located within the guide conduit 422, but example embodiments are not limited thereto.

Figure 6C:
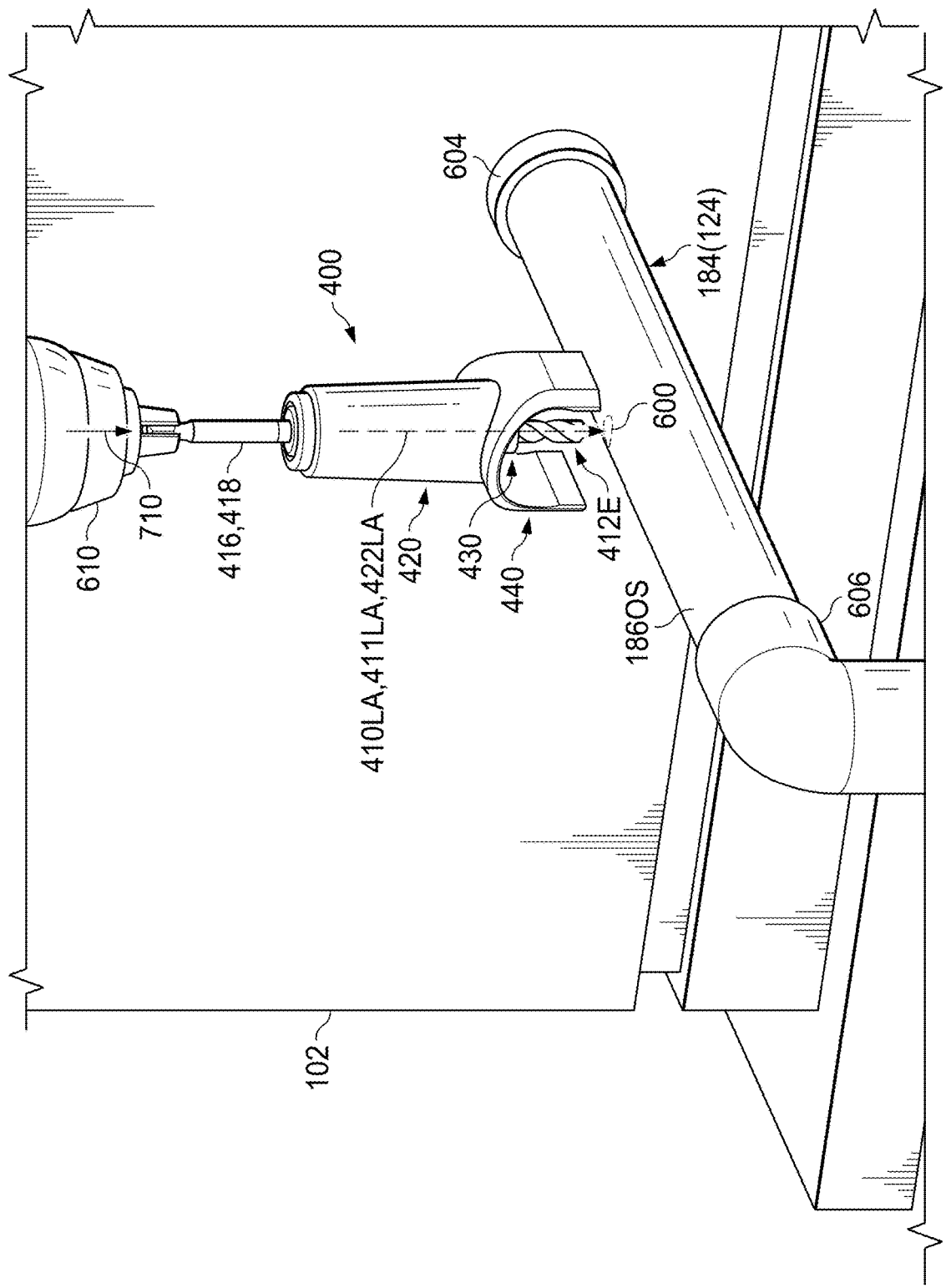
Figure 6D:
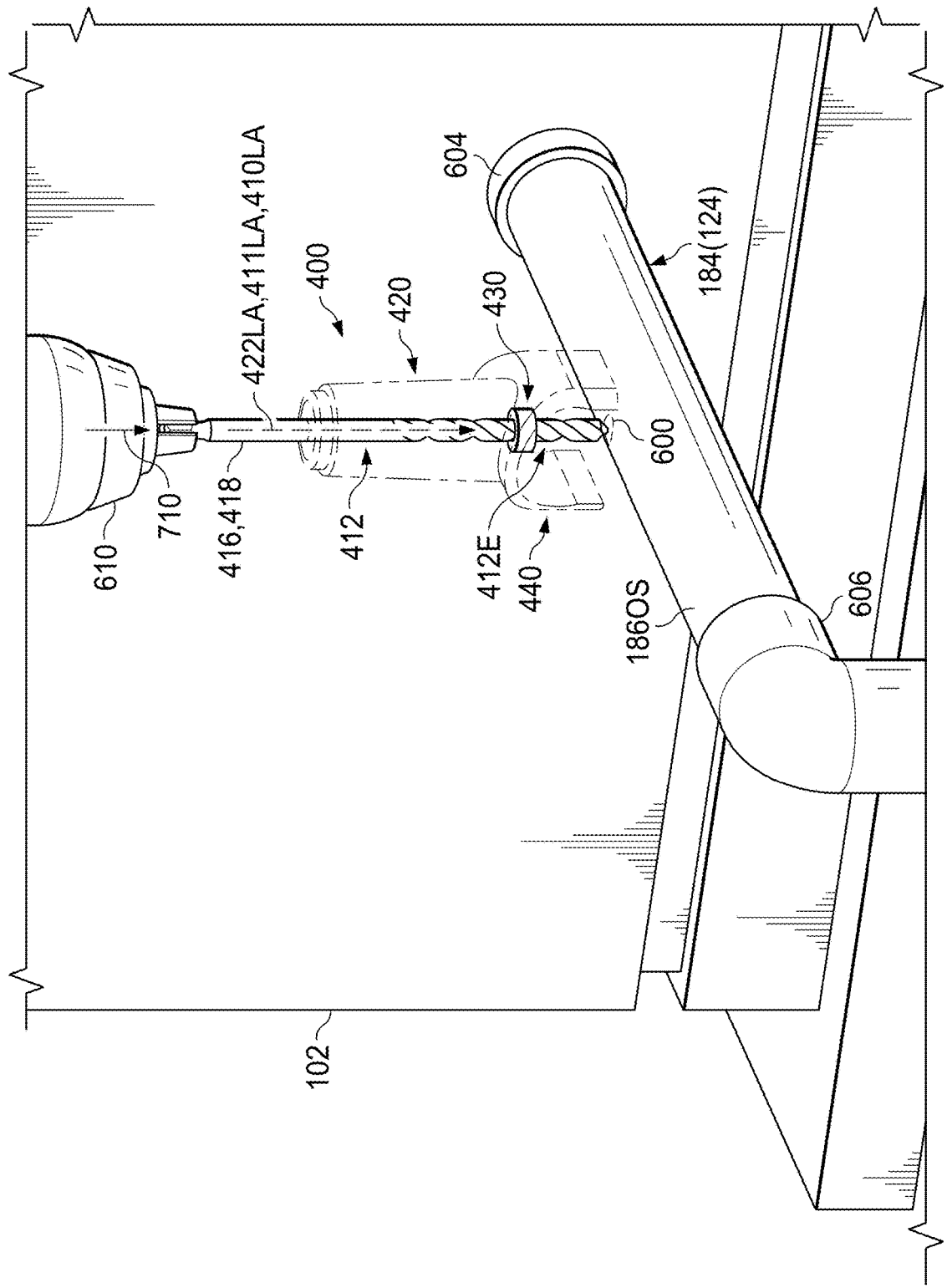

For example, as shown in at least FIGS. 6B-6C, the distal end of the drill bit device 410, including for example the shank 416 and tang 418 of the drill bit 411, may be mechanically coupled to a driver device 610 (e.g., a handheld drill) prior to coupling the installation guide device 400 with the conduit section 184, although example embodiments are not limited thereto and the driver device 610 may be mechanically coupled with the drill bit 411 subsequently to the installation guide device 400 coupling with the conduit section 184. As shown, the installation guide device 400 may be oriented in a vertical orientation above the access point location 600 where the longitudinal axes 410LA, 411LA, 422LA are approximately aligned with (e.g., axially aligned with and/or overlapping) the access point location 600, and the guide device 420 may be movable in relation to the drill bit device 410 and may fall under gravity so that the drill bit device 410 is withdrawn from the guide conduit 422 via the upper guide opening 422I until the drill bit device 410 and/or a protrusion stop structure 430 engages a distal stop structure 424 to inhibit further movement of the drill bit device 410 out of the guide conduit 422 via the upper guide opening 422I. The guide device 420 may then be coupled to the conduit section 184 based on the guide connector 440 engaging the outer sidewall surface 186OS, and the drill bit device 410 may then be moved longitudinally downwards, or inserted, further into the guide conduit 422 via the upper guide opening 422I based on longitudinal force 710 applied on the drill bit device 410 by the driver device 610 while the guide device is coupled to the conduit section 184.

As shown in FIGS. 5, 6E, and 7C-7D, at S510 the drill bit device 410 is operated, for example based on operating the driver device 610, to cause the drill bit device 410 and the drill bit 411 thereof to rotate around the longitudinal axis 410LA, 411LA thereof, while the installation guide device 400 is coupled to the conduit to cause the drill bit device 410 to move longitudinally 720 at least partially through the lower guide opening 422O to a protrusion distance that is equal to or less than the particular protrusion distance, such that the drill bit device 410 (e.g., the exposed portion 412E of the drill bit body 412) drills through the sidewall thickness 186T of the conduit section 184 from the access point location 600 to form an access point opening 140 through the sidewall thickness 186T of the conduit section 184 into a conduit section interior 184I of the conduit section.

Figure 6E:
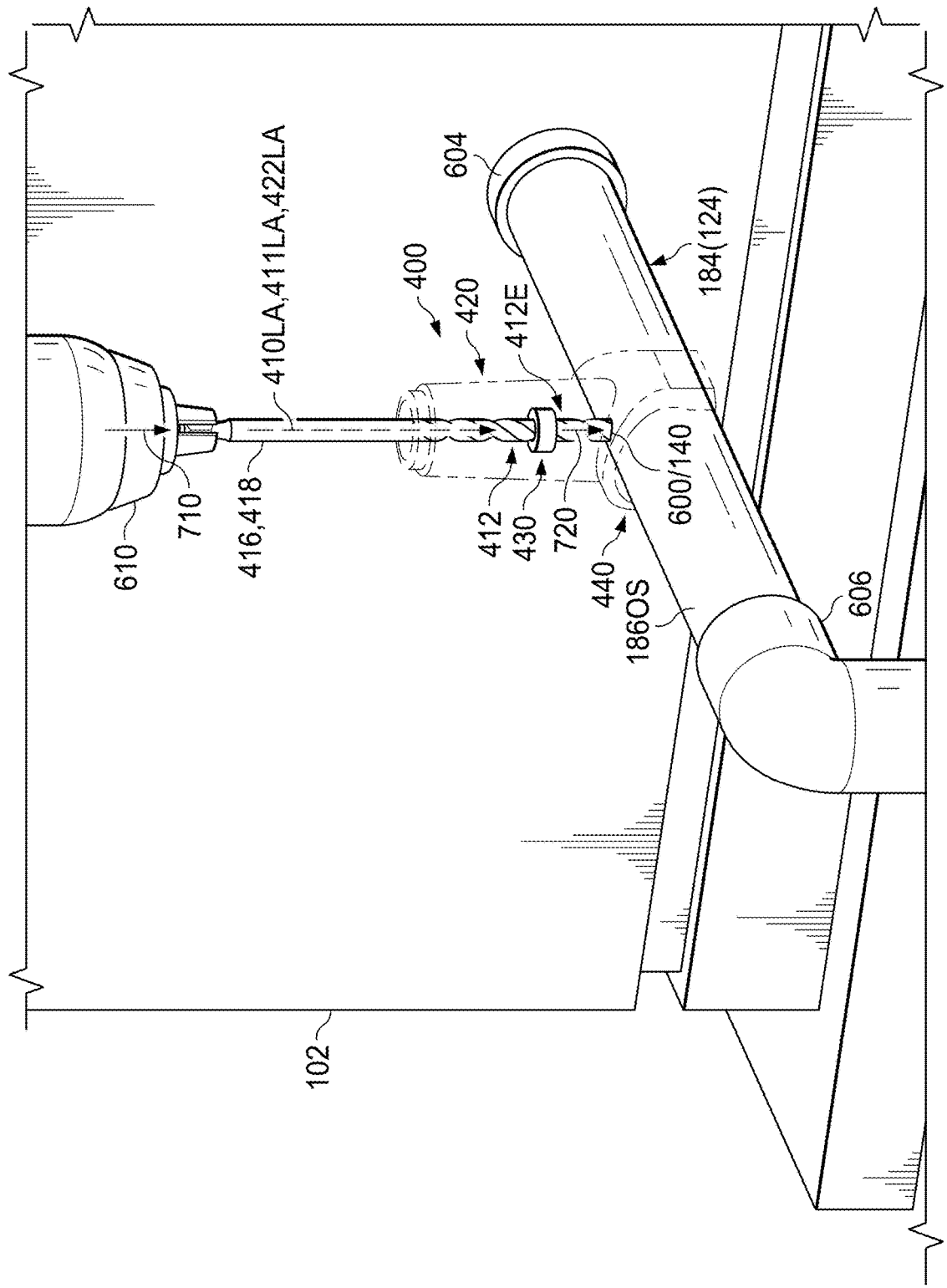
Figure 6F:
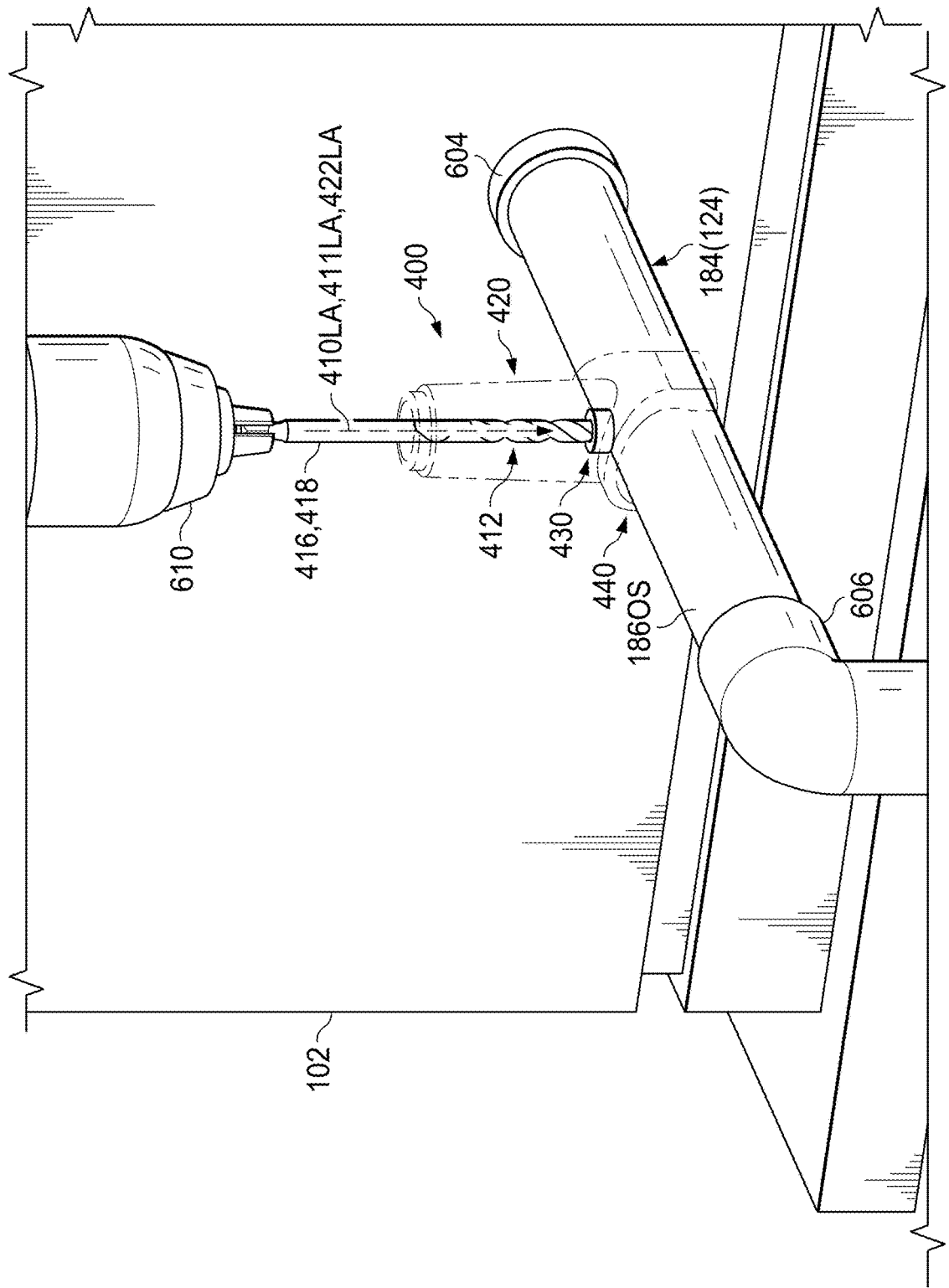
Figure 7C:
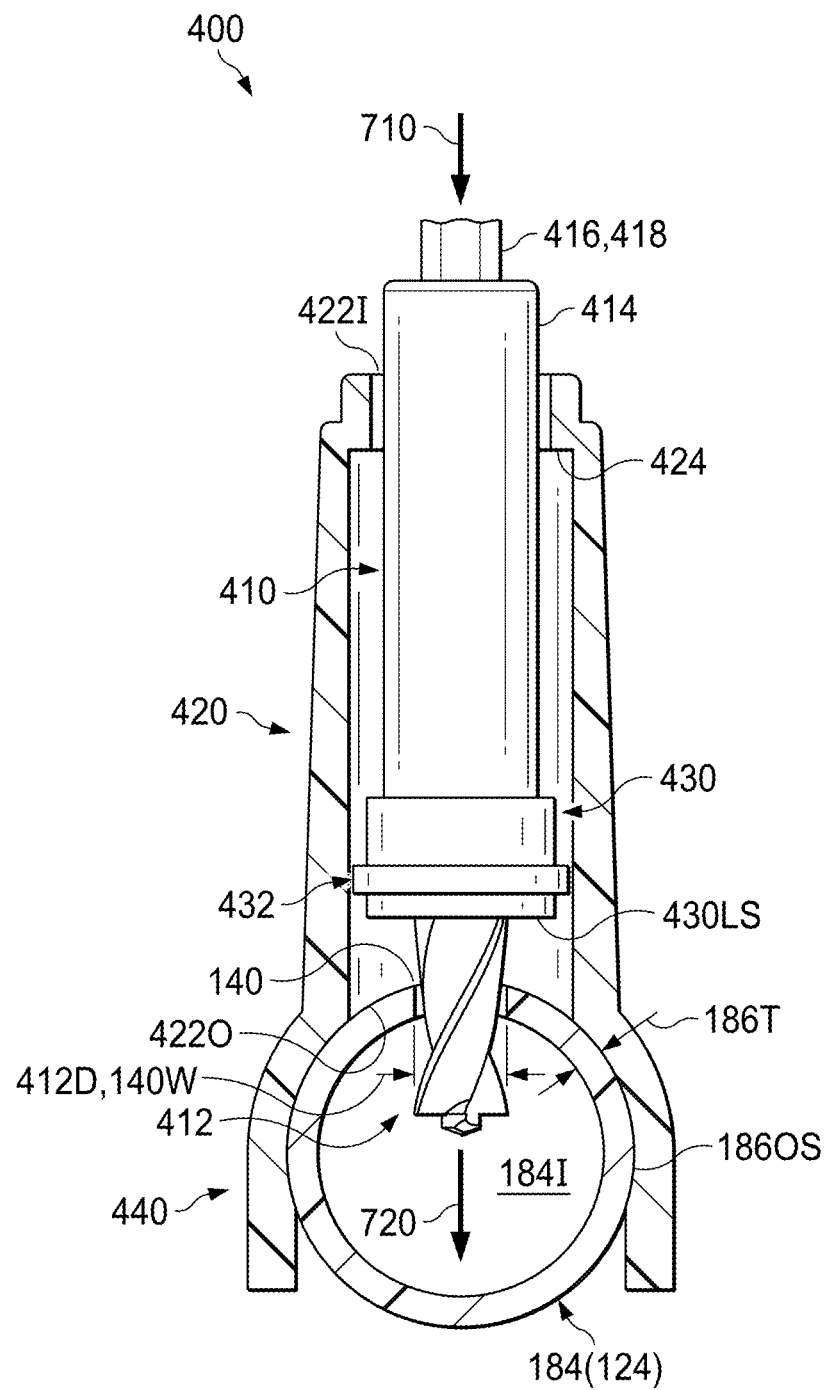
Figure 7D:
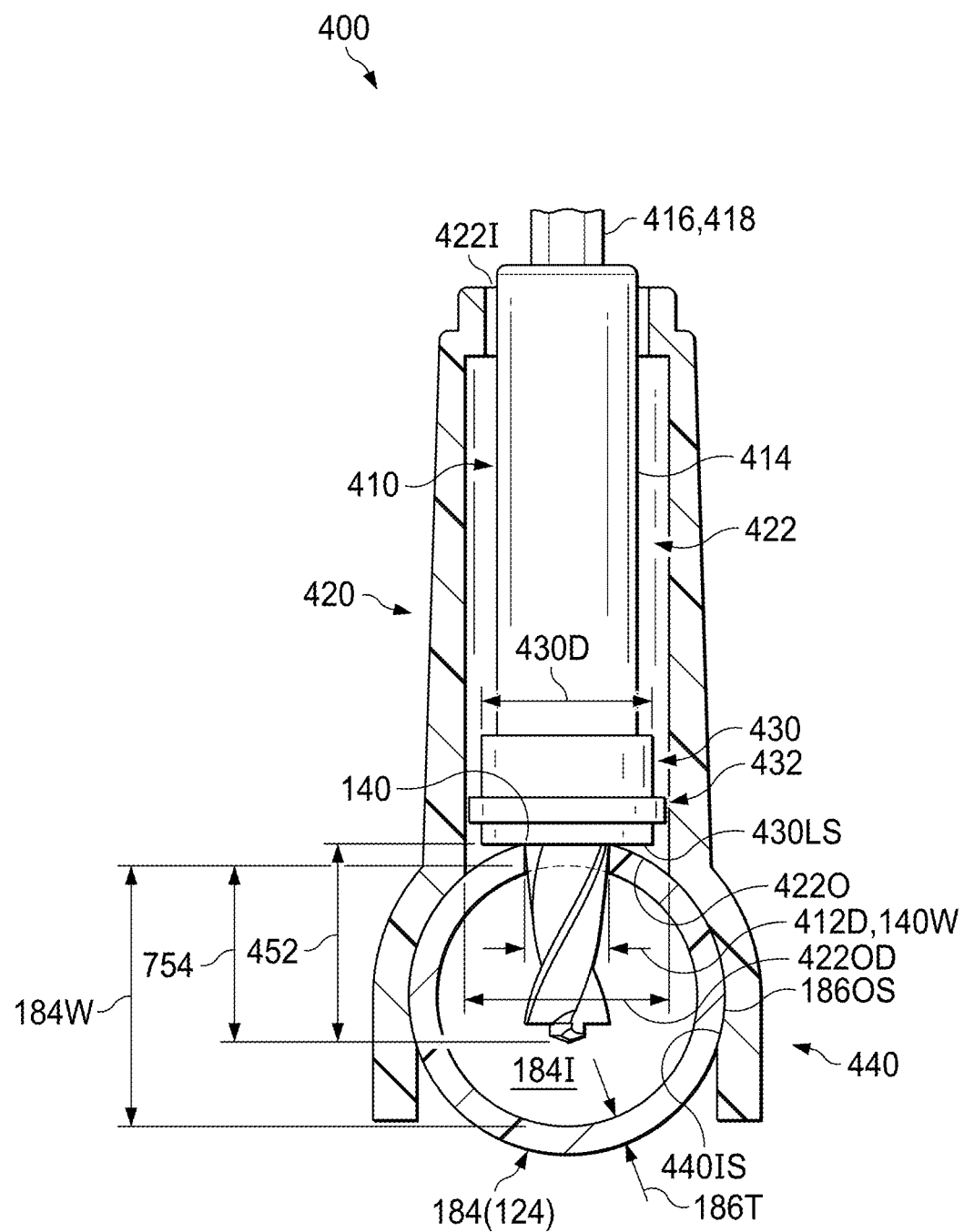

As shown, the drill bit device 410 may move longitudinally 720 into the conduit section 184 from the outer sidewall surface 186OS to cause a surface 430LS of the protrusion stop structure 430 to approach an axially overlapping portion of the outer sidewall surface 186OS, based on the protrusion stop structure 430 having a diameter 430D that is greater than the drill bit size 412D and thus greater than the diameter 140W of the access point opening 140 that is formed. As a result, and as shown in FIGS. 6F and 7D, the protrusion stop structure 430 may engage the axially overlapping portions of the outer sidewall surface 186OS to inhibit further longitudinal movement 720 of the drill bit device 410 into the conduit section interior 184I and thus limit the longitudinal protrusion of the exposed portion 412E of the drill bit body 412 into the conduit section 184 from the outer sidewall surface 186OS to be equal to or greater than the particular protrusion distance 452 and thus to cause the protrusion of the exposed portion 412E of the drill bit body 412 into the conduit section interior 184I from the inner sidewall surface 186IS to be an inner protrusion distance 754 which may be a particular proportion of the inner diameter 184W of the conduit section interior 184I defined by the inner sidewall surface 186IS. In some example embodiments, the inner diameter 184W of the conduit section 184 as defined by the conduit section sidewall 186 (e.g., the inner sidewall surface 186IS) may be 1", ¾", or the like, but example embodiments are not limited thereto. In some example embodiments, the outer diameter of the conduit section 184 as defined by the conduit section sidewall 186 (e.g., the outer sidewall surface 186OS) may be 2", 1.5", 1.25", 1", ¾", or the like, but example embodiments are not limited thereto.

As a result, and as shown at S512, a determination may be made whether the protrusion stop structure 430 has engaged (contacted) the outer sidewall surface 186OS of the conduit section 184. If not (S512=NO), the drilling through the sidewall thickness 186T of the conduit section sidewall 186 at the access point location 600 may, at S514, continue as shown in FIGS. 6E and 7C may continue. If so (S512=YES), as shown in FIGS. 6F and 7D, at S516 the operation (e.g., at least the longitudinal movement 720) of the drill bit device 410 through the lower guide opening 422O towards the conduit section interior 184I may be stopped. The rotation of the drill bit device 410 around the longitudinal axis 410LA thereof may also be stopped at S516, but example embodiments are not limited thereto.

As shown in FIGS. 6F and 7C-7D, the protrusion stop structure 430 may be fixed in relation to the drill bit device 410 (e.g., integrated into the sheath structure 414 of the drill bit device 410) such that the protrusion stop structure 430 is configured to move with the drill bit device 410 in relation to the guide conduit 422 and inhibit protrusion of the drill bit device 410 beyond the particular protrusion distance 452 from the lower guide opening 422O while the installation guide device 400 is coupled to the conduit section based on a lower surface 430LS of the protrusion stop structure 430 contacting (e.g., engaging) the outer sidewall surface 186OS of the conduit section 184. However, example embodiments are not limited thereto. For example, referring to FIG. 9, the protrusion stop structure 430 may be fixed in relation to the guide conduit 422 (e.g., based on being coupled to and/or integrated with the guide device 420) such that the drill bit device 410 is configured to move longitudinally 720 at least in relation to the protrusion stop structure 730 while moving at least partially through the lower guide opening 422O and the protrusion stop structure 430 is configured to inhibit protrusion of the drill bit device 410 beyond the particular protrusion distance 452 from the lower guide opening 422O while the installation guide device 400 is coupled to the conduit section based on an upper surface 430US of the protrusion stop structure 430 contacting a lower surface 914LS of the drill bit device 410.

Figure 6G:
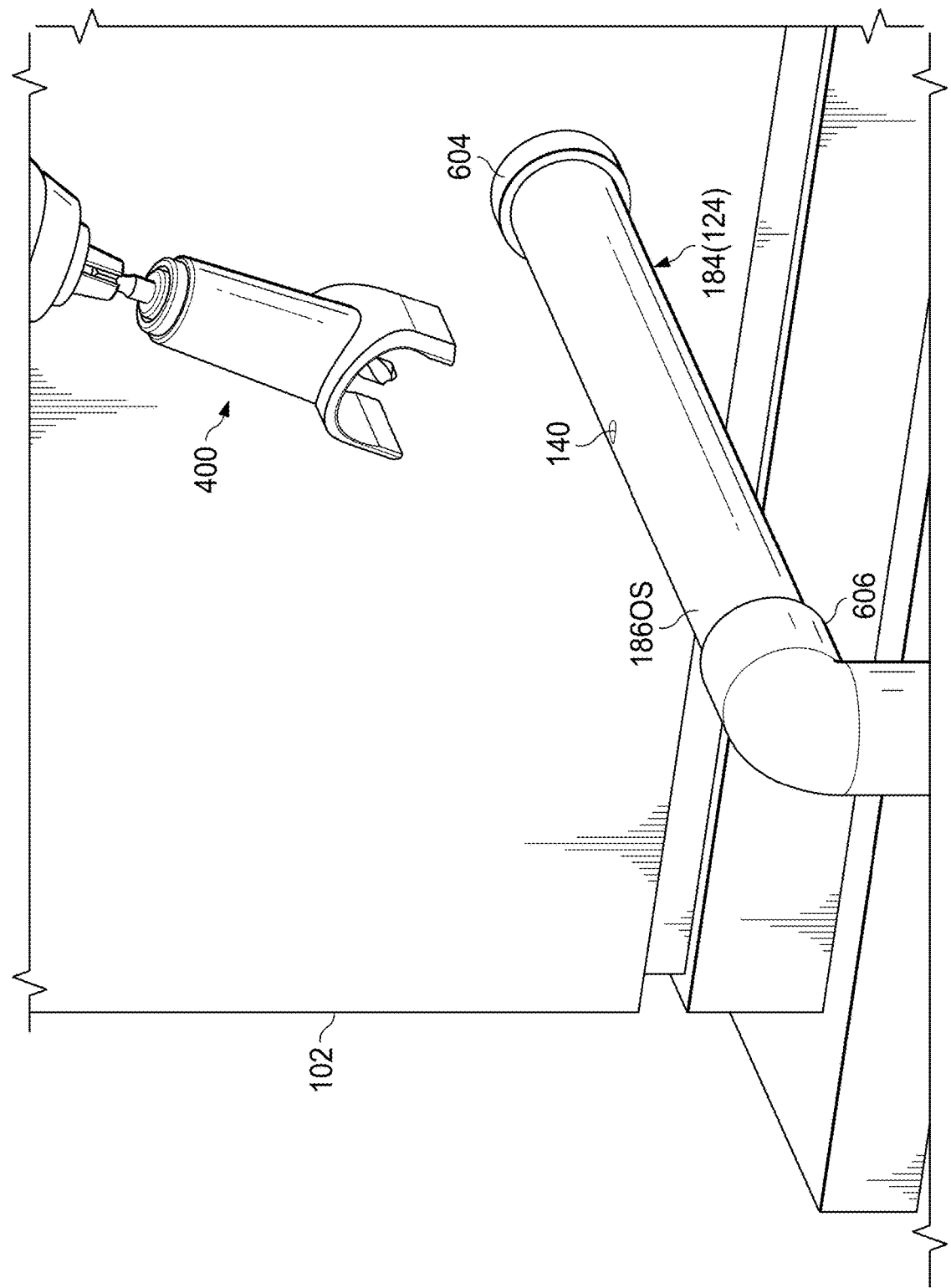
Figure 6H:
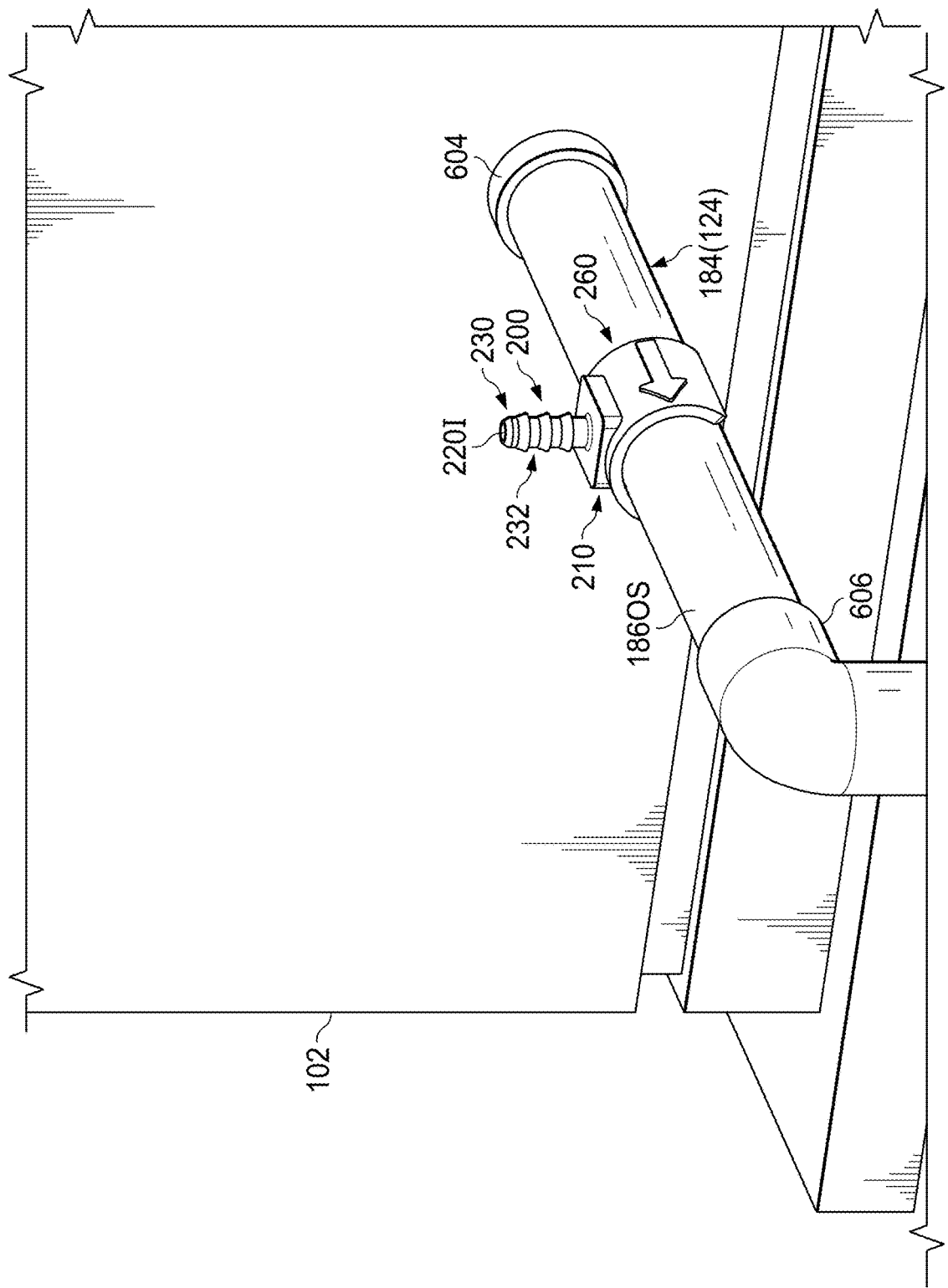
Figure 7E:
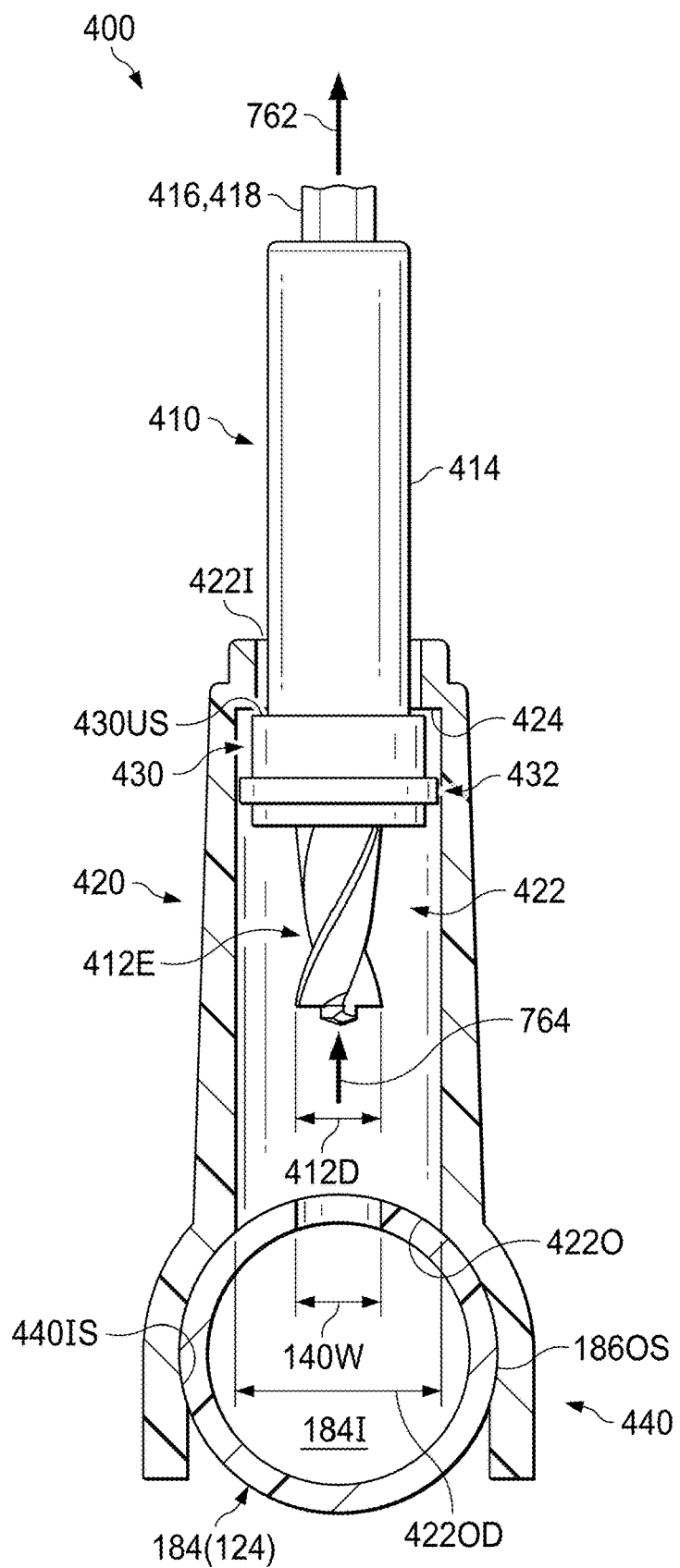

As shown in FIGS. 5, 6G, and 7E, at S518 the installation guide device 400 is decoupled from the conduit section 184 to expose the access point opening 140. The decoupling may include applying a withdrawing (upward) force 762 on the drill bit device 410 (e.g., via the driver device 610 mechanically coupled to the drill bit 411) to withdraw the drill bit device 410 from the access point opening 140 and to move through the guide conduit 422 and at least partially through the upper guide opening 422I. As shown in FIG. 7E, the installation guide device 400 may include a distal stop structure 424 that is configured to inhibit longitudinal movement of the drill bit device 410 away from the lower guide opening 422O and at least partially through the guide conduit 422 so as to prevent complete removal of the drill bit device 410 from the guide conduit 422, which may reduce, minimize, or prevent accidents or loss of the drill bit device 410.

As further shown, the decoupling at S518 may include causing the guide connector 440 to disengage from the outer sidewall surface 186OS of the conduit section 184 to enable the installation guide device 400 to be removed from the conduit section 184 to expose the access point opening 140.

As shown in FIGS. 5, 6H, and 7F-7G, at S520 an adaptor device 200 is coupled to the conduit section at the exposed access point opening 140. As shown, the adaptor device 200 may be the same as the adaptor device 200 shown in FIGS. 2 and 3A-3I, such that the adaptor device 200 includes an adaptor conduit 220 extending between an adaptor inlet 220I and an adaptor outlet 220O, but example embodiments are not limited thereto.

As shown, the coupling the adaptor device 200 at S520 may include at least partially aligning the adaptor outlet 220O with the access point opening 140, for example such that the adaptor outlet 220O at least partially axially overlaps the access point opening 140, to align the adaptor conduit 220 with the access point opening 140 to establish fluid communication from the adaptor inlet 220I to the conduit section interior 184I through at least the adaptor conduit 220 and the access point opening 140. As described herein, the adaptor conduit 220 may be interchangeably referred to as an adaptor supply conduit.

Figure 7F:
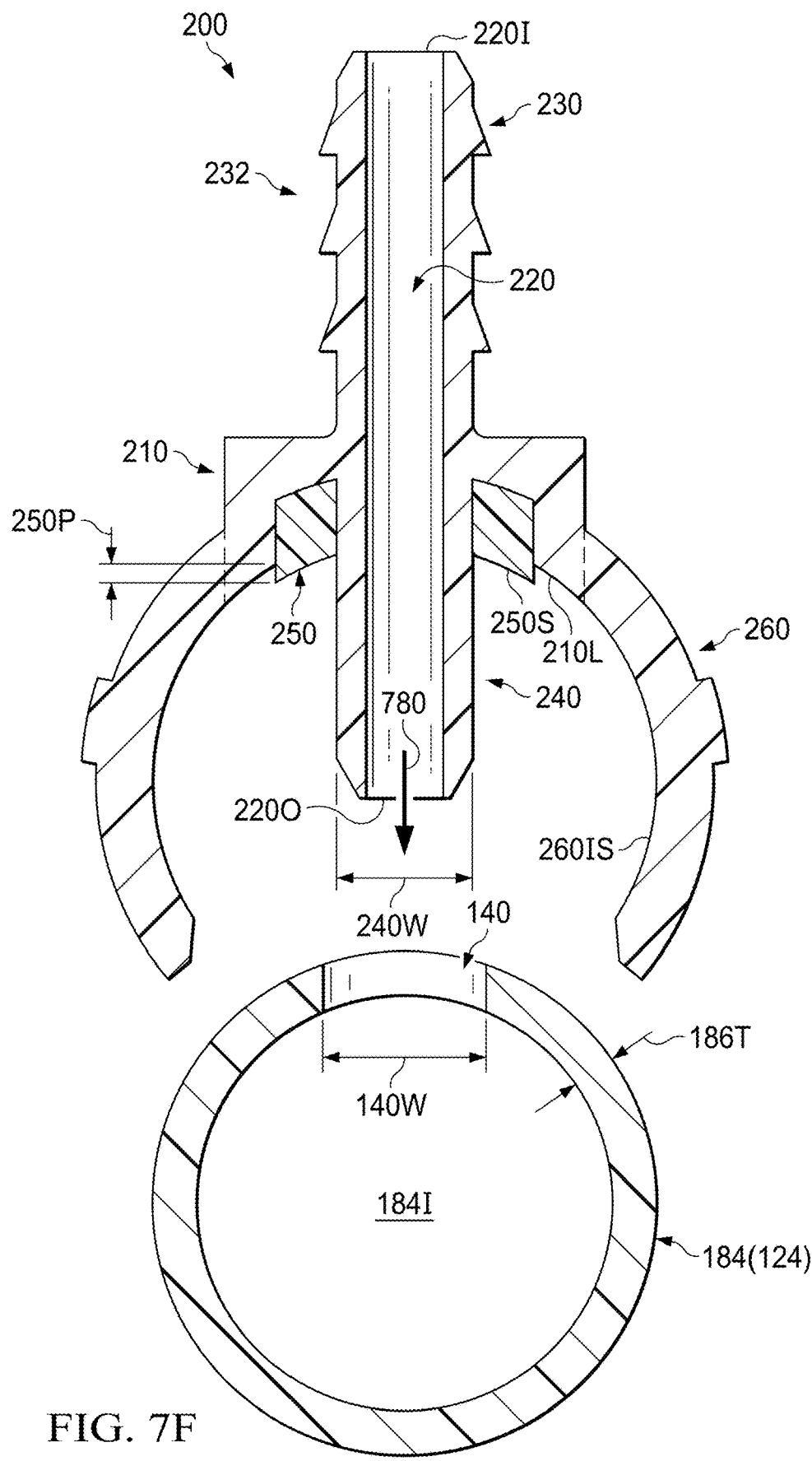

As shown, particularly in FIG. 7F, the coupling at S520 may include aligning the adaptor outlet 220O with the access point opening 140 and moving 780 the adaptor device 200 to the conduit section 184 so that the conduit connector 260 of the adaptor device 200 engages (e.g., contacts, clamps, etc.) the outer sidewall surface 186OS of the conduit section sidewall 186 to hold the adaptor device 200 in place in relation to the conduit section 184 while the adaptor outlet 220O is aligned with the access point opening 140 to establish the fluid communication from the adaptor inlet 220I to the conduit section interior 184I through at least the adaptor conduit 220 and the access point opening 140.

Figure 7G:
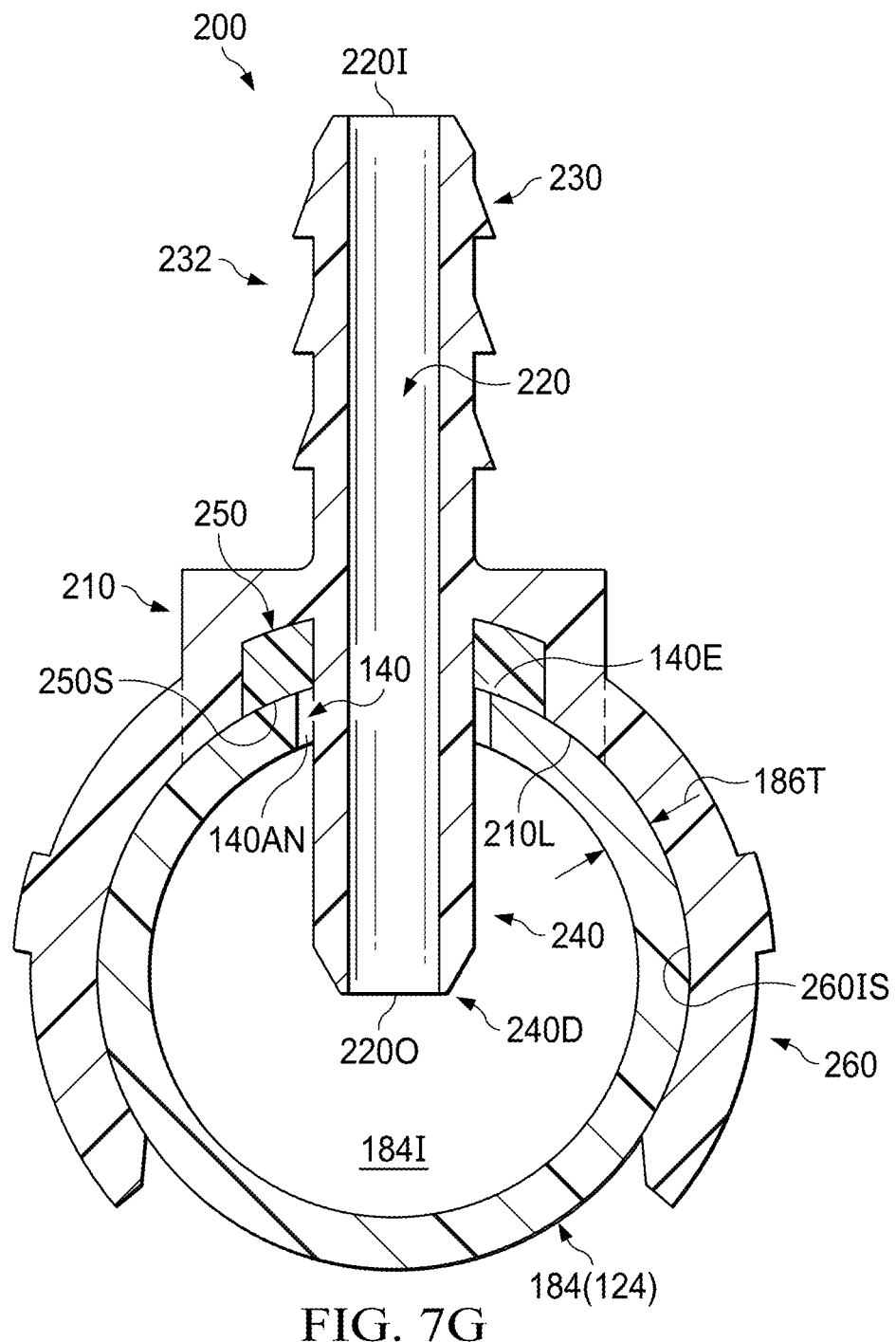

As shown in at least FIGS. 7F and 7G, and referring to FIGS. 2 and 3A-3I, the adaptor device 200 may include an outlet nozzle 240 extending below a lower surface of the adaptor device 200 (e.g., the lower end 210L of the adaptor conduit structure 210) and defining the adaptor outlet 220O at a distal end 240D and further defining at least a portion of the adaptor conduit 220 (e.g., outlet conduit portion 240C as shown in FIG. 3H) through an interior of the outlet nozzle 240, such that the adaptor conduit 220 at least partially extends through the outlet nozzle 240 to the adaptor outlet 220O.

As shown in FIGS. 5, 6H, 7F, and 7G, the coupling the adaptor device 200 that includes such an outlet nozzle 240 to the conduit section may include, at S522, inserting the outlet nozzle 240 at least partially through the access point opening 140 to cause at least the distal end 240D of the outlet nozzle 240 to at least partially extend through the access point opening from the outer sidewall surface 186OS. As further shown in FIG. 7G, in example embodiments where the length of the outlet nozzle 240 is greater than the magnitude of the sidewall thickness 186T of the conduit section 184, the inserting at S522 as part of the coupling at S520 may cause the distal end 240D of the outlet nozzle 240 to extend through an entirety of the access point opening 140 from the outer sidewall surface 186OS (e.g., an end opening of the access point opening 140 in the outer sidewall surface 186OS to at least an end opening of the access point opening 140 in the inner sidewall surface 186IS) such that the distal end 240D of the outlet nozzle 240 is within the conduit section interior 184I that is at least partially defined by the inner sidewall surface 186IS.

As further shown in at least FIGS. 2, 3F, and 3I, the adaptor outlet 220O defined by the outlet nozzle 240 may further define, have, or include a side opening 222O, also referred to herein as an axial recess or groove, a side recess or groove, or the like, that extends at least partially along the sidewall 240S of the outlet nozzle 240 to be an opening through at least a portion of the sidewall 240S to expose at least a distal part of the outlet conduit portion 240C in a particular direction 160D defined by the position of the opening, such direction extending radially from the longitudinal axis of the outlet nozzle 240. The side opening 222O may be configured to cause fluid 160 passing through the outlet nozzle 240 to flow at least partially in a particular direction 160D that extends perpendicular to the longitudinal axis of the outlet nozzle 240 and at least partially paraxial to the longitudinal axis 184LA of the conduit section 184 based on the adaptor device 200 being coupled to the conduit section 184. As shown in FIG. 7G and further shown in FIG. 2, a portion of the sidewall 240S of the outlet nozzle 240 that is opposite the side opening 222O across the longitudinal axis of the outlet nozzle 240 may define a base structure 224 which may at least partially obscure the adaptor outlet 220O, including the side opening 222O, in a direction opposite to the direction 160D in which the outlet nozzle 240 is configured to cause at least a portion of the discharged fluid 160 to flow. Restated, based on the adaptor device being coupled at S520, a portion of the sidewall 240S of the outlet nozzle 240 that is opposite to the side opening 222O (e.g., base structure 224) may face towards an upstream end 184U of the conduit section 184 (e.g., an end facing towards the process unit 102 and configured to receive a separate fluid 120 into the conduit section 184 therefrom) such that the portion of the sidewall (base structure 224) is configured to at least partially shield the adaptor conduit 220 from a flow of a separate fluid 120 flowing through the conduit section interior 184I towards the access point opening 140.

Still referring to FIGS. 5, 6H, 7F, and 7G, the adaptor device 200 may include a sealing member 250 at a lower end 210L of the adaptor conduit structure 210 of the adaptor device (e.g., projecting downwards from the lower end 210L by a protrusion distance 250P), and the coupling the adaptor device 200 to the conduit section 184 may cause the sealing member 250 to seal at least an outer edge 140E of the access point opening 140. For example, based on the sealing member 250 extending (e.g., protruding) from the lower end 210L of the adaptor conduit structure 210 by a protrusion distance 250P and/or based on the sealing member 250 comprising a flexible, deformable, and/or elastic material (e.g., silicone), the coupling of the adaptor device 200 to the conduit section 184 at S520 may cause lower end 210L to come into direct contact with the outer sidewall surface 186OS to thereby cause the protruding portion of the sealing member 250 that protrudes from the lower end 210L by the protrusion distance 250P to be compressed to establish a seal that axially covers and/or surrounds the outer edge 140E of the access point opening 140 and may further or alternatively cause the sealing member 250 to move at least partially into the access point opening 140 from the outer end thereof to thereby improve the sealing of the outer edge 140E of the access point opening 140.

Figure 7H:
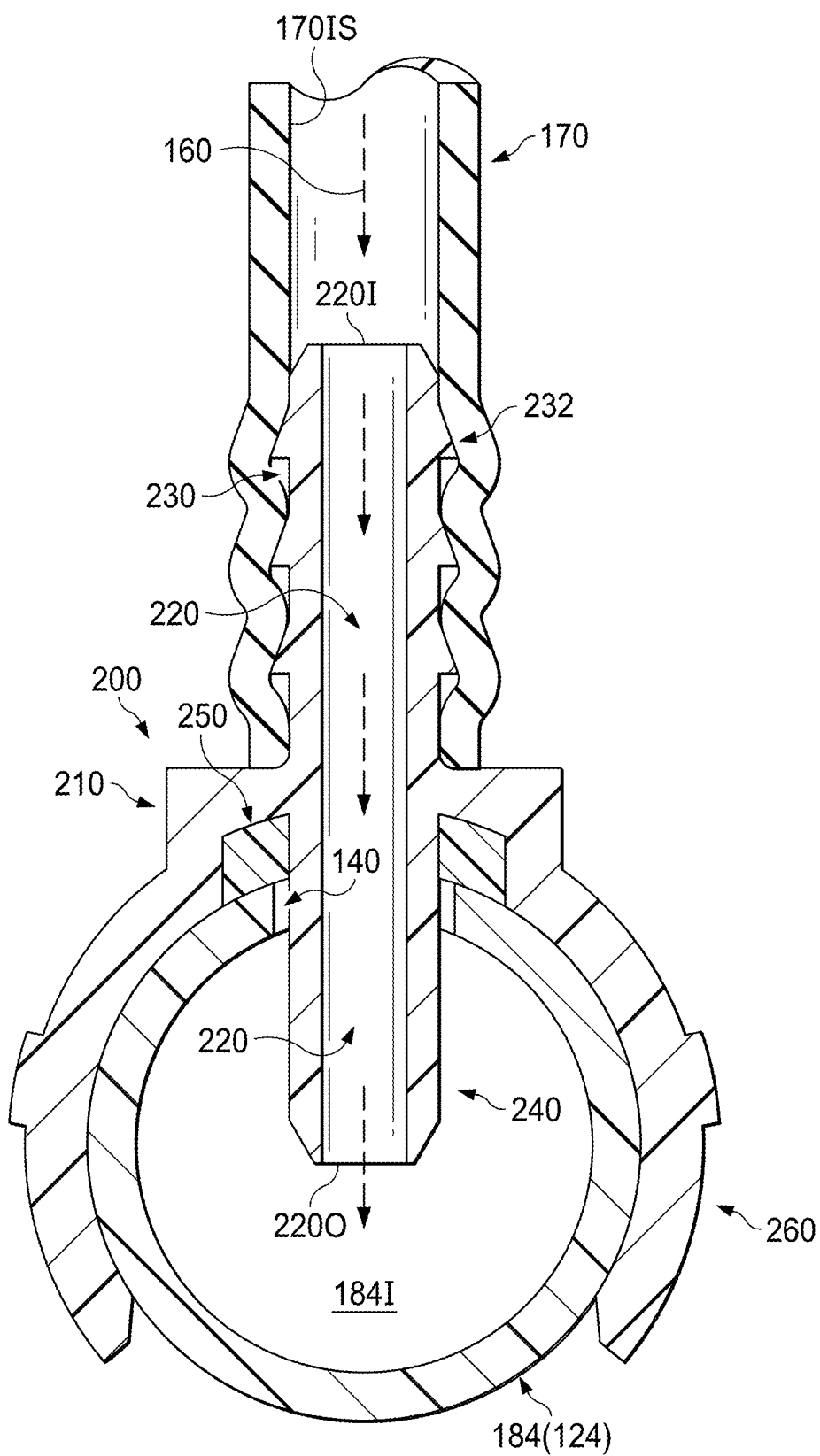

In some example embodiments, the adaptor device 200 may include an inlet connector 230 that is configured to couple with a fluid supply source 150 (e.g., via coupling with a fluid supply conduit 170) to cause the adaptor inlet 220I of the adaptor device 200 to be in fluid communication with the fluid supply source 150. Accordingly, and as shown in FIGS. 5 and 7H, at S524 the inlet connector 230 of the adaptor device 200 may be coupled to the inlet connector to the fluid supply source 150 (e.g., based on coupling with an end of the fluid supply conduit 170 that is coupled at an opposite end of the fluid supply conduit 170 to an outlet 152 of the fluid supply source 150) to establish fluid communication between the fluid supply source 150 and the conduit section interior through at least the adaptor conduit 220 and the access point opening 140.

At S526, the method may include operating the fluid supply source 150 (e.g., based on a processor (e.g., central processing unit or CPU) of the fluid supply source 150 executing a program of instructions stored on a memory (e.g., solid state drive storage device)) to supply (e.g., discharge, dispense, supply, etc.) an amount of the fluid 160 from the outlet 152 such that the fluid 160 is received at the adaptor inlet 220I from the fluid supply source 150 (e.g., via the fluid supply conduit 170) and the adaptor device 200 directs the received fluid 160 to flow through the adaptor conduit 220 and into the conduit section interior 184I to be supplied into at least a portion of the conduit 124.

In some example embodiments, and as shown in FIG. 1, the system 100 may be an air conditioning system, the process unit 102 may be an air handler of the air conditioning system, the conduit 124 may be a condensate drain line of the air conditioning system which is configured to direct condensate from a drip pan of the air handler of the air conditioning system to a condensate drain outlet through at least the conduit section interior 184I, the fluid 160 may be a cleaning composition configured to remove, clean, mitigate, break down, etc. biological substances, the fluid supply source 150 may be a cleaner dispensing system that is configured to operate to dispense an amount of the cleaning composition (e.g., at a fixed time interval), and the method may include, at S524, operating the cleaner dispensing system to dispense the cleaning composition, such that the adaptor device directs the cleaning composition dispensed by the cleaner dispensing system through the adaptor conduit and into the conduit section interior to be supplied into at least a portion of the condensate drain line to cause at least some biological substances to be removed from at least a portion of the condensate drain line, thereby mitigating or preventing condensate backflow in the condensate drain line.

Figure 8:
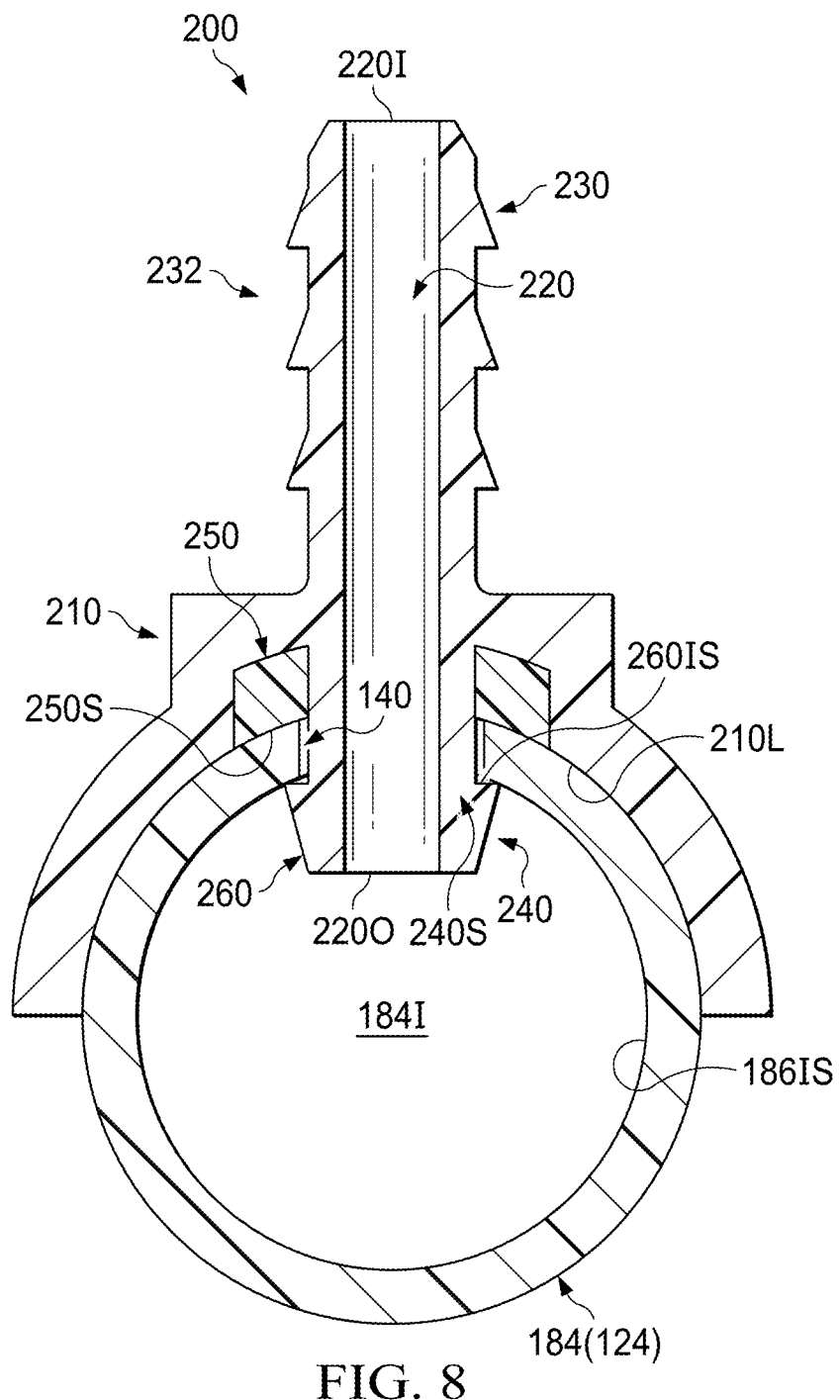
FIG. 8 is a cross-sectional elevation view, along the cross-sectional view line VI-VI' shown in FIG. 2, of an adaptor device according to some example embodiments.

FIG. 8 is a cross-sectional elevation view, along the cross-sectional view line VI-VI' shown in FIG. 2, of an adaptor device according to some example embodiments.

While some example embodiments, including the example embodiments shown in FIGS. 2 and 3A-3I, show an adaptor device 200 including a conduit connector 260 that is configured to engage with an outer sidewall surface 186OS of the conduit section 184 to couple the adaptor device 200 with the conduit section 184, example embodiments are not limited thereto. For example, as shown in FIG. 8, in some example embodiments the conduit connector 260 may extend from and/or may be at least partially defined by the sidewall 240S of the outlet nozzle 240, such that the conduit connector 260 may be configured to be inserted into the conduit section interior 184I through the access point opening 140 based on the outlet nozzle 240 being inserted through the access point opening 140 and further such that an inner surface 260IS of the conduit connector 260 may engage at least a portion of the inner sidewall surface 186IS of the conduit section sidewall 186 to hold the adaptor device 200 in place in relation to the conduit section 184 from the interior of the conduit section 184. The conduit connector 260 may be a barb, ferrule, radial projection, or the like extending at least partially radially from the longitudinal axis of the outlet nozzle. The conduit connector 260 may include a flexible "snap-fit" connector that is configured to flex inwards to reduce its cross-sectional diameter based on being inserted through the access point opening 140 and may return to its original cross-sectional diameter that is greater than the diameter 140W of the access point opening 140 based on the conduit connector inner surface 260IS entering the conduit section interior 184. Such a connector may be configured to resist being pulled out of the conduit section interior 184I through the access point opening 140, but example embodiments are not limited thereto, and in some example embodiments the conduit connector 260 may be configured to flex inwards to reduce its cross-sectional diameter to fit within the access point opening 140 based on being pulled out of the conduit section interior 184, thereby enabling the adaptor device 200 to be removed or decoupled from the conduit section. As shown, the adaptor conduit structure 210 lower end 210L may extend at least partially around the circumference of the outer sidewall surface 186OS of the conduit section sidewall 186 to provide stabilization of the adaptor device 200 when coupled to the conduit section 184.

Figure 9:
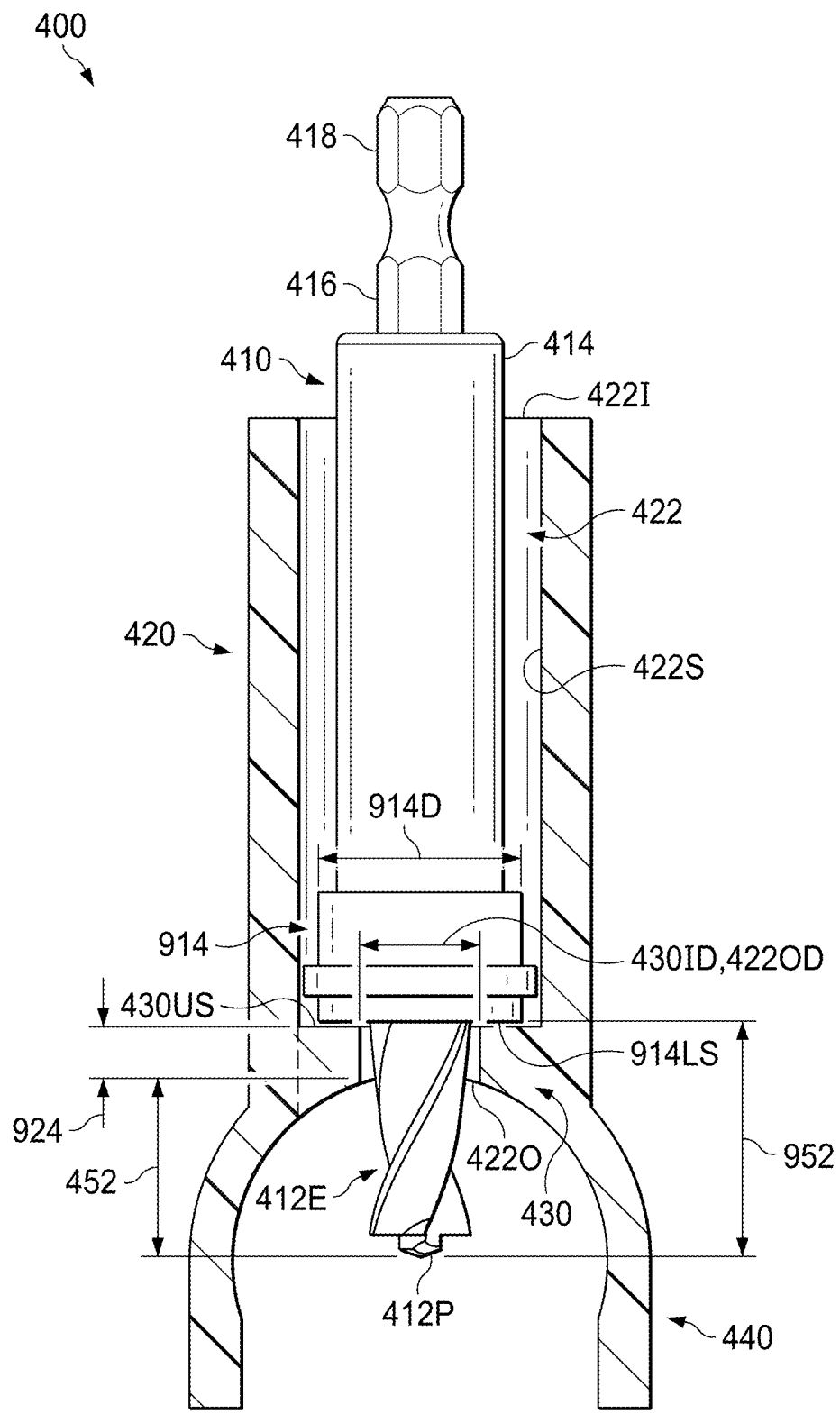
FIG. 9 is a cross-sectional elevation view, along the cross-sectional view line IVE-IVE' shown in FIG. 4B, of an installation guide device according to some example embodiments.

FIG. 9 is a cross-sectional elevation view, along the cross-sectional view line IVE-IVE' shown in FIG. 4B, of an installation guide device according to some example embodiments.

Referring to FIG. 9, in some example embodiments, the installation guide device 400 includes a protrusion stop structure 430 that is fixed in relation to the guide conduit 422 of the guide device 420. As a result, the drill bit device 410 may be configured to move longitudinally (e.g., along longitudinal axes 410LA, 411LA, and/or 422LA) at least in relation to the protrusion stop structure 430 while moving at least partially through the lower guide opening 422O. As shown, at least a portion of the drill bit device 410, for example, the sheath structure 414 may have at least a portion 914 thereof having an outer diameter 914D that is smaller than an inner diameter 430ID of an opening defined by the protrusion stop structure 430 and through which the drill bit device 410 is configured to longitudinally move, such that at least a surface 914LS of the drill bit device 910 axially overlaps at least a portion of an opposing surface 430US of the protrusion stop structure 430 when at least the portion 914 of the drill bit device 410 is in the guide conduit 422. As shown, the protrusion stop structure 430 may be coupled to and/or integrated with the guide device 420 at a location that is proximate to the lower guide opening 422O, for example such that the protrusion stop structure 430 may be a ring structure that defines the lower guide opening 422O having a diameter 422OD that is the inner diameter 430ID, but example embodiments are not limited thereto. As shown, based on the drill bit device 410 moving "downward" through the guide conduit 422 so that the exposed portion 412E of the drill bit body 412 begins to move through the lower guide opening 422O from the guide conduit 422, the surface 914LS of the drill bit device 410 may move toward the opposing, axially overlapping surface 430US of the protrusion stop structure 430 until such surfaces engage (e.g., directly contact) each other to inhibit further movement of the exposed portion 412E of the drill bit body 412 through the lower guide opening 422O to not exceed a particular protrusion distance 452. Thus, the protrusion stop structure 430 may be configured to inhibit protrusion of the drill bit device 410 beyond the particular protrusion distance 452 from the lower guide opening 422O while the installation guide device 400 (e.g., at least the guide device 420) is coupled to the conduit section 184 based on an upper surface 430US of the protrusion stop structure contacting a lower surface 914LS of the drill bit device 410.

As shown, based on the point of engagement between the movable drill bit device 410 and the protrusion stop structure 430 being axially spaced apart from the lower guide opening 422O by a certain spacing distance 924, the longitudinal length 952 of the exposed portion 412E of the drill bit body 412 may be greater than the particular protrusion distance 452 (e.g., equal to at least the sum of the particular protrusion distance 452 and the spacing distance 924.

As shown, in some example embodiments the diameter of the upper guide opening 422I may be equal to the diameter 422D of the guide conduit 422, to enable case of removal and/or insertion of the drill bit device 410 with regard to the guide conduit 422 while the guide device 420 is coupled to the conduit section 184.

Figure 11A:
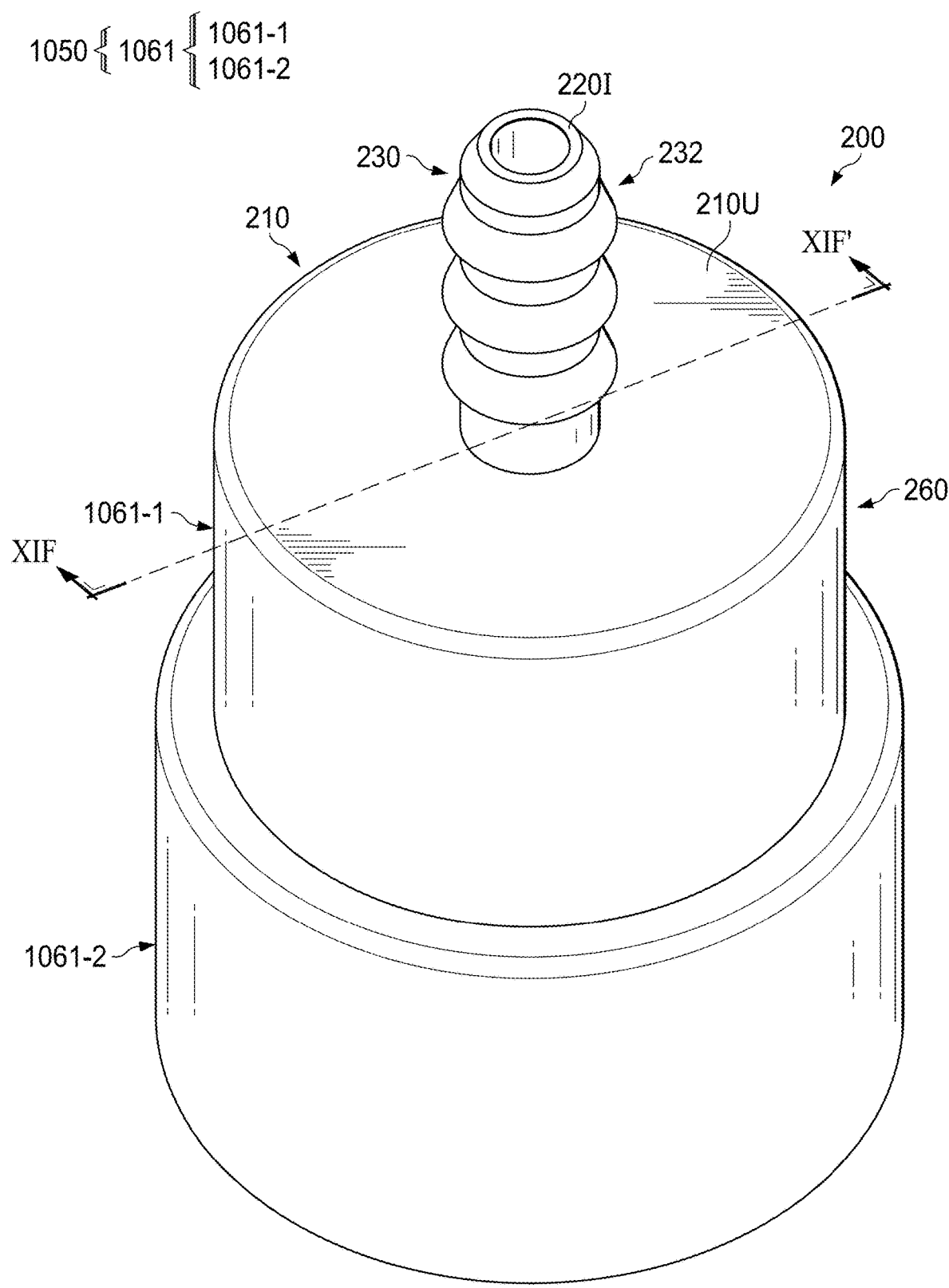
FIGS. 11A, 11B, 11C, 11D, and 11E are views of an adaptor device, according to some example embodiments.
Figure 11B:
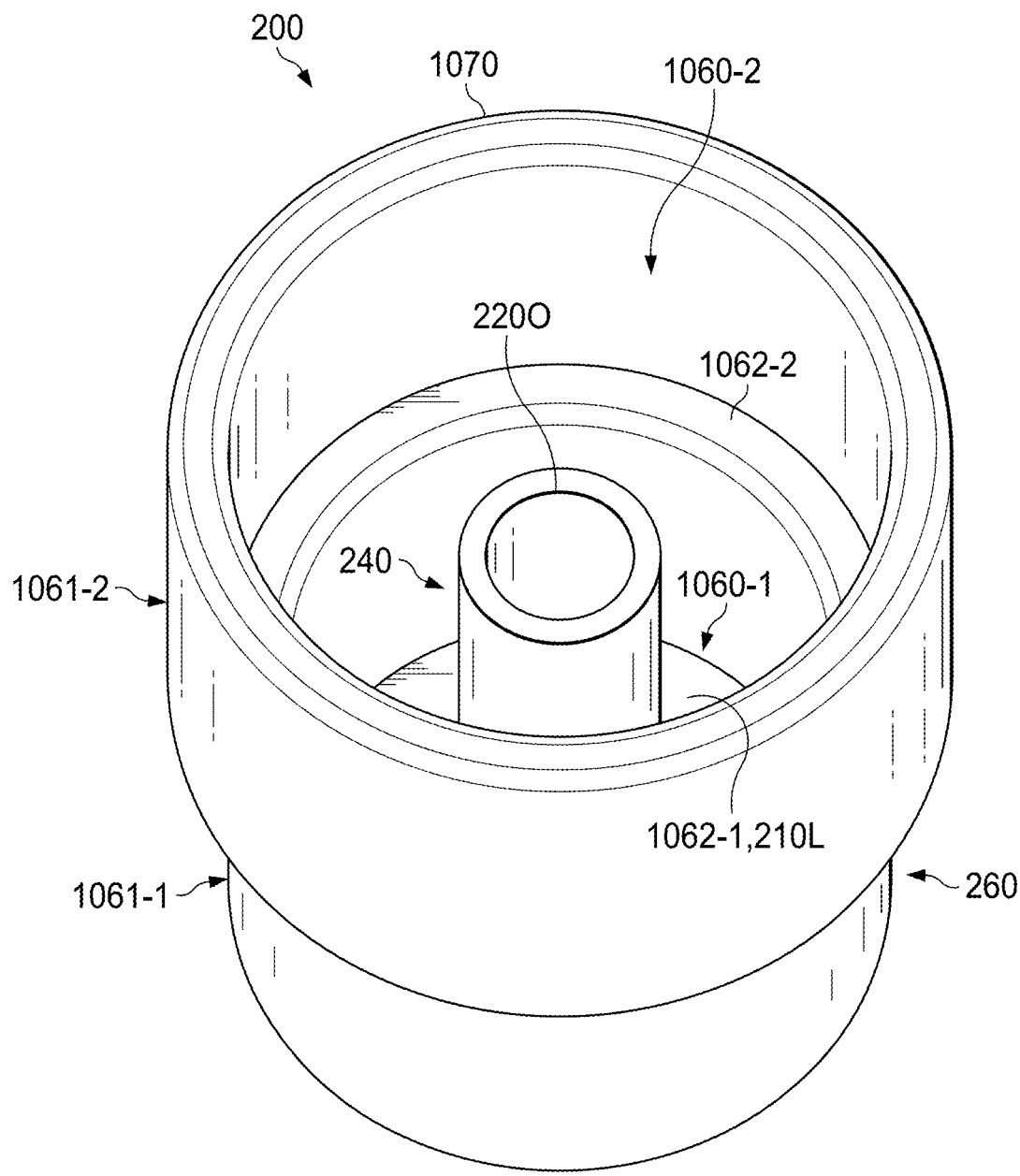
Figure 11C:
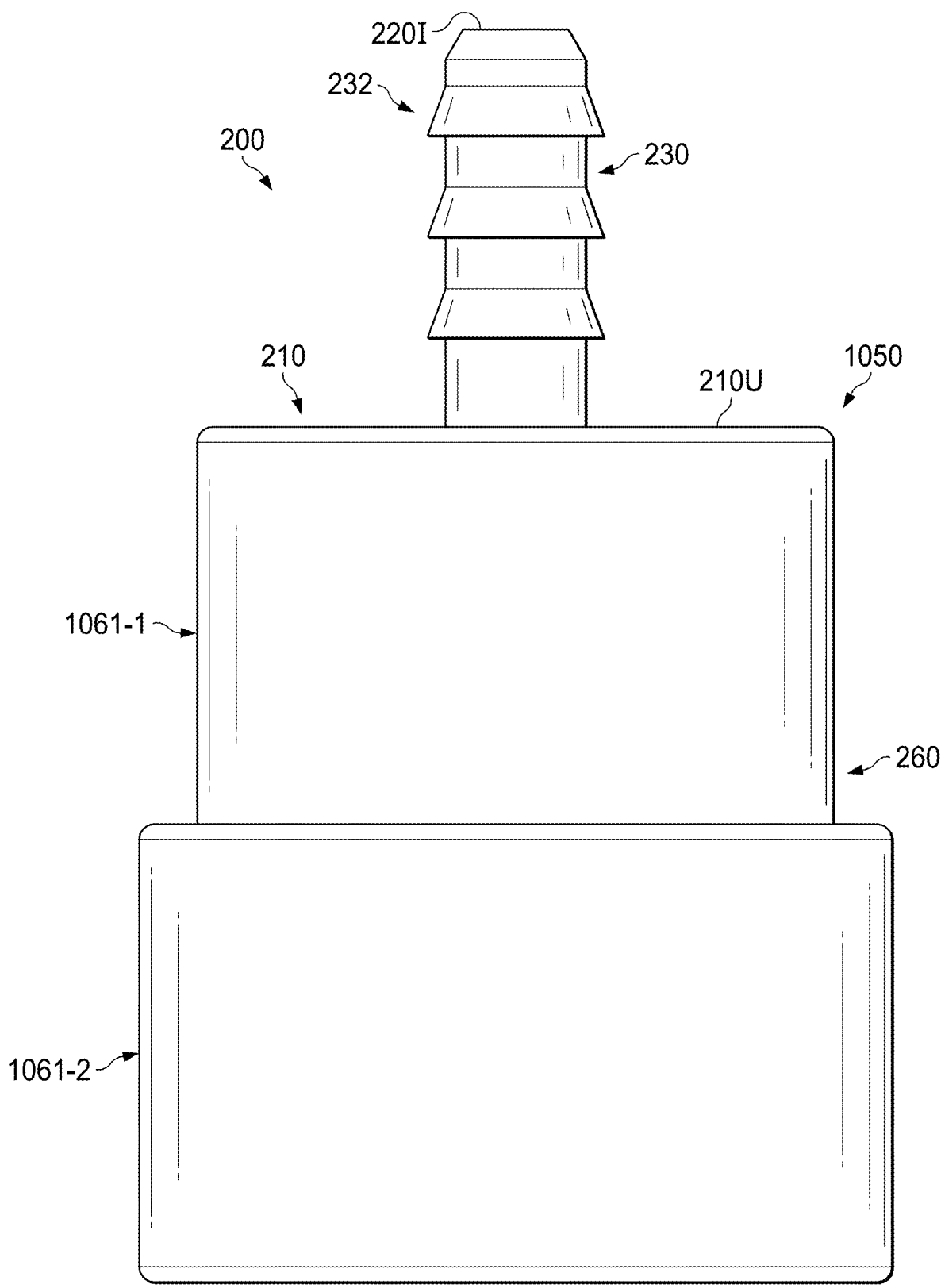
Figure 11D:
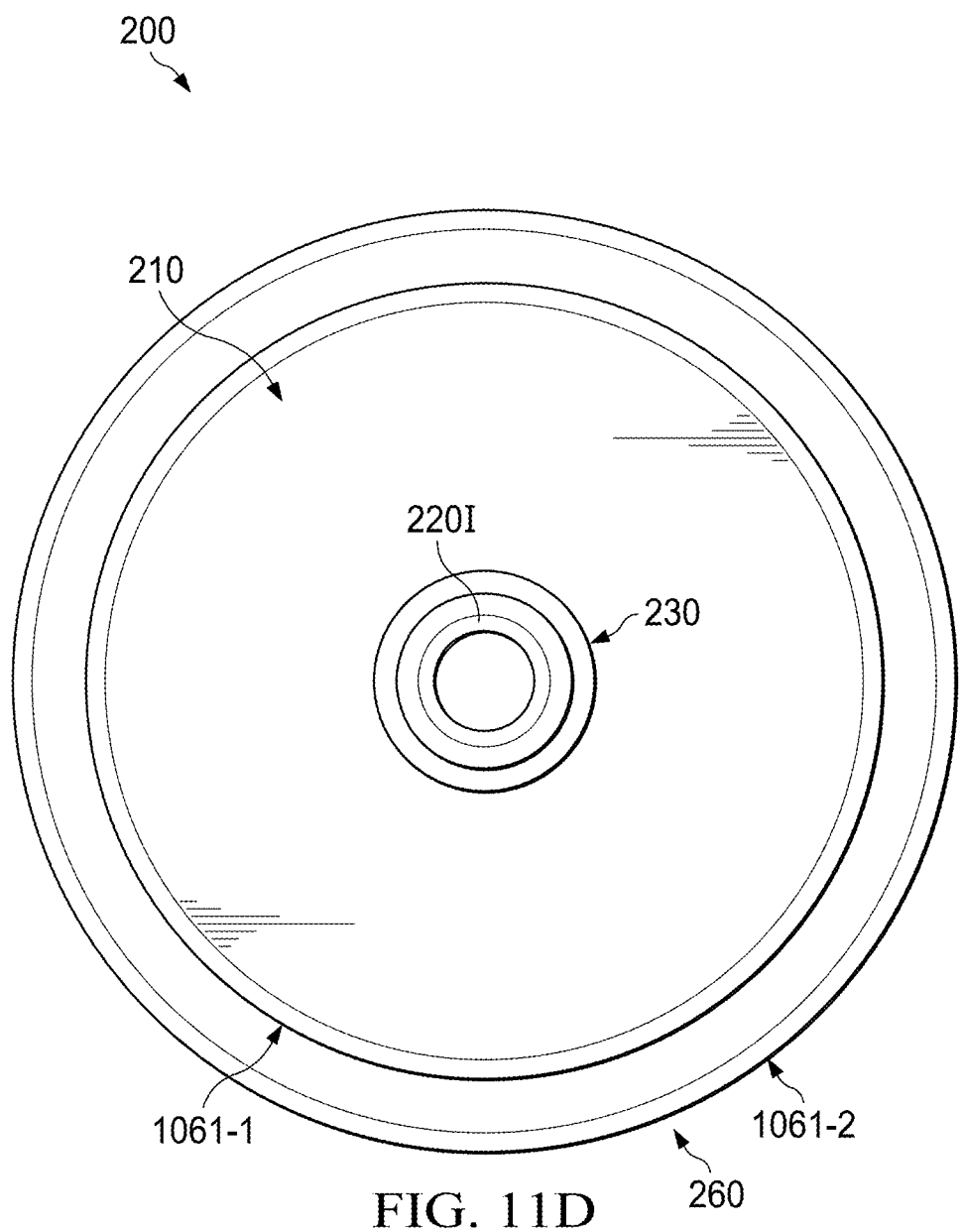
Figure 11E:
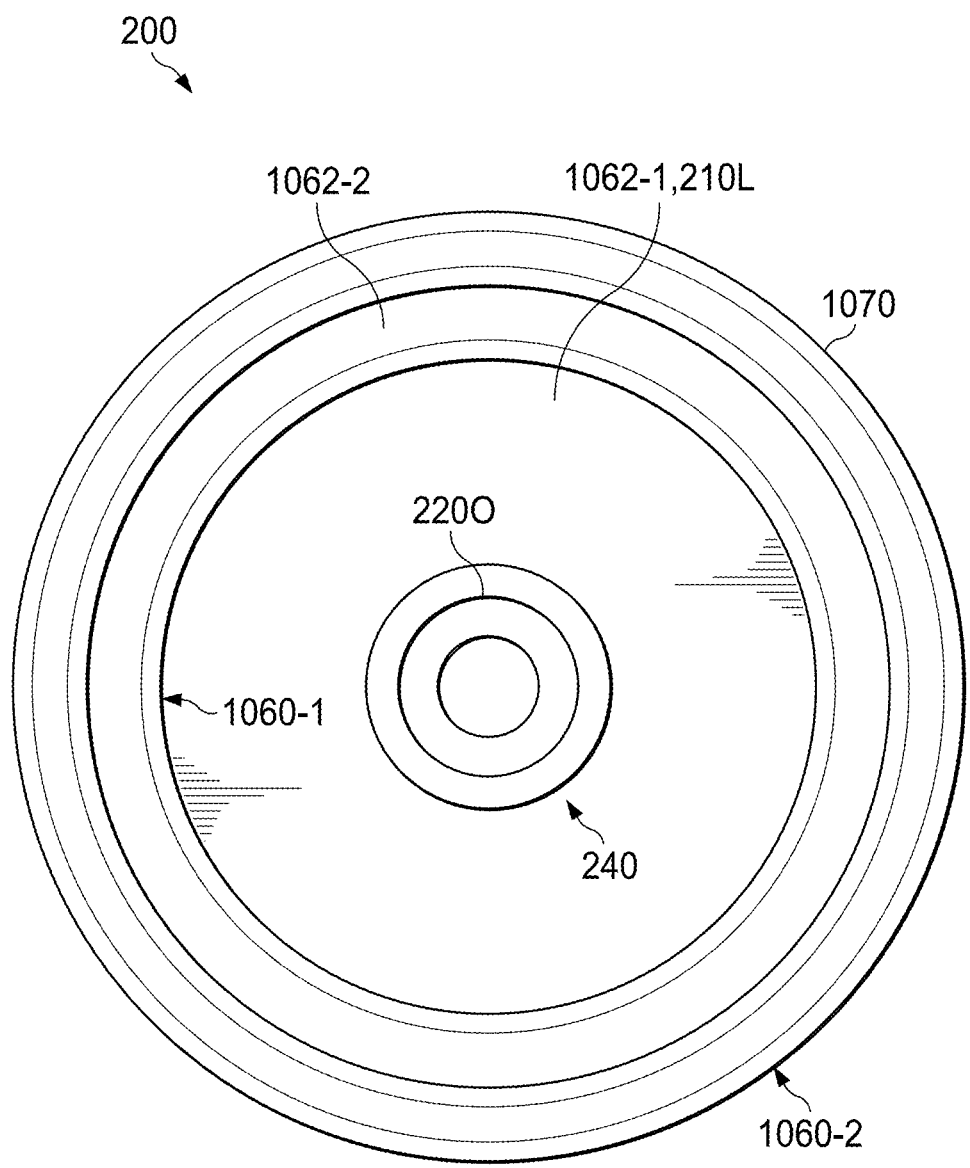
Figure 11F:
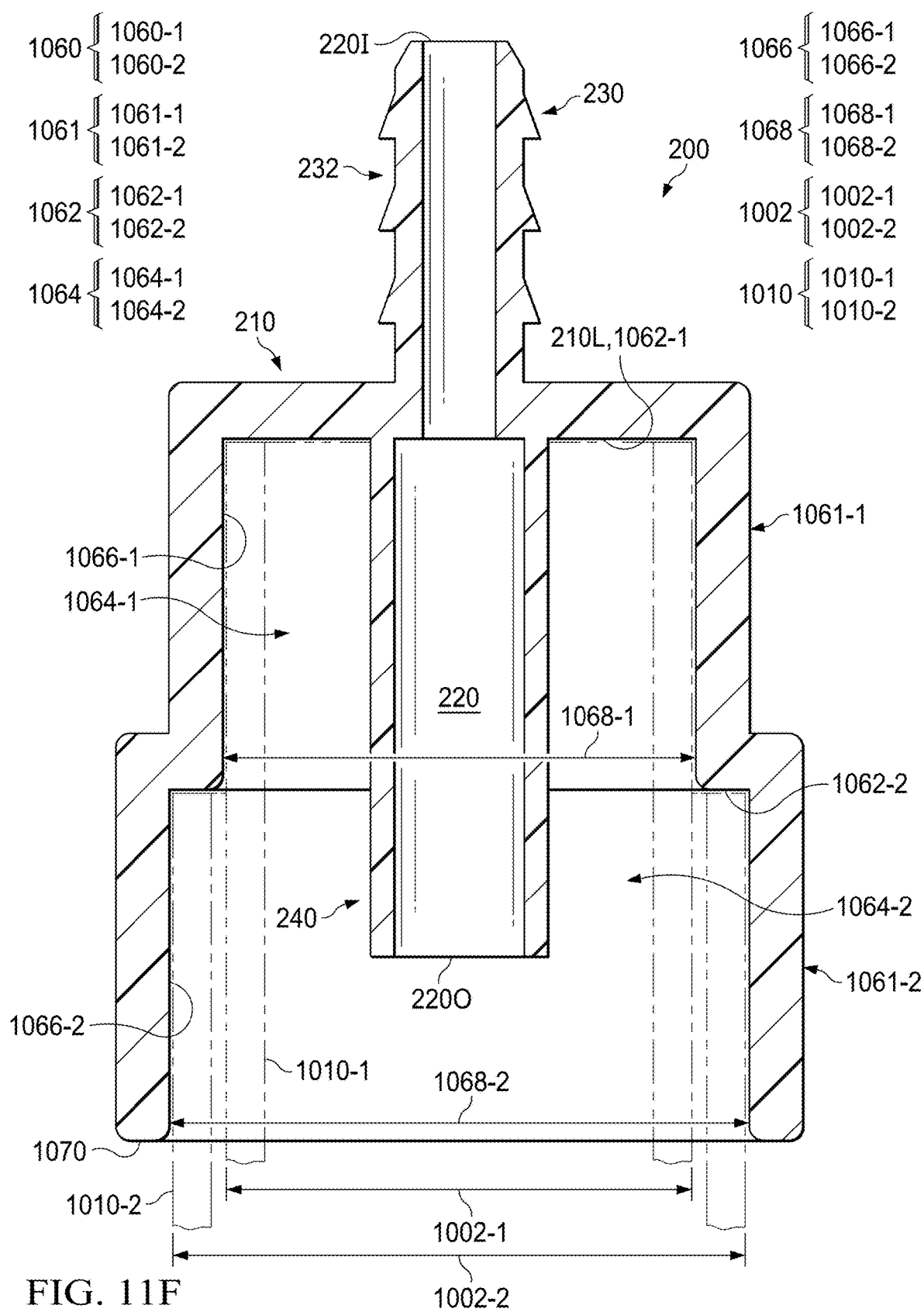
FIG. 11F is a cross-sectional elevation view of the adaptor device of FIGS. 11A-11E along cross-sectional view line XIF-XIF' shown in FIG. 11A, according to some example embodiments.

FIG. 10 is an expanded cross-sectional view of region A of FIG. 1, showing an adaptor device providing a fluid connection into a conduit section interior of an open access point opening of an open conduit section of a condensate drain line, according to some example embodiments. FIGS. 11A, 11B, 11C, 11D, and 11E are views of an adaptor device, according to some example embodiments. FIGS. 11A and 11B are top and bottom perspective views, respectively. FIG. 11C is an elevation side view, and FIGS. 11D and 11E are plan top and bottom views, respectively. FIG. 11F is a cross-sectional elevation view of the adaptor device of FIGS. 11A-11E along cross-sectional view line XIF-XIF' shown in FIG. 11A, according to some example embodiments.

Referring to FIG. 10, in some example embodiments an adaptor device 200 is configured to establish a fluid connection between a fluid supply source 150 (e.g., via a fluid supply conduit 170 coupled between the adaptor device 200 and an outlet 152 of the fluid supply source 150 as shown in FIG. 1) and a conduit section interior 184I of a conduit section 184 of a conduit 124 through an access point opening 140 in the conduit section, where the access point opening 140 is an "open" access point opening defined by a conduit segment 1010 extending to an end opening 1012 (e.g., a port) at one axial end 1014 and extending into the conduit at an opposite end. As shown, the conduit segment 1010 defining the "open" access point opening 140 may protrude away from the conduit section sidewall 186 defining a portion of the conduit section 184 in which a fluid 120 is directed to flow. Restated, the conduit segment 1010 defining the open access point opening 1040 may not be part of the flow path through the conduit 124 from the conduit inlet 128 to the conduit outlet 130. For example, the conduit segment 1010 may be a branch of a T-junction where the other two branches of the define a part of a flow path of fluid through the conduit 124 between the conduit inlet 128 and the conduit outlet 130. The end opening 1012 of the open access point conduit segment 1010 may normally be exposed or may be covered with a cap that may be removed to expose the end opening 1012. For example the conduit segment 1010 may include a branch of a T-junction with an exposed end opening 1012 or an end opening 1012 covered with a removable cap.

Still referring to FIG. 10 and further referring to FIGS. 11A-11F, in some example embodiments an adaptor device 200 may be configured to be coupled to such an open access point opening 140 defining by the conduit segment 1010 at one end of the adaptor device 200 and further coupled to the fluid supply source 150 at another end to establish the fluid connection between the fluid supply source 150 and the conduit 124 interior. The adaptor device 200 may be configured to engage the exposed (or exposable upon removal of a cap structure) axial end 1014 of the conduit segment 1010 to align an adaptor outlet 220O of the adaptor device 200 with the end opening 1012 and thus with the access point opening 140 defined at least by the conduit segment 1010, for example such that at least a portion of the adaptor device 200 overlaps a longitudinal axis of the conduit segment 1010. In some example embodiments, at least a portion of the adaptor device 200 may be inserted over the conduit segment 1010 paraxial to the longitudinal axis of the conduit segment 1010 based on the adaptor device 200 being coupled to the conduit segment 1010.

In some example embodiments, the adaptor device 200 configured to couple with an "open" access point opening of a conduit section 184 (e.g., an access point opening 140 defined by a conduit segment 1010 as shown in FIG. 10) may include an adaptor conduit structure 210, an inlet connector 230, an inlet nozzle 232, an outlet nozzle 340, a conduit connector 260, or any combination thereof. As shown in FIGS. 10 and 11A-11F, the conduit connector 260 of such an adaptor device 200 may include a stepped connector structure 1050 that may be configured to engage with a conduit segment 1010 defining an open access point opening 140 at different connection positions 1060 based on at least one of an outer diameter 1002 of the conduit segment 1010 or an inner diameter 1004 of the conduit segment 1010. Restated, the stepped connector structure 1050 may define at least two axially separated connection positions 1060 associated with different conduit segment 1010 diameters and each configured to receive and engage access point openings (e.g., conduit sections 1010) having different diameters, such that the stepped connector structure 1050 is configured to couple the adaptor device 200 with the access point opening 140 as defined by the conduit segment 1010 at a particular one of the at least two axially separated connection positions 1060 based on a diameter associated with the access point opening 140 (e.g., at least one of the outer diameter 1002 of the conduit segment 1010 or the inner diameter 1004 of the conduit segment 1010).

For example, as shown in FIGS. 10 and 11A-11F, the stepped connector structure 1050 may include cylindrical structures 1061 that each extend paraxial (e.g., coaxially) with at least the central longitudinal axis of the adaptor conduit 220 and each have a respective inner surface 1066 and a different corresponding inner diameter 1068, where the cylindrical structures 1061 at least partially define separate connection positions 1060, including at least a first connection position 1060-1 and a second connection position 1060-2, that correspond to a separate one of the inner diameters 1068. The cylindrical structures 1061 may further at least partially define axial stop surfaces 1062 of the connection positions 1060. Each separate inner diameter 1068 of each separate connection position 1060 may be equal to or substantially equal to (e.g., within a 10% margin) a separate outer diameter 1002 of a separate open access point conduit segment 1010 as shown in FIG. 10. The conduit connector 260 may be configured to couple with an access point opening conduit segment 1010 having a given outer diameter 1002 based on the stepped connector structure 1050 being inserted into the access point opening conduit segment 1010 via the end opening 1012 thereof to engage at least the axial end 1014 of the access point opening conduit segment 1010 with the axial stop surface 1062 of a corresponding one connection position 1060 of the stepped connector structure 1050 having an inner diameter 1068 that equals, is substantially equal to, or is greater than the outer diameter 1002 of the conduit segment 1010. The outer surface 1010OS of the conduit segment 1010 may further engage an inner surface 1066 of the corresponding one connection position 1060, but example embodiments are not limited thereto.

As a result, the one or more cylindrical structures 1061 that have an inner diameter 1068 equal to or greater than the outer diameter 1002 of the coupled conduit segment 1010 may at least partially extend over (e.g., overlap in a radial direction extending from a longitudinal axis of the conduit segment 1010) the outer surface 1010OS of the conduit segment 1010, and one or more cylindrical structures 1061 having an inner diameter 1068 smaller than the outer diameter 1002 of the coupled conduit segment 1010 may be external to the conduit segment 1010 and may, in some example embodiments, rest upon the conduit segment 1010 in a direction paraxial with the longitudinal axis (e.g., central longitudinal axis) of the conduit segment 1010.

For example, referring to FIG. 1010, the stepped connector structure 1050 may include a first cylindrical structure 1061-1 and a second cylindrical structure 1061-2. The first cylindrical structure 1061-1 may have a first inner sidewall surface 1066-1 and a first inner diameter 1068-1 and may further include and/or may be connected to a first axial stop surface 1062-1 and may thus at least partially define a first connection position 1060-1 corresponding to the first inner diameter 1068-1. The second cylindrical structure 1061-2 may have a second inner sidewall surface 1066-2 and a second inner diameter 1068-2 and may further include and/or may be connected to a second axial stop surface 1062-2 and may thus at least partially define a second connection position 1060-2 corresponding to the second inner diameter 1068-2. As shown, the first axial stop surface 1062-1 may be at least partially defined by the lower end (e.g., lower surface) of the adaptor conduit structure 210, and the second axial stop surface 1062-2 may be at least partially defined by the lower end (e.g., lower axial surface) of the first cylindrical structure 1061-1, but example embodiments are not limited thereto. In some example embodiments each of the cylindrical structures 1061 may include an outer ridge structure extending radially inwardly from the respective inner surface 1066 of the cylindrical structure 1061 to define a respective axial stop surface 1062.

The first and second inner diameters 1068-1 and 1068-2 may be different from each other and may correspond to (e.g., may be equal or substantially equal to) different, respective inner diameters 1002-1 or 1002-2 of different types of conduit sections 1010. For example, referring to FIGS. 14A and 14B, the first inner diameter 1068-1 may be 1" and the second inner diameter 1068-2 may be ¾", such that the adaptor device 200 is configured to couple with a conduit segment 1010 having an outer diameter 1002-1 of 1" at the first position 1060-1 and to couple with a conduit segment 1010 having an outer diameter 1002-2 of ¾" at the second position 1060-2, but example embodiments are not limited thereto.

As further shown in FIGS. 10 and 11A-11F, the adaptor device 200 may include an outlet nozzle 240 that extends paraxial with the stepped connector structure 1050 within one or more of the inner volume spaces 1070-1, 1070-2, etc. respectively defined by the cylindrical structures 1061-1, 1061-2, etc. In some example embodiments, the outlet nozzle 240 may extend along a length that is shorter than the longitudinal length of the stepped connector structure 1050 as shown in FIGS. 10 and 11A-11F, but example embodiments are not limited thereto, and in some example embodiments the outlet nozzle 240 may extend through the bottom opening 1070 of the stepped connector structure 1050.

Figure 12:
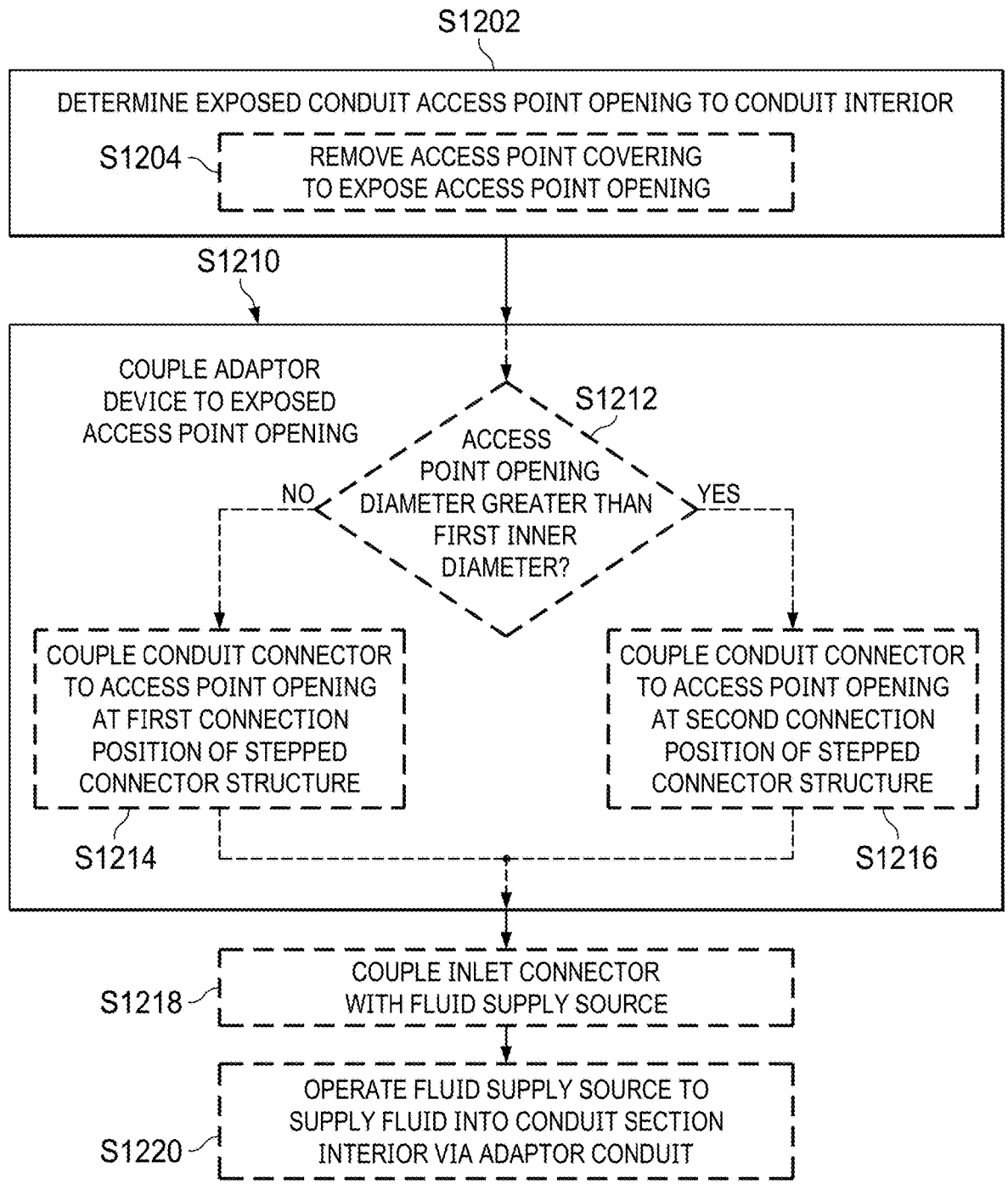
FIG. 12 is a flowchart illustrating a method to provide a fluid connection into a conduit section interior of a conduit section of a conduit through an access point opening, according to some example embodiments.
Figure 13A:
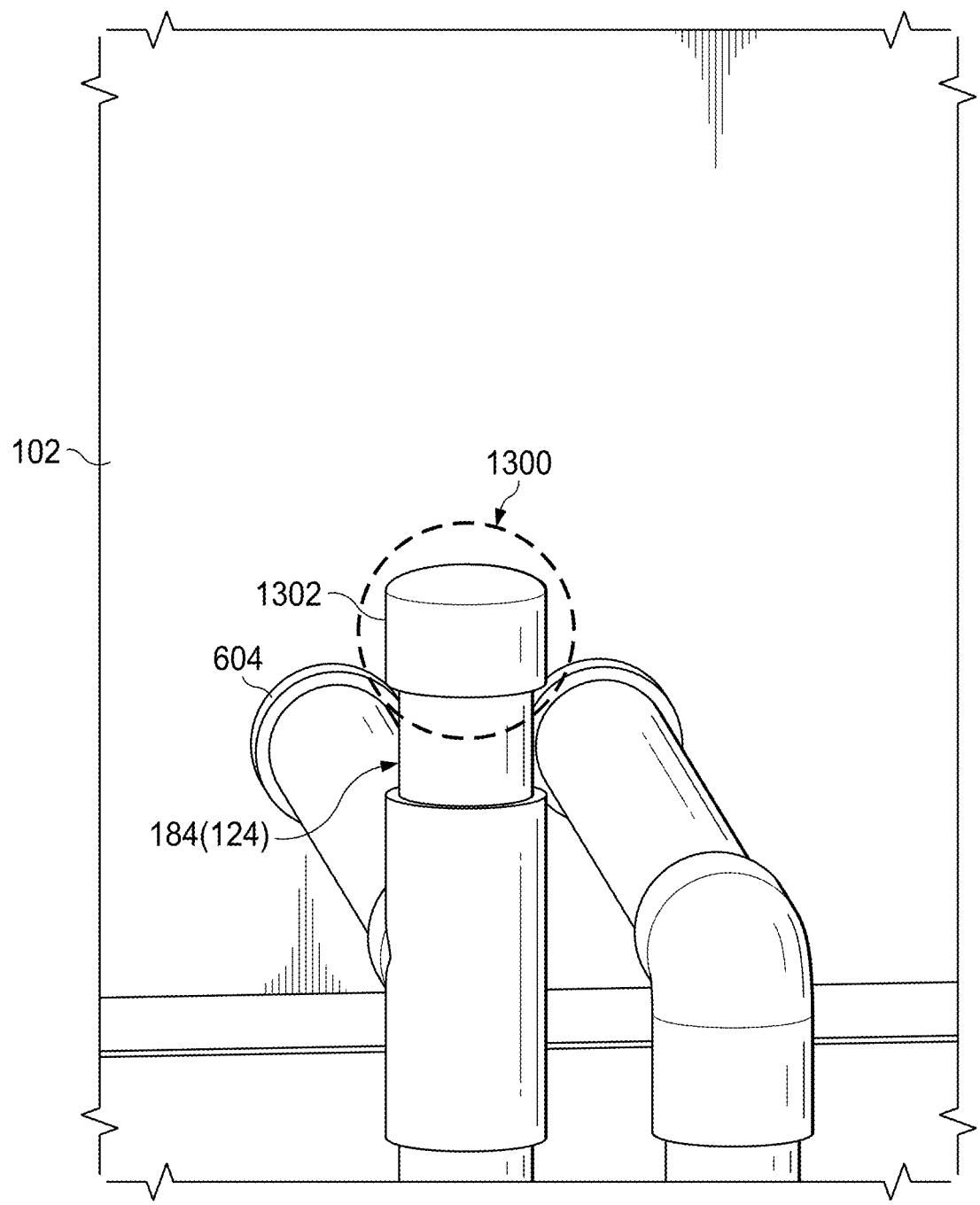
FIGS. 13A, 13B, and 13C are perspective views of separate operations of the method shown in FIG. 12, according to some example embodiments.
Figure 13B:
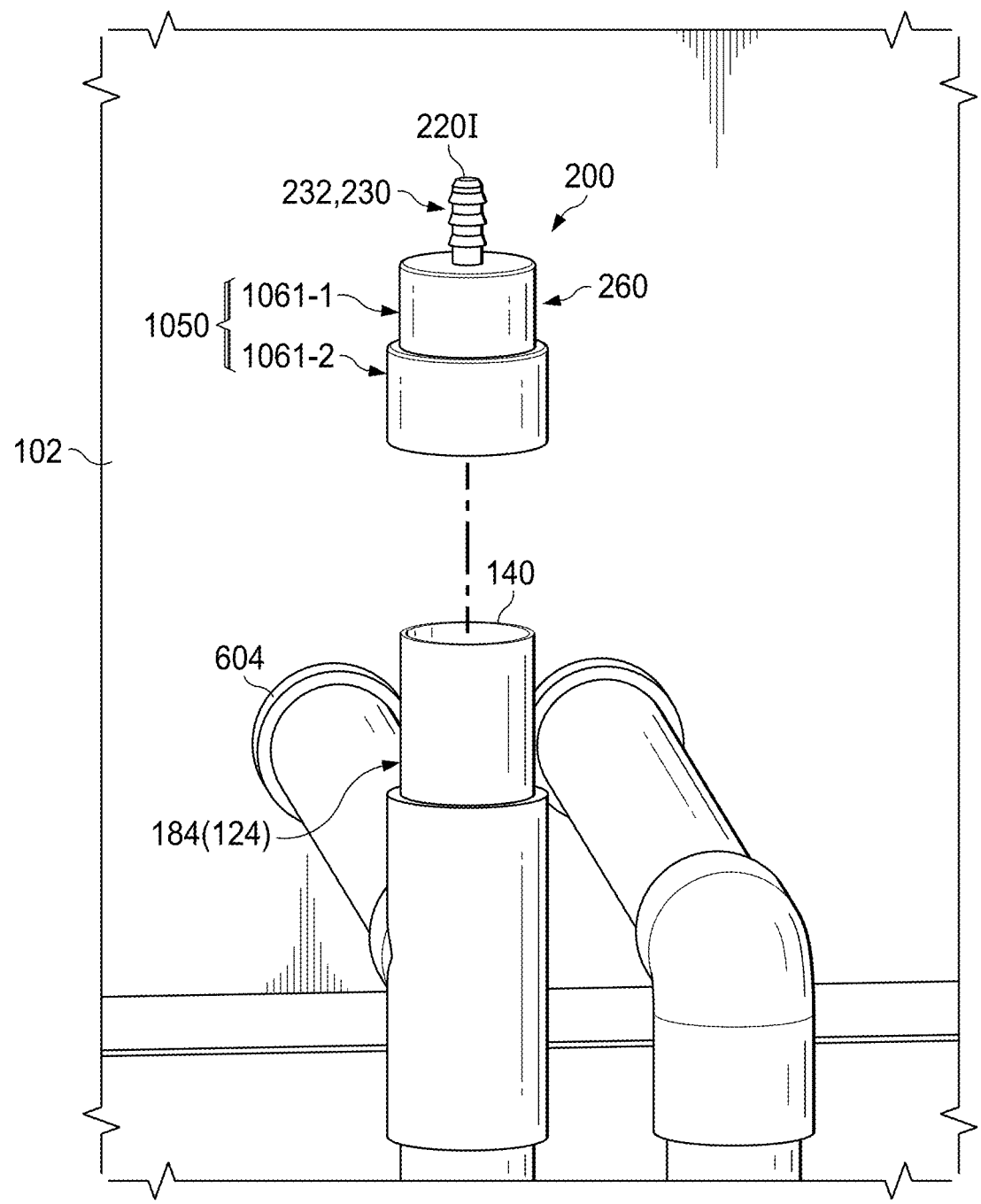
Figure 13C:
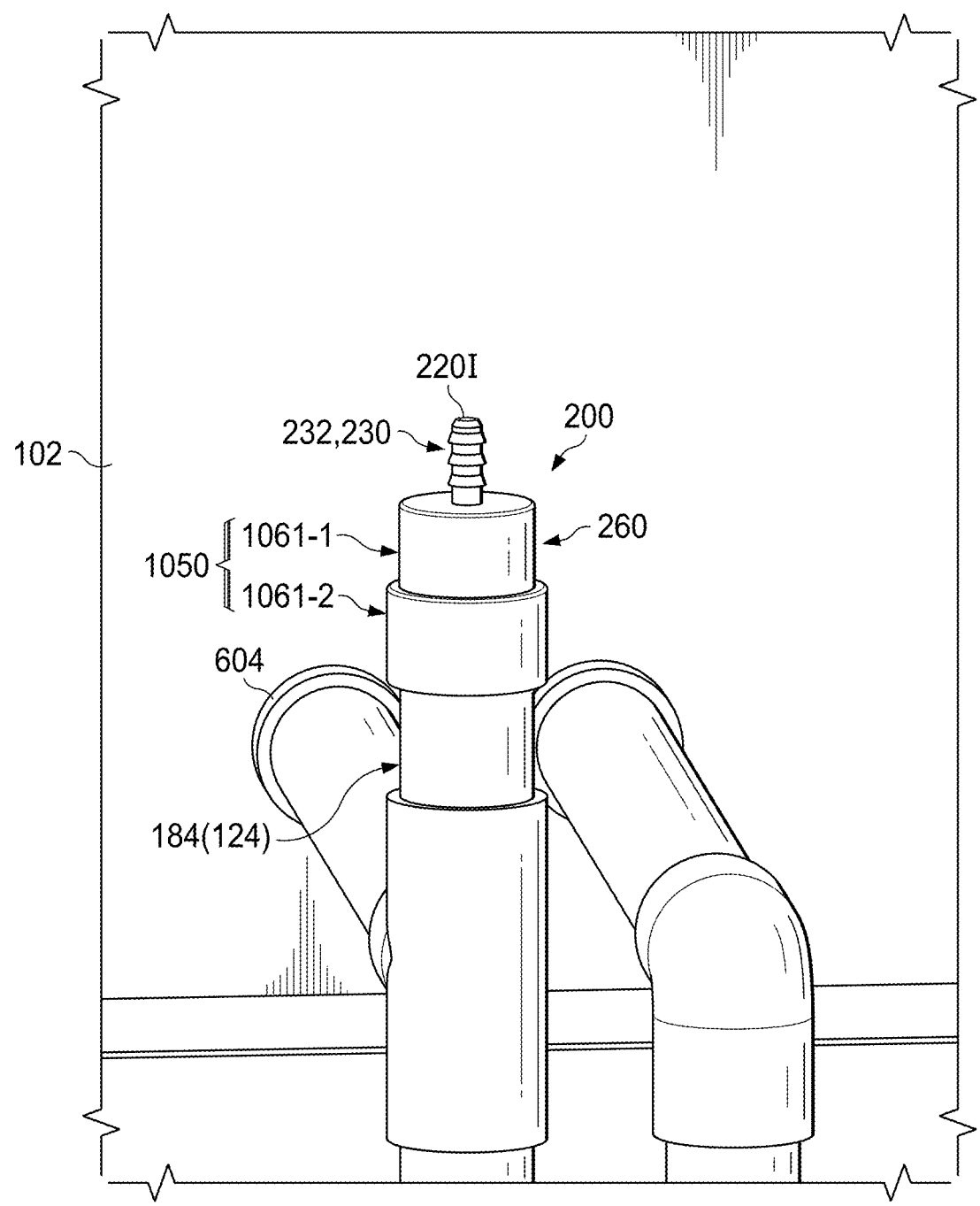

FIG. 12 is a flowchart illustrating a method to provide a fluid connection into a conduit section interior of a conduit section of a conduit through an access point opening, according to some example embodiments. FIGS. 13A, 13B, and 13C are perspective views of separate operations of the method shown in FIG. 12, according to some example embodiments. It will be understood that the methods and/or operations thereof as shown in FIGS. 12 and 13A-13C may be performed with regard to any of the example embodiments of the adaptor device 200 and/or any example embodiments of a system 100, a conduit 124, or any combination thereof. It will be understood that the operations of the method shown in FIG. 12 may be arranged in any order and/or may be rearranged in order relative to the order shown in FIG. 12. One or more of the operations shown in FIG. 12 may be omitted from the method shown in FIG. 12. One or more operations may be added to the method shown in FIG. 12.

Referring to FIGS. 12 and 13A, at S1202 an "open," or "exposed" access point opening 140 to the conduit section interior 184I of a conduit section 184 of a conduit 124, for example an access point opening 140 defined by a conduit segment 1010 protruding from a portion of the conduit section 184 defining a flow path of fluid through the conduit 124 from the conduit inlet 128 to the conduit outlet 130, is identified 1300. As shown in FIG. 13, in some example embodiments the access point opening 140 is covered by a removable access point covering 1302, or "cap", and so the determining at S1202 may include removing the removable access point covering 1302 at S1204 to expose the end opening 1012 of the conduit segment 1010 defining the open access point opening, as shown in at least FIG. 13B.

Referring to FIGS. 12 and 13B to 13C, at S1210 the adaptor device 200, which may be the adaptor device 200 shown in at least FIGS. 11A-11F, is coupled to the exposed "open" access point opening 140 based on engaging with the axial end 1014 of the conduit segment 1010 to align the adaptor outlet 220O of the adaptor device 200 with the end opening 1012 of the conduit segment 1010 and thus align the adaptor outlet 220O of the adaptor device 200 with the access point opening defined by the conduit segment 1010.

As shown, the coupling at S1210 may include determining, at S1212, whether a diameter of the access point opening (e.g., the outer diameter 1002 and/or the inner diameter 1004 of the conduit segment 1010) is greater than a first outer diameter 1002-1 that matches or corresponds to the first inner diameter 1066-1 of the first connection position 1060-1 of the adaptor device 200. The first inner diameter 1066-1 may be a smallest inner diameter of the connection positions 1060 of the stepped connector structure 1050. If not (S1212=NO), at S1214, the conduit connector 260 of the adaptor device 2020 is coupled to the access point opening 140 defined by the conduit segment 1010 based on causing the axial end 1014 of the conduit segment 1010 to be received through the bottom opening 1070 of the stepped connector structure 1050 to engage the stepped connector structure at the first connection position 1060-1, to thus couple the adaptor device 200 to the access point opening 140 at the first connection position 1060-1 of the stepped connector structure 1050. If so (S1212=YES), the conduit connector 260 of the adaptor device 2020 is coupled to the access point opening 140 defined by the conduit segment 1010 based on causing the axial end 1014 of the conduit segment 1010 to be received through the bottom opening 1070 of the stepped connector structure 1050 to engage the stepped connector structure at the second connection position 1060-2, to thus couple the adaptor device 200 to the access point opening 140 at the second connection position 1060-2 of the stepped connector structure 1050.

As a result of performing the coupling S1210, the adaptor device 200 may be coupled to the "open" access point opening 140 of the conduit section 184 at an axial end 1014 of the conduit segment 1010 defining the access point opening 140, as shown in FIG. 13C.

At S1218, the inlet connector 230 of the adaptor device 200 may be coupled with the fluid supply source 150, for example based on coupling with a first end of a fluid supply conduit 170 that is coupled at an opposite end to an outlet 152 of the fluid supply source 150, to establish fluid communication between the conduit section interior 184I and the fluid supply source through the adaptor conduit 220 of the adaptor device 200 that is coupled to the conduit section 184 at the access point opening 140 defined by the conduit segment 1010.

At S1220, the method may include operating the fluid supply source 150 (e.g., based on a processor (e.g., central processing unit or CPU) of the fluid supply source 150 executing a program of instructions stored on a memory (e.g., solid state drive storage device)) to supply (e.g., discharge, dispense, supply, etc.) an amount of the fluid 160 from the outlet 152 such that the fluid 160 is received at the adaptor inlet 220I from the fluid supply source 150 (e.g., via the fluid supply conduit 170) and the adaptor device 200 directs the received fluid 160 to flow through the adaptor conduit 220 and into the conduit section interior 184I to be supplied into at least a portion of the conduit 124.

In some example embodiments, and as shown in FIG. 1, the system 100 may be an air conditioning system, the process unit 102 may be an air handler of the air conditioning system, the conduit 124 may be a condensate drain line of the air conditioning system which is configured to direct condensate from a drip pan of the air handler of the air conditioning system to a condensate drain outlet through at least the conduit section interior 184I, the fluid 160 may be a cleaning composition configured to remove, clean, mitigate, break down, etc. biological substances, the fluid supply source 150 may be a cleaner dispensing system that is configured to operate to dispense an amount of the cleaning composition (e.g., at a fixed time interval), and the method may include, at S524, operating the cleaner dispensing system to dispense the cleaning composition, such that the adaptor device directs the cleaning composition dispensed by the cleaner dispensing system through the adaptor conduit and into the conduit section interior to be supplied into at least a portion of the condensate drain line to cause at least some biological substances to be removed from at least a portion of the condensate drain line, thereby mitigating or preventing condensate backflow in the condensate drain line.

FIGS. 14A and 14B are expanded cross-sectional views of region B of FIG. 1, showing an adaptor device providing a fluid connection into a conduit section interior of an open access point opening of an open conduit section of a condensate drain line, according to some example embodiments.

Referring to FIGS. 14A and 14B, in some example embodiments the adaptor device 200 shown in at least FIGS. 11A-11F may be configured to couple to a conduit segment 1010 defining an end branch of a T-junction conduit section 184, where the flow path of the conduit 124 extend through the middle junction and the opposite end junction to "bend" or "turn, and the conduit segment 1010 may be aligned (e.g., have a longitudinal axis that is coaxial with) the opposite end junction. The adaptor device 200 may be configured to be coupled to the conduit segment 1010 defining the end junction at one of the multiple connection positions 1060 of the stepped connector structure 1050 based on the diameter (e.g., outer diameter 1002) of the conduit segment 1010. For example, as shown in FIG. 14A, the second inner diameter 1068-2 of the stepped connector structure 1050 may be 1" at the second connection position 1060-2 and the outer diameter 1002-2 of the conduit segment 1010-2 may be 1", such that the adaptor device 200 may couple with the conduit segment 1010 at the second connection position 1060-2 based on engaging at least the second stop surface 1062-2. In another example, referring to FIG. 14B, the first inner diameter 1068-1 of the stepped connector structure 1050 at the first connection position 1060-1 may be ¾" and the first inner diameter 1068-1 may be ¾" and the outer diameter 1002-1 of the conduit segment 1010-1 may be ¾", such that the adaptor device 200 may couple with the conduit segment 1010 at the first connection position 1060-1 based on engaging at least the first stop surface 1062-1.

While some example embodiments of an adaptor configured to couple with a conduit section 184 that includes an "open" access point opening 140 include a stepped connector structure that defines the at least two axially separated connection positions as being associated with different conduit outer diameters 1068-1, 1068-2, such that the stepped connector structure is configured to couple the adaptor device with the access point opening at a particular one of the at least two axially separated connection positions based on a conduit outer diameter associated with the access point opening, example embodiments are not limited thereto. For example, as described below with reference to FIG. 15, the stepped connector structure may define the at least two axially separated connection positions as being associated with different conduit inner diameters, such that the stepped connector structure is configured to couple the adaptor device with the access point opening at a particular one of the at least two axially separated connection positions based on a conduit inner diameter associated with the access point opening.

Figure 15:
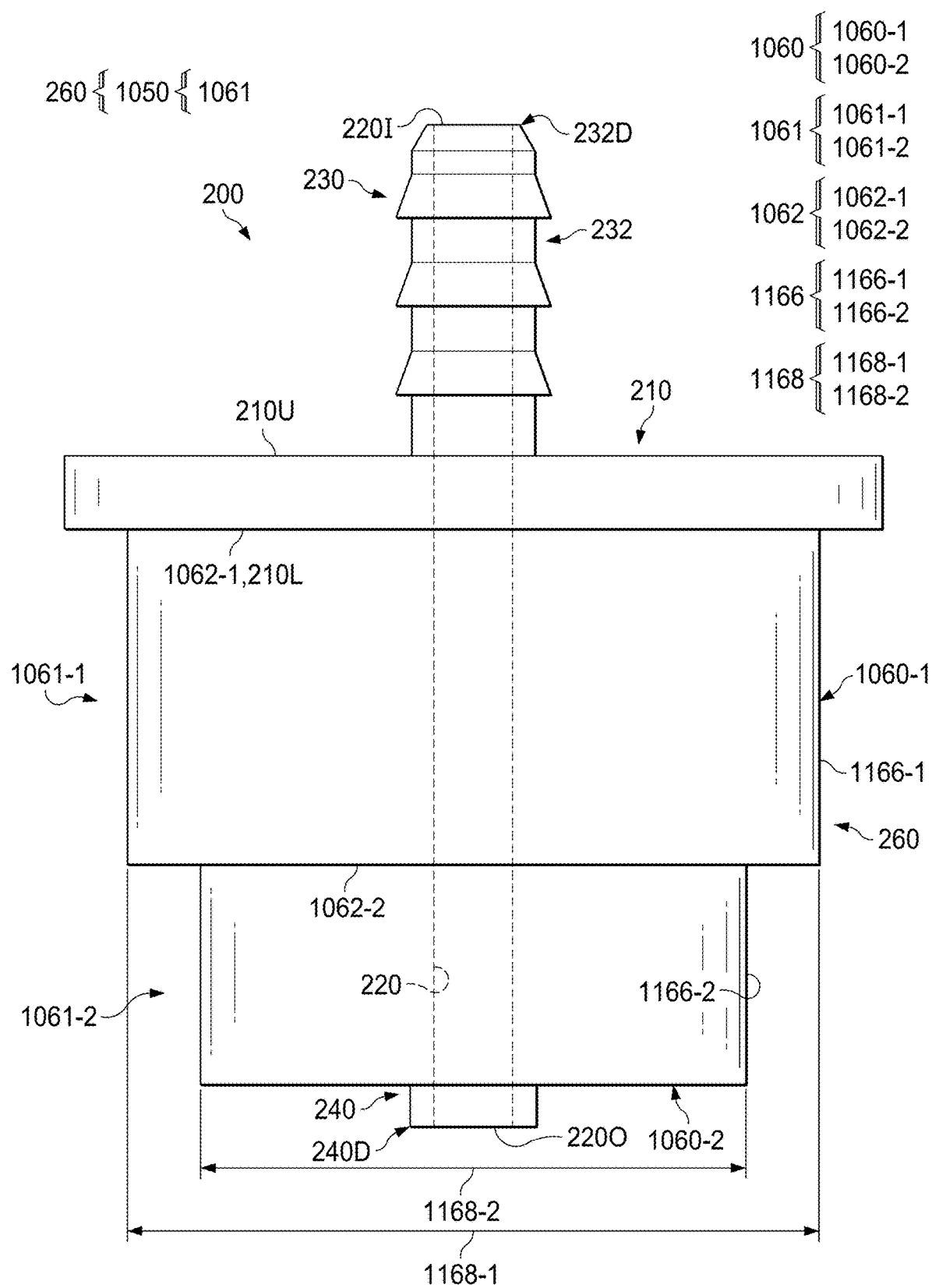
FIG. 15 is an elevation view of an adaptor device, according to some example embodiments.

FIG. 15 is an elevation view of an adaptor device 200, according to some example embodiments.

Referring to FIG. 15, in some example embodiments, and like the example embodiments shown in FIGS. 10, 11A-11F, 13A-13C, and 14A-14B, an adaptor device 200 may include a conduit connector 260 that is configured to couple the adaptor device 200 to a conduit section 184 that includes an "open" access point opening 140 such that the lower end of the adaptor conduit structure is held in place proximate to the access point opening 140 to at least partially align the adaptor outlet 220O with the access point opening 140, where the conduit connector 260 includes a stepped connector structure 1050 defining at least two axially separated connection positions 1060 associated with different conduit diameters and each configured to receive and engage access point openings having different diameters, such that the stepped connector structure is configured to couple the adaptor device with the access point opening 140 (e.g., defined by a conduit segment 1010) at a particular one of the at least two axially separated connection positions based on a diameter associated with the access point opening 140 (e.g., an inner diameter and/or outer diameter of the conduit segment 1010).

In some example embodiments, including the example embodiments shown in FIG. 15, the stepped connector structure 1050 defines the at least two axially separated connection positions 1060 as being associated with different conduit inner diameters (e.g., different inner diameters of different conduits segments defining different open access point openings), such that the stepped connector structure 1050 is configured to couple the adaptor device 200 with the conduit segment 1010 defining the open access point opening 140 at a particular one of the at least two axially separated connection positions 1060 based on a conduit inner diameter associated with the open access point opening 140.

For example, as shown in FIG. 15, the stepped connector structure 1050 may include cylindrical structures 1061 that each extend paraxial (e.g., coaxially with at least the longitudinal axis of the adaptor conduit 220 and each have a respective outer surface 1166 and a different corresponding outer diameter 1168, where the cylindrical structures 1061 define separate connection positions 1060, including at least a first connection position 1060-1 and a second connection position 1060-2, that correspond to a separate one of the outer diameters 1168. The cylindrical structures 1061 may further at least partially define axial stop surfaces 1062 of the connection positions 1060. Each separate outer diameter 1168 of each separate connection position 1060 may be equal to or substantially equal to (e.g., within a 10% margin) a separate inner diameter 1004 of a separate open access point conduit segment 1010 as shown in FIG. 10. The conduit connector 260 may be configured to couple with an access point opening conduit segment 1010 having a given inner diameter 1004 based on the stepped connector structure 1050 being inserted into the access point opening conduit segment 1010 via the end opening 1012 thereof to engage at least the axial end 1014 of the access point opening conduit segment 1010 with the axial stop surface 1062 of a corresponding one connection position 1060 of the stepped connector structure 1050 having an annular diameter 1168 that equals, is substantially equal to, or is smaller than the inner diameter 1004 of the conduit segment 1010. The inner surface 1010IS of the conduit segment 1010 may further engage an outer surface 1166 of the corresponding one connection position 1060, but example embodiments are not limited thereto.

As a result, the one or more cylindrical structures 1061 that have an outer diameter 1168 equal to or smaller than the inner diameter 1004 of the coupled conduit segment 1010 may at least partially extend into the interior of the conduit segment 1010 defined by the one or more inner surfaces 1010IS of the conduit segment 1010, and one or more cylindrical structures 1061 having an outer diameter 1168 greater than the inner diameter of the coupled conduit segment 1010 may be external to the conduit segment 1010 and may, in some example embodiments, rest upon the conduit segment 1010.

For example, referring to FIG. 15, the stepped connector structure 1050 may include a first cylindrical structure 1061-1 and a second cylindrical structure 1061-2. The first cylindrical structure 1061-1 may have a first outer sidewall surface 1166-1 and a first outer diameter 1168-1 and may further include and/or may be connected to a first axial stop surface 1062-1 and may thus at least partially define a first connection position 1060-1 corresponding to the first outer diameter 1168-1. The second cylindrical structure 1061-2 may have a second outer sidewall surface 1166-2 and a second outer diameter 1168-2 and may further include and/or may be connected to a second axial stop surface 1062-2 and may thus at least partially define a second connection position 1060-2 corresponding to the second outer diameter 1168-2. As shown, the first axial stop surface 1062-1 may be at least partially defined by the lower end (e.g., lower surface) of the adaptor conduit structure 210, and the second axial stop surface 1062-2 may be at least partially defined by the lower end (e.g., lower axial surface) of the first cylindrical structure 1061-1, but example embodiments are not limited thereto; in some example embodiments each of the cylindrical structures 1061 may include an outer ridge structure extending radially outwardly from the respective outer surface 1166 of the cylindrical structure 1061 to define a respective axial stop surface 1062.

The first and second outer diameters 1068-1 and 1068-2 may be different from each other and may correspond to (e.g., may be equal or substantially equal to) inner diameters of different types of conduit sections 1010. For example, the first outer diameter 1068-1 may be 1 inch and the second outer diameter 1068-2 may be ¾ inches, such that the adaptor device 200 is configured to couple with a 1" conduit segment 1010 at the first position 1060-1 and to couple with a ¾" conduit segment 1010 at the second position 1060-2, but example embodiments are not limited thereto.

As described herein, any portion of the adaptor device 200 and/or the installation guide device 400, including the adaptor conduit structure 210, the conduit connector 260, the outlet nozzle 240, the inlet nozzle 232, the drill bit device 410, the sheath structure 414, the guide device 420, the protrusion stop structure 430, the guide connector 440, any combination thereof, or the like may at least partially comprise include any material, including any plastic material, any polymer material, any metal material, or the like, including for example any molded plastic material, polyvinyl chloride (PVC), polypropylene (PP), polyethylene terephthalate (PET), polymethyl methacrylate (PMMA), high density polyethylene (HDPE), low density polyethylene (LDPE), acrylonitrile butadiene styrene (ABS), styrene acrylonitrile (SAN), steel, silicone, any combination thereof, or the like.

As described herein, a single, unitary piece of material that may at least partially comprise any portions, sections, structures, any combination thereof, or the like of the adaptor device 200, the installation guide device 400, or any combination thereof may include any material, including any plastic material, any polymer material, any metal material, or the like, including for example any molded plastic material, polyvinyl chloride (PVC), polypropylene (PP), polyethylene terephthalate (PET), polymethyl methacrylate (PMMA), high density polyethylene (HDPE), low density polyethylene (LDPE), acrylonitrile butadiene styrene (ABS), styrene acrylonitrile (SAN), steel, silicone, any combination thereof, or the like.

It will be understood that the adaptor device 200 according to any of the example embodiments, and the installation guide device 400 according to any of the example embodiments may collectively comprise a system for providing a fluid connection into a conduit section interior 184I of a conduit section 184 of a conduit 124 through a sidewall thickness 186T of a conduit section sidewall 186 of the conduit section 184.

Some example embodiments have been disclosed herein; it should be understood that other variations may be possible. Such variations are not to be regarded as a departure from the spirit and scope of the present inventive concepts, and all such modifications as would be obvious to one skilled in the art are intended to be included within the scope of the following claims.

What is claimed:

1. A method to provide a fluid connection into a conduit section interior of a conduit section of a conduit through a sidewall thickness of a conduit section sidewall of the conduit section, the method comprising:

coupling an installation guide device to the conduit section, the installation guide device including a drill bit device configured to drill through the sidewall thickness of the conduit section, the drill bit device including a drill bit body and a sheath structure surrounding at least a portion of the drill bit body, the installation guide device including a guide conduit having at least a lower guide opening, the installation guide device configured to enable longitudinal movement of the drill bit device at least partially through the guide conduit and at least partially through the lower guide opening, the installation guide device including a protrusion stop structure configured to limit longitudinal protrusion of the drill bit device from the lower guide opening to a particular protrusion distance, the particular protrusion distance equal to an axial length of an exposed portion of the drill bit body that extends from at least one of the sheath structure or the protrusion stop structure to a point of the drill bit body, the coupling the installation guide device to the conduit section aligns the lower guide opening with an access point location on an outer sidewall surface of the conduit section;

operating the drill bit device while the installation guide device is coupled to the conduit to cause the drill bit device to move longitudinally at least partially through the lower guide opening to a protrusion distance that is equal to or less than the particular protrusion distance, such that the drill bit device drills through the sidewall thickness of the conduit section from the access point location to form an access point opening through the sidewall thickness of the conduit section into the conduit section interior of the conduit section;

decoupling the installation guide device from the conduit section to expose the access point opening; and coupling an adaptor device to the conduit section at the exposed access point opening subsequently to decoupling the installation guide device from the conduit section, the adaptor device including an adaptor conduit extending between an adaptor inlet and an adaptor outlet, the coupling the adaptor device at least partially aligns the adaptor outlet with the access point opening to establish fluid communication from the adaptor inlet to the conduit section interior through at least the adaptor conduit and the access point opening.

2. The method of claim 1, wherein the protrusion stop structure is fixed in relation to the drill bit device such that the protrusion stop structure is configured to
move with the drill bit device in relation to the guide conduit, and
inhibit protrusion of the drill bit device beyond the particular protrusion distance from the lower guide opening while the installation guide device is coupled to the conduit section based on a lower surface of the protrusion stop structure contacting the outer sidewall surface of the conduit section.

3. The method of claim 1, wherein the installation guide device includes a distal stop structure that is configured to inhibit longitudinal movement of the drill bit device away from the lower guide opening and at least partially through the guide conduit.

\* \* \* \* \*